US012530662B2

(12) United States Patent
Rogers et al.

(10) Patent No.: US 12,530,662 B2
(45) Date of Patent: *Jan. 20, 2026

(54) NETWORK-CONNECTED APPARATUS PROMOTING ENVIRONMENTALLY RESPONSIBLE PROCESSING AND DISPOSITION OF ORGANIC MATTER DATA

(71) Applicant: Chewie Labs LLC, San Bruno, CA (US)

(72) Inventors: Matthew Lee Rogers, San Francisco, CA (US); Harry E. Tannenbaum, San Francisco, CA (US); Adam Mittleman, Redwood City, CA (US); Scott Smithline, Davis, CA (US); Jaideep Singh Chavan, Mountain View, CA (US); Saket Vora, Santa Cruz, CA (US); Shayan Sayadi, Mill Valley, CA (US); Alyssa Noelle Pollack, Lone Tree, CO (US); Geoffrey Becker Hill, Seattle, WA (US)

(73) Assignee: Chewie Labs LLC, San Bruno, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 17/897,457

(22) Filed: Aug. 29, 2022

(65) Prior Publication Data

US 2023/0065538 A1     Mar. 2, 2023

Related U.S. Application Data

(60) Provisional application No. 63/314,087, filed on Feb. 25, 2022, provisional application No. 63/239,852, filed on Sep. 1, 2021.

(51) Int. Cl.
*G06Q 10/30*     (2023.01)
*B02C 17/20*     (2006.01)

(52) U.S. Cl.
CPC ............ *G06Q 10/30* (2013.01); *B02C 17/20* (2013.01)

(58) Field of Classification Search
CPC ........... G06Q 10/30; B02C 17/20; B09B 3/35
See application file for complete search history.

(56) References Cited

U.S. PATENT DOCUMENTS 5,340,536 A    8/1994  Datar et al.
5,634,600 A    6/1997  Kubota et al.
(Continued)

FOREIGN PATENT DOCUMENTS

EP      0791568      8/1997
JP      2004-216253  12/2004
(Continued)

*Primary Examiner* — Mohammad Ali
*Assistant Examiner* — Vincent W Chang
(74) *Attorney, Agent, or Firm* — Van Court & Aldridge LLP

(57) ABSTRACT

Embodiments disclosed herein provide various systems and methods for obtaining organic matter data related to the processing of food matter and mixed organics in an organic matter processing apparatus. The organic matter data can include, for example, mass values, water content values, timestamps, account numbers, other quantifiable metrics, and other identifying information. The organic matter data can be used according to many different embodiments. For example, in one embodiment, the organic matter data can be provided to a central system that processes the data for use by a third party such as a matter collector or an end user of output produced by the organic matter processing apparatus. In another embodiment, organic matter data can be presented to a user of the organic matter processing apparatus.

15 Claims, 33 Drawing Sheets

(56) References Cited

U.S. PATENT DOCUMENTS

| | | | |
|---|---|---|---|
| 6,150,939 A | 11/2000 | Lin | |
| 7,240,865 B2 | 7/2007 | Choi | |
| 9,308,535 B2 | 4/2016 | Delgado et al. | |
| 9,597,620 B2 | 3/2017 | Verdegan et al. | |
| 9,895,726 B1 | 2/2018 | Atkinson et al. | |
| 10,065,196 B1 | 9/2018 | Tran et al. | |
| 10,906,046 B2 | 2/2021 | Crepeau et al. | |
| 11,241,694 B2 | 2/2022 | Crepeau et al. | |
| 11,278,908 B2 | 3/2022 | Crepeau et al. | |
| 11,389,804 B2 | 7/2022 | Hayman et al. | |
| 11,541,397 B2 | 1/2023 | Crepeau et al. | |
| 2004/0175303 A1 | 9/2004 | Lin | |
| 2004/0251339 A1 | 12/2004 | Strutz | |
| 2004/0265197 A1 | 12/2004 | Lin | |
| 2008/0067270 A1 | 3/2008 | Strutz | |
| 2009/0113791 A1 | 5/2009 | Bertin et al. | |
| 2009/0200180 A1 | 8/2009 | Capote | |
| 2010/0140248 A1 | 6/2010 | Yi et al. | |
| 2011/0020184 A1 | 1/2011 | Sun | |
| 2011/0151553 A1 | 6/2011 | Cruson et al. | |
| 2012/0021504 A1 | 1/2012 | Bradlee | |
| 2012/0034350 A1 | 2/2012 | Gard et al. | |
| 2012/0298658 A1 | 11/2012 | Bosetti et al. | |
| 2013/0217111 A1 | 8/2013 | Chang | |
| 2013/0263786 A1 | 10/2013 | Meisel, III et al. | |
| 2014/0117126 A1 | 5/2014 | Ceru et al. | |
| 2015/0196920 A1* | 7/2015 | Celli | B02C 25/00 700/275 |
| 2016/0022112 A1 | 1/2016 | Davenport | |
| 2016/0207845 A1 | 7/2016 | Delgado et al. | |
| 2016/0295906 A1 | 10/2016 | Jacobsen et al. | |
| 2017/0174579 A1* | 6/2017 | Halbleib | C05F 17/993 |
| 2017/0197857 A1* | 7/2017 | Whitener | B02C 18/0092 |
| 2017/0226466 A1 | 8/2017 | Grillo et al. | |
| 2017/0260111 A1 | 9/2017 | Maghas et al. | |
| 2017/0349501 A1 | 12/2017 | Buzruk | |
| 2018/0093814 A1 | 4/2018 | Espinosa | |
| 2018/0148391 A1 | 5/2018 | Ashbee et al. | |
| 2019/0083989 A1 | 3/2019 | Tran et al. | |
| 2019/0152698 A1 | 5/2019 | Zhao | |
| 2020/0001389 A1 | 1/2020 | Ryan et al. | |
| 2020/0147617 A1 | 5/2020 | Atkinson et al. | |
| 2020/0148604 A1 | 5/2020 | Atkinson et al. | |
| 2020/0353473 A1 | 11/2020 | Hayman et al. | |
| 2020/0353474 A1 | 11/2020 | Crepeau et al. | |
| 2021/0039109 A1* | 2/2021 | Hoen | B09B 3/00 |
| 2021/0355045 A1* | 11/2021 | Morehead | C05F 17/986 |
| 2022/0147953 A1* | 5/2022 | Audino | G07C 9/28 |
| 2022/0242799 A1 | 8/2022 | Ying et al. | |
| 2022/0347693 A1 | 11/2022 | Hayman et al. | |
| 2023/0142555 A1 | 5/2023 | Hotte et al. | |
| 2023/0149939 A1 | 5/2023 | Crepeau et al. | |

FOREIGN PATENT DOCUMENTS

| | | |
|---|---|---|
| JP | 2006255592 | 9/2006 |
| KR | 19980047631 | 9/1998 |
| KR | 100692243 | 3/2007 |
| KR | 100694645 B1 | 3/2007 |
| KR | 100694646 B1 | 3/2007 |
| KR | 20090123375 | 12/2009 |
| KR | 101017615 B1 | 2/2011 |
| KR | 101017616 B1 | 2/2011 |
| KR | 101053035 B1 | 8/2011 |
| KR | 101332453 | 11/2013 |
| KR | 101461608 | 12/2014 |
| KR | 20160044110 | 4/2016 |
| KR | 101866863 | 6/2018 |
| KR | 300966490 S | 7/2018 |
| KR | 101882829 B1 | 8/2018 |
| KR | 101884662 B1 | 8/2018 |
| KR | 101921624 B1 | 11/2018 |
| KR | 101941620 | 1/2019 |
| KR | 301095230 S | 2/2021 |
| KR | 301109396 S | 5/2021 |
| KR | 301109397 S | 5/2021 |
| KR | 301109403 S | 5/2021 |
| KR | 301109404 S | 5/2021 |
| KR | 301140601 S | 12/2021 |
| KR | 301154947 S | 3/2022 |
| KR | 102474495 B1 | 12/2022 |
| KR | 301202238 S | 2/2023 |
| KR | 1020230060939 A | 5/2023 |
| KR | 301223966 S | 7/2023 |
| WO | WO2008030997 | 3/2008 |
| WO | WO2009157744 | 12/2009 |
| WO | WO2015182929 | 3/2015 |
| WO | WO2016060290 | 4/2016 |
| WO | WO2016102947 | 6/2016 |
| WO | WO2017083944 | 5/2017 |
| WO | WO2022055212 A1 | 3/2022 |

* cited by examiner

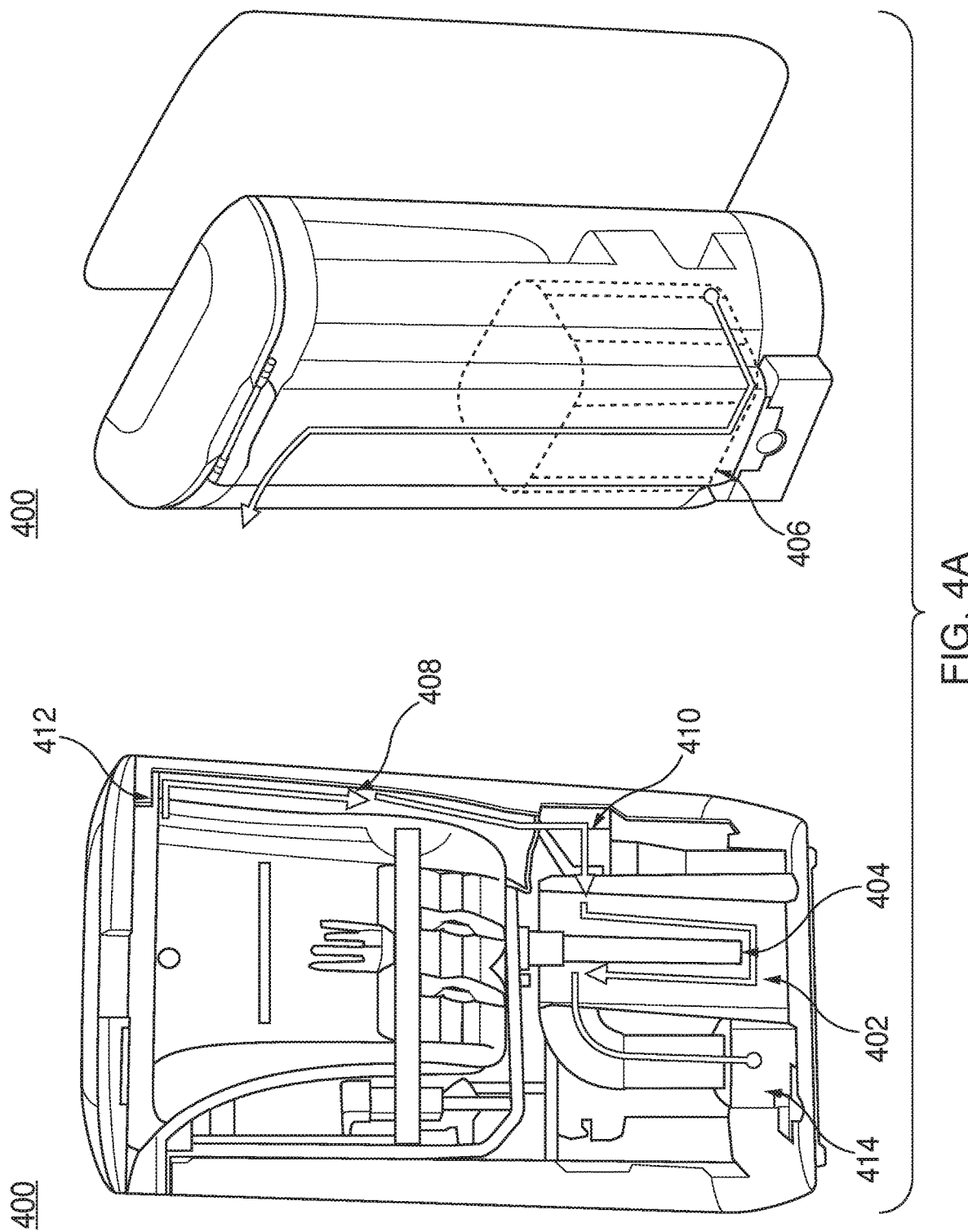

```
                          2400
                            ┌────────────────────────────────────────────────────────────────┐
                            │ RECEIVING A PLURALITY OF ORGANIC MATTER DATA SETS (OMDSs) FROM A PLURALITY │
                            │   OF MATTER GENERATORS AFFILIATED WITH A MATTER COLLECTOR, WHEREIN EACH   │
                            │        OF THE PLURALITY OF MATTER GENERATORS COMPRISES AN OMPA            │
                            │                    TO CONVERT OMPA INPUT INTO                             │
                            │   OMPA OUTPUT AND COLLECT DATA FOR POPULATING AN OMDS        2410         │
                            └────────────────────────────────────────────────────────────────┘
                                                            │
                                                            ▼
                            ┌────────────────────────────────────────────────────────────────┐
                            │     PROCESSING THE PLURALITY OF OMDSs TO PRODUCE DERIVED DATA             │
                            │                              2420                                         │
                            └────────────────────────────────────────────────────────────────┘
                                                            │
                                                            ▼
                            ┌────────────────────────────────────────────────────────────────┐
                            │           PROVIDING THE DERIVED DATA TO THE MATTER COLLECTOR.             │
                            │                              2430                                         │
                            └────────────────────────────────────────────────────────────────┘
                                                            │
                                                            ▼
                            ┌────────────────────────────────────────────────────────────────┐
                            │   RECEIVING A CHART OF ACCOUNTS FROM THE MATTER COLLECTOR, THE CHART      │
                            │     OF ACCOUNTS COMPRISING A LIST OF ALL MATTER GENERATORS HAVING         │
                            │    AN ACCOUNT WITH THE MATTER COLLECTOR, INCLUDING NON-PARTICIPATING      │
                            │         MATTER GENERATORS THAT DO NOT HAVE A OMPA THAT                    │
                            │   TRANSMITS AN OMDS AND THE PLURALITY OF MATTER GENERATORS THAT           │
                            │              DO TRANSMIT AN OMDS                          2440            │
                            └────────────────────────────────────────────────────────────────┘
                                                            │
                                                            ▼
                            ┌────────────────────────────────────────────────────────────────┐
                            │    BASED ON THE PLURALITY OF OMDSs RECEIVED FROM THE PLURALITY OF MATTER  │
                            │   GENERATORS AND THE CHART OF ACCOUNTS, CALCULATING A MISSED OPPORTUNITY  │
                            │     VALUE REPRESENTING A QUANTITY OF ORGANIC MATTER BEING GENERATED       │
                            │          BY THE NON-PARTICIPATING MATTER GENERATORS       2450            │
                            └────────────────────────────────────────────────────────────────┘
                                                            │
                                                            ▼
                            ┌────────────────────────────────────────────────────────────────┐
                            │    INCLUDING THE MISSED OPPORTUNITY VALUE INTO THE DERIVED DATA           │
                            │                              2460                                         │
                            └────────────────────────────────────────────────────────────────┘
```

RECEIVING A PLURALITY OF ORGANIC MATTER DATA SETS (OMDSs) FROM A PLURALITY OF MATTER GENERATORS, WHEREIN EACH OF THE PLURALITY OF MATTER GENERATORS COMPRISES AN OMPA OPERATIVE TO CONVERT OMPA INPUT INTO OMPA OUTPUT COLLECT DATA FOR POPULATING A OMDS, WHEREIN THE OMPA SPECIFIES AN OMPA OUTPUT READY STATUS    2510

PROCESSING THE PLURALITY OF OMDSs TO PRODUCE DERIVED DATA
2520

PROVIDING THE DERIVED DATA TO A PARTNER ENTITY OPERATIVE TO MAKE ARRANGEMENTS TO RETRIEVE OMPA OUTPUT FROM A PARTICULAR MATTER GENERATOR WHEN THE OMPA OUTPUT READY STATUS IS SET TO A RETRIEVAL READY STATE    2530

FIG. 25

NETWORK-CONNECTED APPARATUS PROMOTING ENVIRONMENTALLY RESPONSIBLE PROCESSING AND DISPOSITION OF ORGANIC MATTER DATA

CROSS-REFERENCE TO A RELATED APPLICATION

This patent application claims the benefit of U.S. Provisional Application No. 63/239,852, filed Sep. 1, 2021, and U.S. Provisional Application No. 63/314,087, filed Feb. 25, 2022, the disclosures of which are incorporated herein in their entireties.

TECHNICAL FIELD

This patent specification relates to systems and methods for communicating organic matter data, and more particularly to obtaining organic matter data from an organic matter processing apparatus and communicating the organic matter data.

BACKGROUND

The terms "waste management" and "matter disposal" may be used to refer to the activities required to manage generation, transport, treatment, and disposal of waste loads or matter, together with monitoring the process to ensure compliance with related ordinances, rules, and laws. Waste loads can include any combination of matter such as food matter, mixed organics, yard waste, recyclables, and inorganics. Landfills represent the oldest form of waste management.

When food matter is deposited in landfills, the food matter degrades into methane—a powerful greenhouse gas—without oxygen. These harmful emissions can be avoided by diverting food matter from landfills. Some countries have even made legislative efforts to reduce the amount of food matter that ends up in landfills. South Korea, for example, passed a law in 2013 that not only required food matter be discarded in biodegradable bags, but also imposed a fee based on the weight of food matter to be discarded.

Collection agencies such as city, municipality, county, or private contractors typically collect waste loads according to a fixed schedule. The collection agencies follow this schedule irrespective of whether bins are full or not. When the waste load is collected, it is weighed in bulk, and assumptions are made as to contents of the waste load. For example, the Environmental Protection Agency (EPA) provides percentage estimates for a given load of waste. As a specific example, the EPA states that thirty percent of a waste load may contain organic matter. This is a crude and inaccurate way to measure the composition of a waste load. With promulgation of laws requiring proper disposal of food matter and a general desire to eliminate climate altering gasses such as methane, there is a need for an improved way to determine composition of waste loads and to provide incentives to handle food matter differently.

BRIEF SUMMARY

Embodiments disclosed herein provide various systems and methods for obtaining organic matter data related to the processing of food matter and/or mixed organics in an organic matter processing apparatus (hereinafter "OMPA"). The OMPA can convert organic inputs into a ground and selectively desiccated product. The organic matter data can include, for example, mass values, water content values, timestamps, account numbers, other quantifiable metrics, and other identifying information. The organic matter data can be used according to many different embodiments. For example, in one embodiment, the organic matter data can be provided to a central system that processes the organic matter data for use by a third party such as a matter collector or an end user of the ground and selectively desiccated product. In another example, the organic matter data can be presented to a user of the OMPA.

A further understanding of the nature and advantages of the embodiments discussed herein may be realized by reference to the remaining portions of the specification and the drawings.

BRIEF DESCRIPTION OF THE DRAWINGS

FIG. 4A includes isometric front and rear perspective views of an OMPA processor where the durable housing is transparent to show additional details.

FIGS. 23-28 show different processes according to different embodiments.

Figure 1:
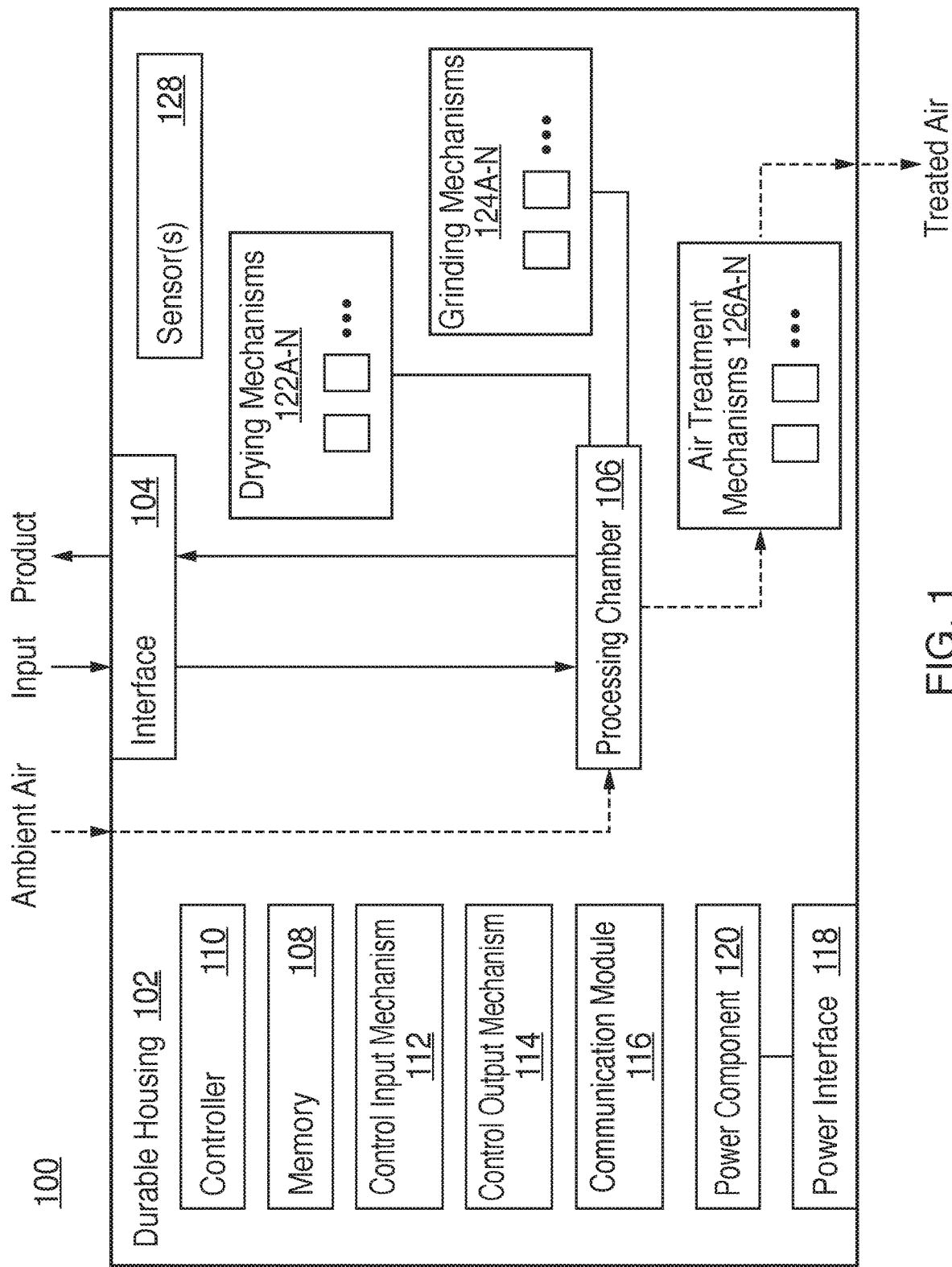
FIG. 1 includes a high-level illustration of an OMPA in accordance with various embodiments.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS™ refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS™ OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS™ may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable.

The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

Figure 1A:
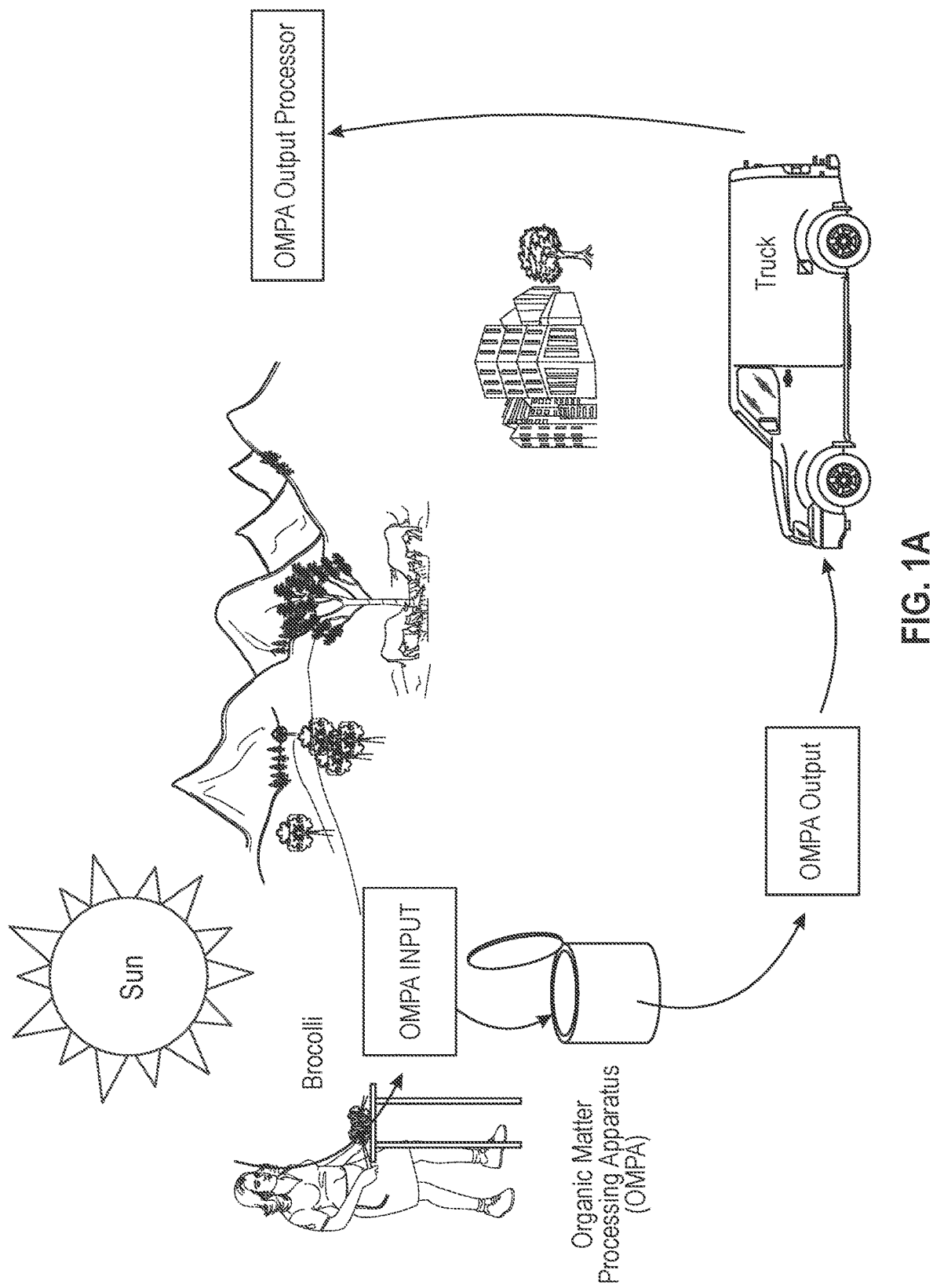
FIG. 1A shows a graphical illustration of a matter generation and remediation cycle according to an embodiment.

FIG. 1A shows a graphical illustration of an organic matter remediation cycle according to an embodiment. As shown, OMPA input is added to an OMPA, which converts the OMPA input to OMPA output. The OMPA output is collected and delivered to an OMPA output processor, effectively preventing the OMPA input from ending up in a traditional landfill and thereby reducing or eliminating generation of methane that would be generated if the OMPA input was placed in the landfill. Embodiments discussed herein provide information to various entities responsible for properly handling organic matter, provide alternative methods for handling organic matter in a manner that mitigates unnecessary methane generation in landfills, and provides methods for further processing OMPA output.

Figure 1B:
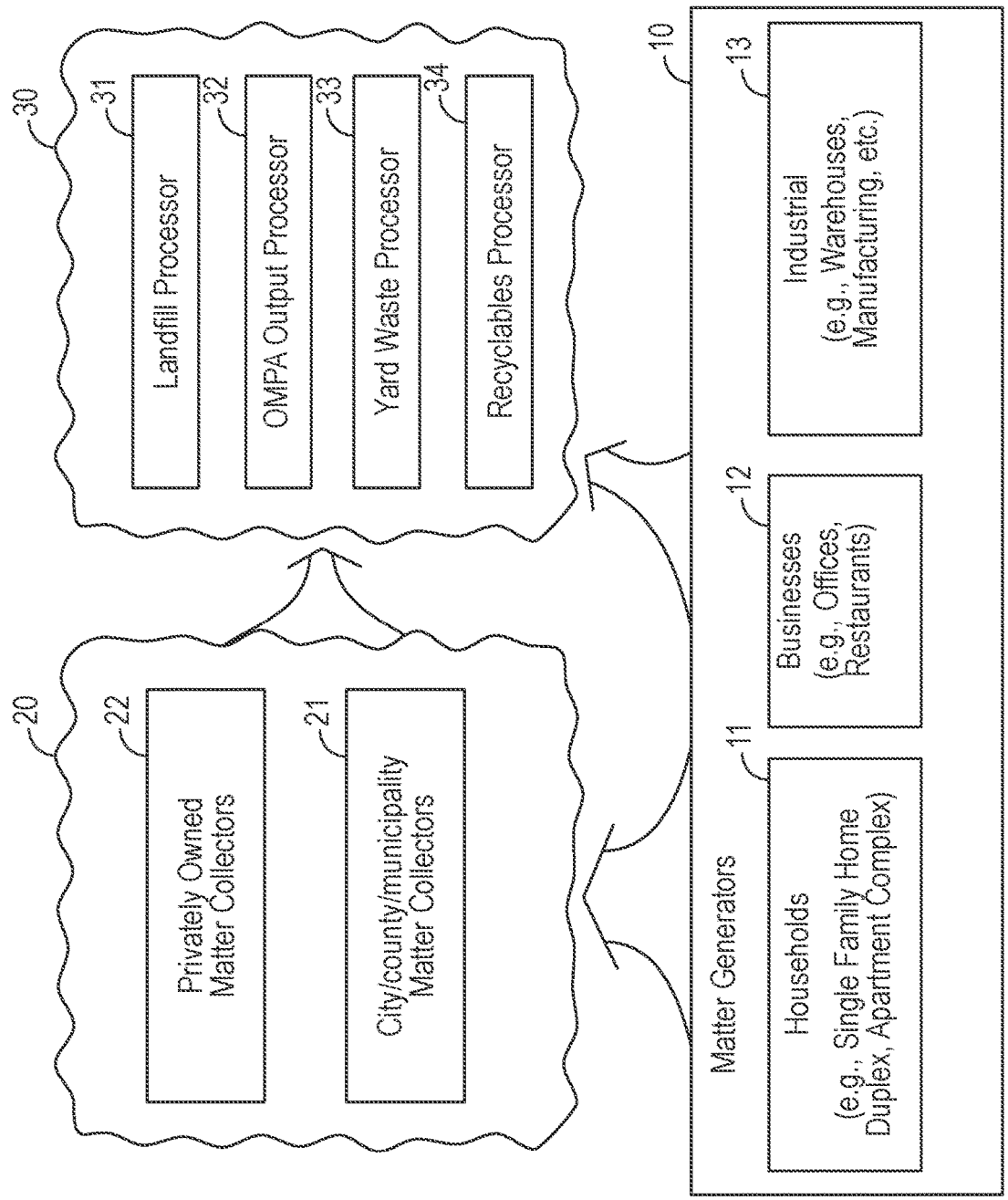
FIG. 1B shows illustrative matter management flow paths according to an embodiment.

FIG. 1B shows illustrative matter management flow paths according to an embodiment. One path includes matter generators 10, matter collectors 20, and matter processors 30. Another path eliminates matter collectors 20 and includes matter generators 10 and matter processors 30. Matter generators 10 can include any conceivable generator of matter, which can include non-processed matter, processed organics (i.e., OMPA output), or a combination of non-processed matter and processed organics. As shown, matter generators can be generically classified as household generators 11, business generators 12, and industrial generators 13. Household generators 11 can include, for example, single family homes, duplexes, apartment complexes, condos, co-ops, or any other type of residence. Business generators 12 can include, for example, office buildings, restaurants, shopping centers, sports arenas, theme parks, or any other non-industrial type of business or commercial enterprise. Industrial generators 13 can include, for example, warehouses, manufacturing facilities, food processing facilities, or any other relatively large-scale facility.

Matter collectors 20 can include any conceivable collector of matter. City/country/municipality matter collectors 21 may represent government run or appointed matter collectors that are responsible for collecting matter from generators 10. Privately owned matter collectors may represent private entities that collect matter from generators 10.

Matter retention sites 30 can include multiple different processors dedicated to handling specific types of matter. For example, landfill processor 31 can represent a generic "catch-all" processor for handling all matter. However, it is desirable to filter or sort matter to other processors that can more efficiently handle that particular matter. OMPA output processor 32 may handle OMPA output that has been collected. Yard waste processor 33 may handle yard waste. Recyclable processor 34 may handle recyclable materials. Any matter that cannot be handled by one of processors 32-34 may be handled by landfill processor 31. Separating food matter from other matter such as inorganic matter can be a significant hassle. As a result, roughly 95 percent of food matter is disposed in landfills. Food matter will degrade into methane as it rots in a landfill, however. As such, it would be beneficial to process food matter before it reaches the landfill, for example, into a shelf stable product that can be diverted from the landfill and used for another purpose.

Introduced here are systems that are adapted for use in matter management and, more specifically, systems that are designed to convert OMPA input into OMPA output. OMPAs can process OMPA input in an automated and intelligent manner to create OMPA output. As further discussed below, an OMPA can neutralize food matter and mixed organics by drying and processing (e.g., grinding) it into a ground and selectively desiccated product that is suitable for further processing at a later date.

In contrast to compost that is commonly prepared by decomposing food matter, the OMPA output produced by the OMPA may still have food value (also referred to as "nutritional value"). At a high level, the OMPA output is comprised of small fragments of dried processed organics that have a roughly similar consistency throughout. Accordingly, the OMPA output could be used in various ways. For example, the OMPA output could be given to domestic animals (e.g., livestock) as animal feed. As another example, the OMPA output could be deposited into a garden for decomposition into compost. The OMPA output could also be introduced into conventional composting workflows, for example, through deposition into a compost bin that is emptied on a periodic basis.

As further discussed below, one notable benefit of the OMPA output is its weight and form. To participate in a conventional composting workflow, individuals have historically had to deposit food matter into dedicated containers (referred to as "compost bins"). The food matter that is deposited into these compost bins will occupy significant amounts of space, however. Moreover, the food matter in these compost bins may quickly decompose into a much wetter form. Together, these problems can make participation in the conventional composting workflow a burden. By processing food matter and mixed organics in the manner described below, an OMPA can produce a product that is not only easier to handle (e.g., transport, store, or use), but is also more shelf stable over long intervals of time due to the relative absence of water.

Overview of Organic Matter Processing Apparatus

Figure 2B:
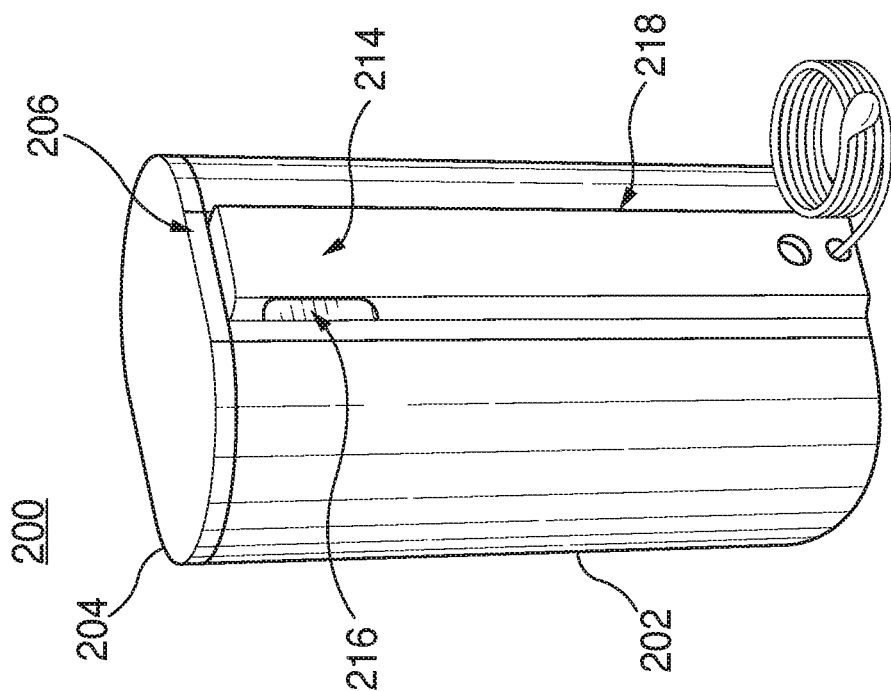
FIG. 2B includes another perspective view of the OMPA with the lid in an open position.
Figure 2A:
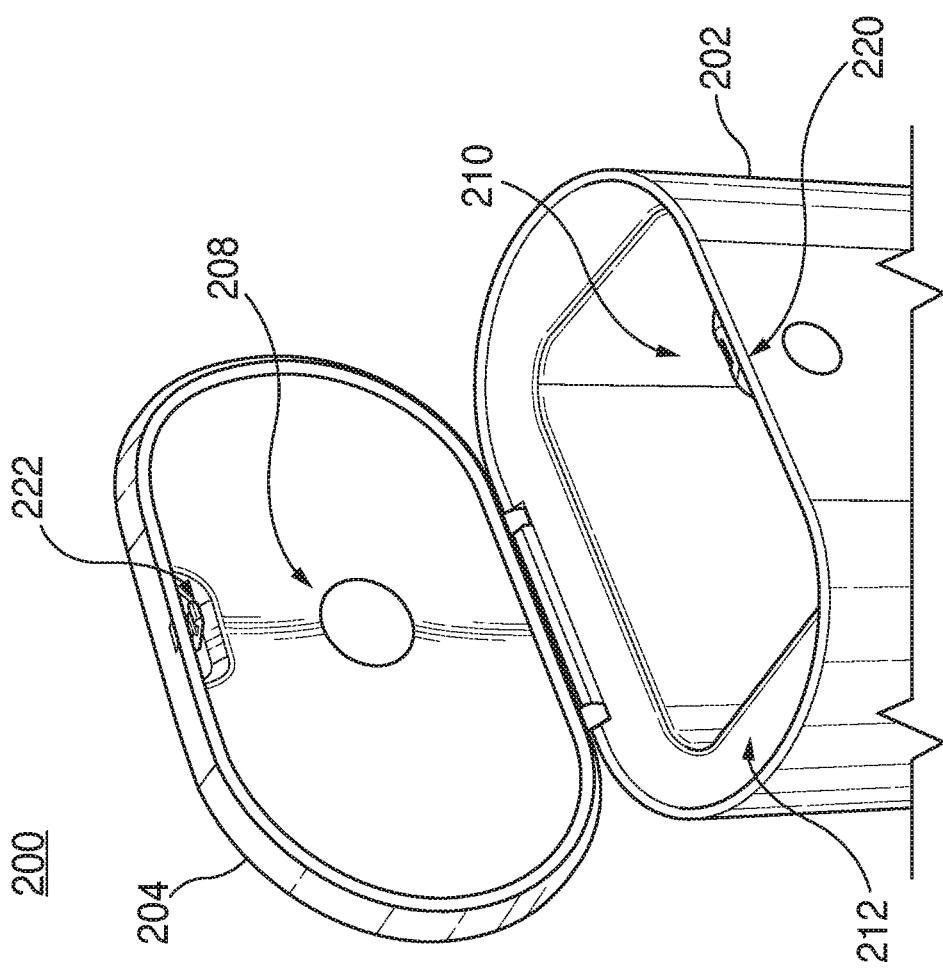
FIG. 2A includes a perspective view of an OMPA that includes a lid in a closed position.

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, the durable housing 102 may take the form of a roughly cylindrical container that has an aperture along its top end.

Instructions for operating OMPA 100 may be stored in a memory 108. The memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the controller 110, the memory 108 can also store data that is generated by OMPA 100. For example, values generated by one or more sensors 128 included in OMPA 100 may be stored in the memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that the memory 108 is merely an abstract representation of a storage environment. The memory 108 could be comprised of actual integrated circuits (also referred to as "chips"). When executed by a controller 110, the instructions may specify how to control the other components of OMPA 100 to produce OMPA output from OMPA input in the processing chamber 106. The controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into the processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 11. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, Wi-Fi®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, the power interface 118 may allow power to be received from a source external to the durable housing 102. In addition to the power interface 118, OMPA 100 may include a power component 120 that can store power received at the power interface 118. The power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N and one or more grinding mechanisms 124A-N. The drying mechanisms 122A-N are discussed in greater detail below with reference to FIGS. 2A-4, while the grinding mechanisms 124A-N are discussed in greater detail below with reference to FIG. 6. The drying mechanisms 122A-N are responsible for desiccating the OMPA input. Desiccation may not only allow the OMPA input easier to process (e.g., grind), but also may prevent the formation of mold that thrives in humid conditions. Examples of drying mechanisms include heating elements that reduce moisture by introducing heat and fans that reduce moisture by introducing an airflow. Meanwhile, the grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. By working in concert, the drying and grinding mechanisms 122A-N, 124A-N can convert OMPA input into a more stable product as further discussed below.

Moreover, air may be drawn from the ambient environment into the durable housing 102 and then expelled into the processing chamber 106 so as to help desiccate the OMPA input contained therein, as further discussed below with reference to FIGS. 2A-4. As shown in FIG. 1, air that is drawn from the processing chamber may be treated using one or more air treatment mechanisms 126A-N (also referred to as "air management mechanisms" or "air discharge mechanisms") before being released back into the ambient environment.

Other components may also be included in OMPA 100. For example, sensor(s) 128 may be arranged in various locations throughout OMPA 100 (e.g., along the path that the air travels through OMPA 100). The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116).

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside the processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside the processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of the lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The intake vent is further discussed below with reference to FIGS. 3A-B. The bezel 212 may extend around a periphery of the durable housing 202 to "frame" the aperture through which OMPA input can be deposited in the processing chamber 210. The exhaust hood may be partially or fully obstructed when the bezel 212 is installed within the durable housing 202. Here, for example, the exhaust hood is fully obstructed by the bezel 212, and therefore cannot be easily viewed while the bezel 212 is installed within the durable housing 202.

As further discussed below, a user may need to remove the bezel 212 in order to remove the processing chamber 210 from the durable housing 202. To remove the bezel 212, the user may grasp a structural feature 220 (referred to as a "lip") that allows the bezel 212 to be readily removed by hand. The structural feature 220 may also serve other purposes. For example, the structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of the processing chamber 210 are hot.

Figure 3A:
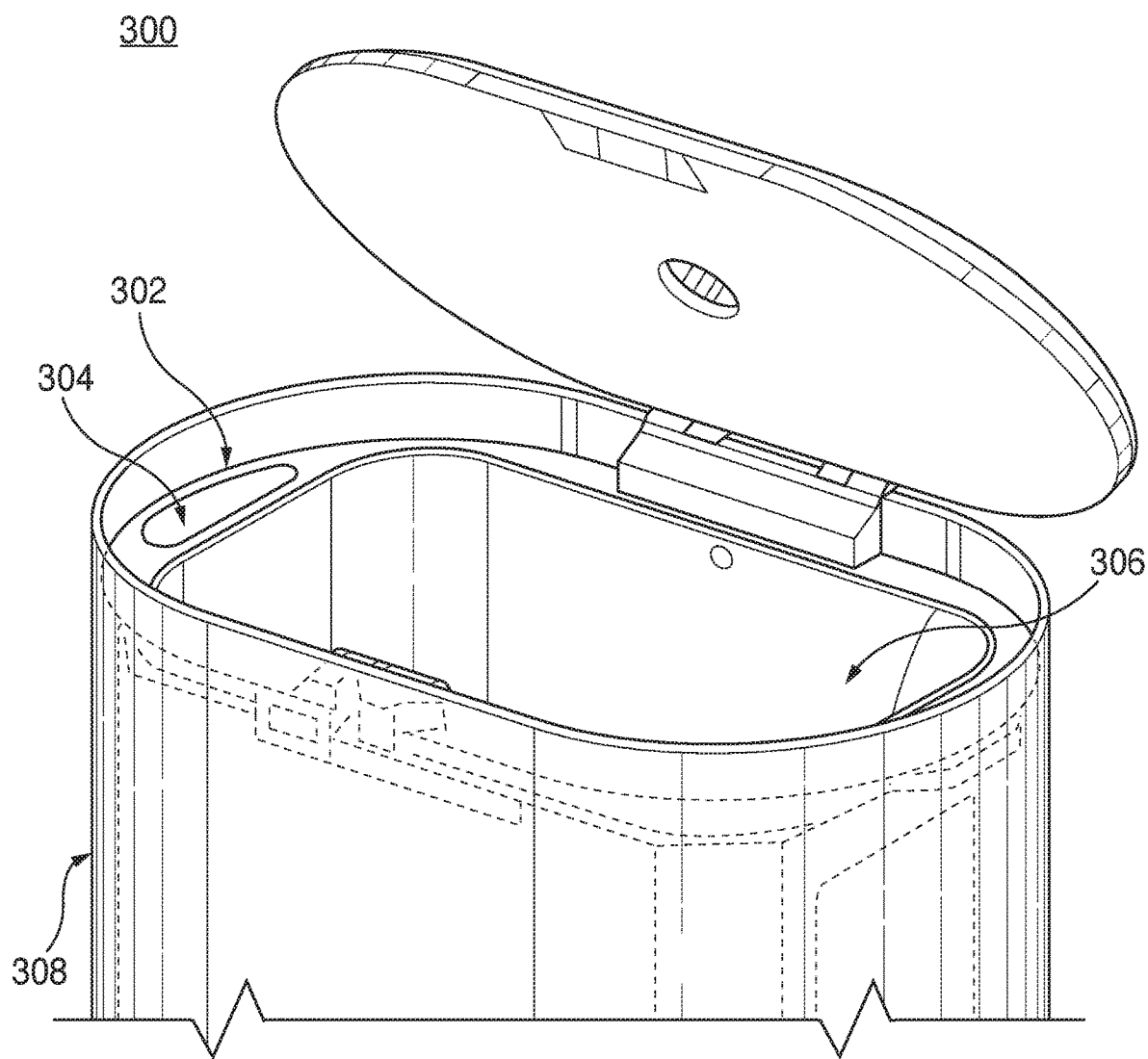
FIG. 3A includes a perspective view of an OMPA without its bezel to illustrate one possible location for the exhaust hood that extends over an intake vent.

Removal of the bezel 212 may expose the exhaust hood as mentioned above. FIG. 3A includes a perspective view of OMPA 300 without its bezel to illustrate one possible location for the exhaust hood 302 that extends over a used-air intake vent. As further discussed below, the processing chamber 306 of OMPA 300 may be representative of a receptacle that can be removably installed within a cavity that is defined by an interior surface of the durable housing 308. Normally, the exhaust hood 302 is located along the interior surface such that, when the receptable is installed within the cavity, the used-air intake vent is positioned proximate to an upper end of the receptable. Said another way, the exhaust hood 302 may be positioned so that the used-air intake vent is not obstructed when the receptacle is installed within the cavity in the durable housing 308.

At a high level, the exhaust hood 302 may be designed to guide or direct air from the processing chamber 306 through the used-air intake vent for treatment and then release into the ambient environment. A filter 304 may be installed in the used-air intake vent to prevent large fragments of OMPA input or product from entering the odor treatment system. This filter 304 may be removable. Accordingly, a user may be able to remove the filter 304 (e.g., for cleaning purposes), or the user may be able to replace the filter 304.

Figure 3B:
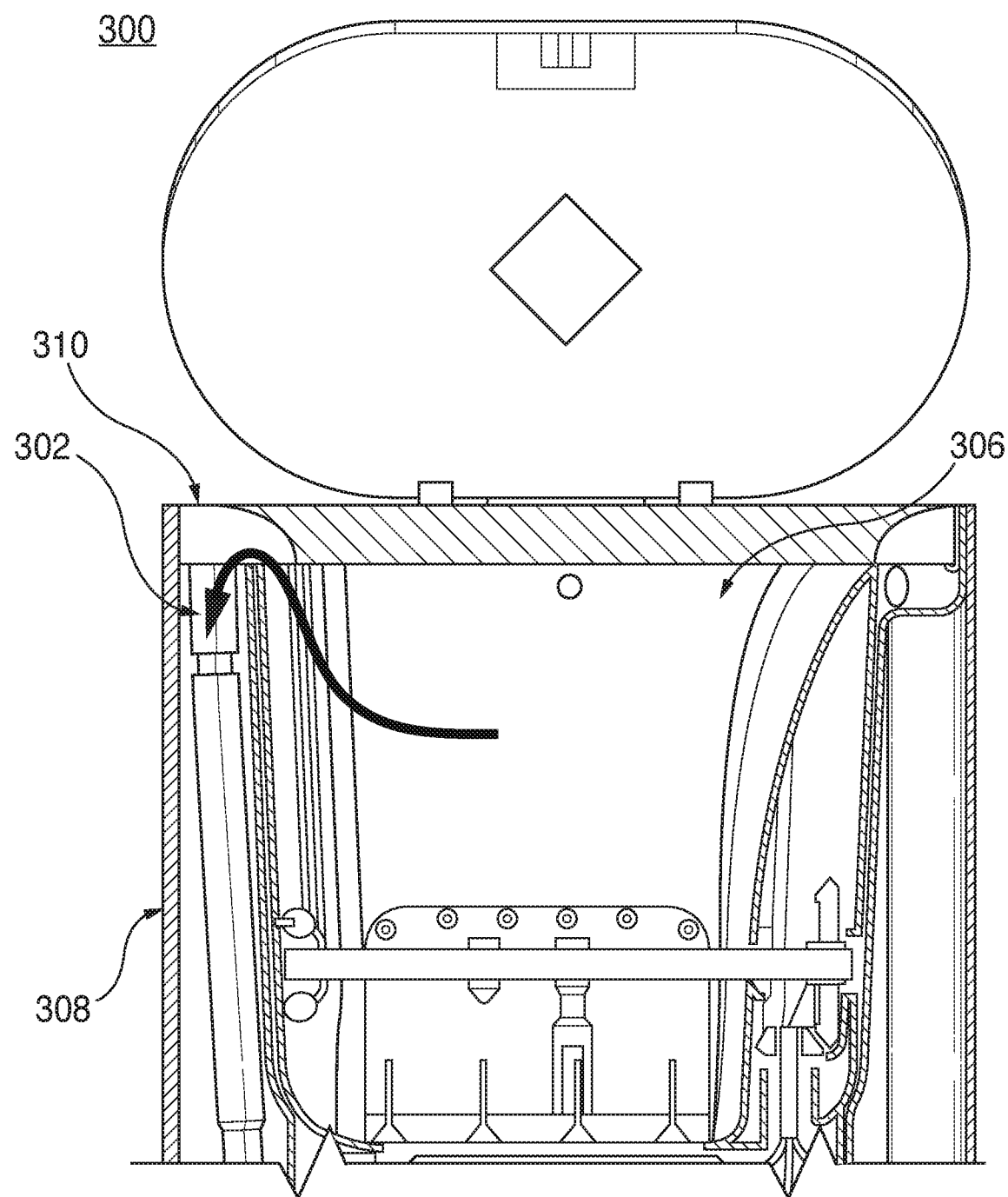
FIG. 3B illustrates how, when the bezel is installed in the OMPA, air in the processing chamber can flow underneath the bezel into a space above the edge of the receptacle and then downward through the used-air intake vent.

FIG. 3B illustrates how, when the bezel 310 is installed in OMPA 300, air in the processing chamber 306 can flow underneath the bezel 310 into a space above the edge of the receptacle and then downward through the used-air intake vent. Air that is removed from the processing chamber 306 through the used-air intake vent can be routed through an odor treatment system (not shown) of OMPA 300 for treatment, as further discussed below with reference to FIG. 4A. Then, the treated air can be expelled from OMPA 300 into the ambient environment. Referring again to FIG. 2, the treated air may be expelled through one or more air egress openings (or simply "openings") located along an interior surface of a mechanical feature 214. The interior surface of the mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of the durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air-which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, the vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

FIG. 4A includes isometric front and rear perspective views of OMPA 400 where the durable housing is transparent to show additional details. In FIG. 4A, a trace is shown to indicate the route that air drawn from the processing chamber (e.g., through the exhaust hood 302 of FIG. 3) traverses before exiting OMPA 400. There are two main chambers through which the air is guided as it traverses the route.

First, the air is guided through a photolysis chamber 402. In the photolysis chamber 402, the air is exposed to light emitted by a light source 404 that is meant to cause the decomposition or separation of odor-causing molecules. The light source 404 may be, for example, an ultraviolet (UV) bulb or UV light-emitting diode (LED).

Second, the air is guided through a dry media chamber 406. In the dry media chamber 406, the air is exposed to dry media that is meant to trap odor-causing molecules through a process referred to as adsorption. Examples of dry media include charcoal, coconut shell carbon, and manganese dioxide. In addition to acting as an odor destructor, the dry media may also act as an ozone destructor. Ozone may be generated by the light source 404 in the photolysis chamber 402, and the dry media may help to destroy that ozone.

In some embodiments, the durable housing includes a pivotable door that permits access to the dry media chamber 406. By opening the pivotable door, a user may be able to easily replace the dry media in the dry media chamber 406. For example, the user may remove existing canisters and then reinstall new canisters that have loose granules, disks, or other particulates of the dry media stored therein. Such a design allows the dry media to be replaced whenever necessary.

Following treatment in the dry media chamber 406, the air may rise upward through the vertical pillar along the rear side of the OMPA 400 that acts as a plenum. Then, the air can be expelled into the ambient environment through opening(s) located near the upper end of the vertical pillar as discussed above with reference to FIG. 2B.

Accordingly, air may initially be drawn through a used-air intake vent 412 into a channel 408 by a second fan 410 (also referred to as a "blower fan") that is located in or near the channel 408. The used-air intake vent 412 is the same used-air intake vent as mentioned above with reference to FIGS. 2-3. The air can then be directed into the photolysis chamber 402. Air leaving the photolysis chamber 402 can be directed into the dry media chamber 406. In some embodiments, the air is heated by a heater 414 before it enters the dry media chamber 406 in order to decrease moisture. This may help lengthen the lifespan of the dry media in the dry media chamber 406. After the air has been treated in the photolysis and dry media chambers 402, 406—which collectively represent the odor treatment system—the air can be guided upward through the vertical pillar that acts as a plenum, and then the air can be expelled into the ambient environment. As mentioned above, the air could be expelled through opening(s) along the rear surface of the durable housing.

The first fan included in the lid of OMPA 400 and the second fan 410 situated in the odor treatment system of the OMPA 400 may have variable speeds. Accordingly, a controller (e.g., controller 110 of FIG. 1) may be able to easily change the speed of the first and second fans. However, to ensure that air is drawn through the used-air intake vent 412, the second fan 410 may be driven at a higher speed than the first fan. Driving the second fan 410 at a higher speed than the first fan will result in a pressure differential that causes air to be advantageously drawn through the used-air intake vent 412.

Figure 4B:
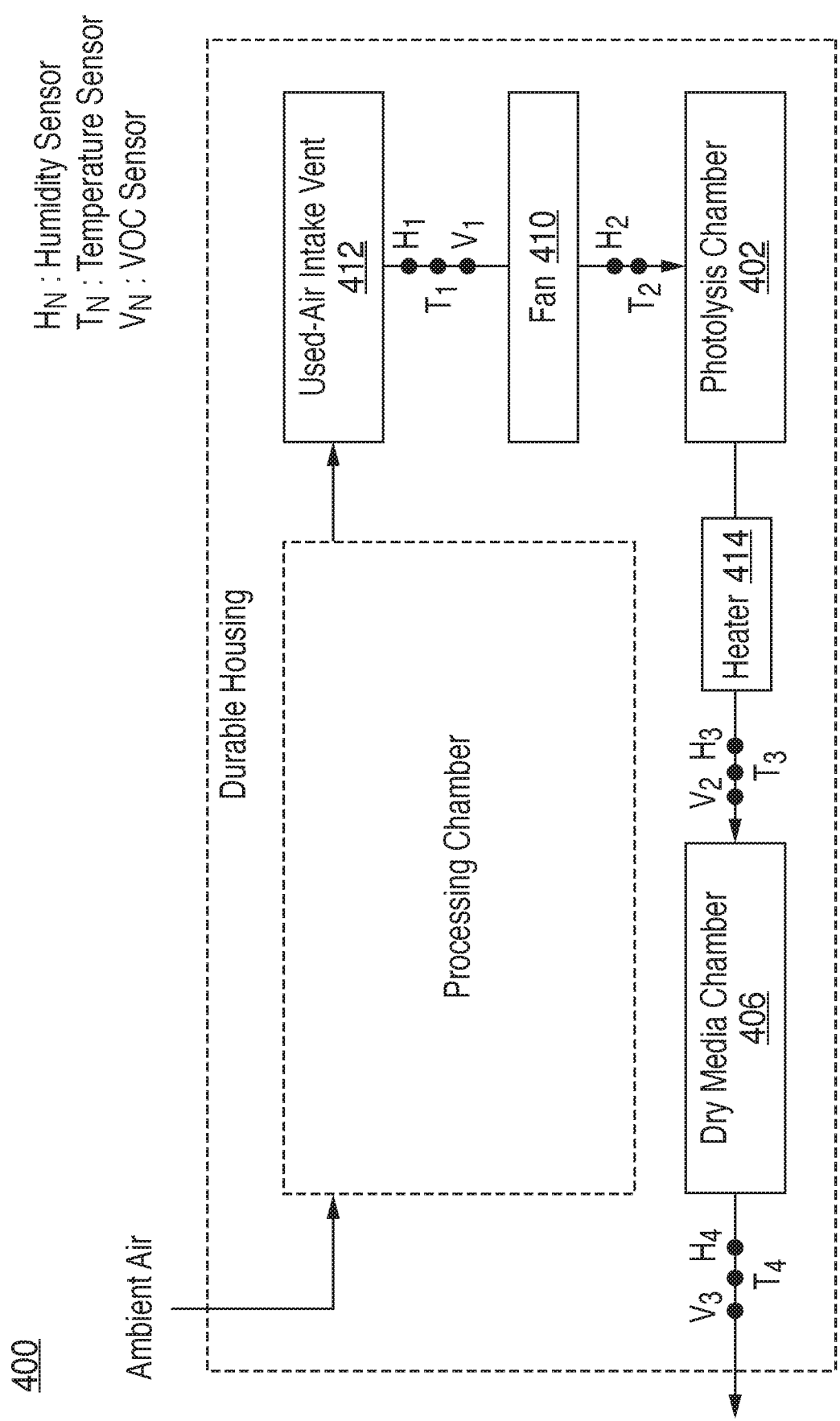
FIG. 4B includes a conceptual diagram that identifies possible locations for different types of sensors.

In order to gain insights in the nature of the air as it travels through OMPA 400, one or more sensors may be located along the route indicated by the trace. FIG. 4B includes a conceptual diagram that identifies possible locations for different types of sensors. Note that the selection and placement of sensors in FIG. 4B is provided for the purpose of illustration, and some or all of these sensors could be included in OMPA 400. For example, sensors able to measure temperature and humidity may be located proximate to the intake vent 412, the entry of the photolysis chamber 402, the channel interconnected between the photolysis and dry media chambers 402, 406, the exit of the dry media chamber 406, or any combination thereof. As another example, a sensor able to measure ozone may be located in the channel 408 leading to the photolysis chamber 402 and/or the channel interconnected between the photolysis and dry media chambers 402, 406. As another example, a sensor able to measure volatile organic compounds (VOCs) may be located along the route. If the VOC sensor is located before the photolysis chamber 402, its measurements may be used to monitor variations in odor across the lifetime of the OMPA 400. Meanwhile, if the VOC sensor is located after the photolysis chamber 402, its measurements may be used to determine the degree to which the dry media chamber 406 is responsible for destroying odor. Said another way, measurements produced by a VOC sensor located after the photolysis chamber 402 could be a useful indicator of the expected lifetime of the dry media in the dry media chamber 406. Other measurement dimensions that may be monitored by sensor(s) include carbon dioxide (CO2), carbon monoxide (CO), dioxygen (O2), hydrogen sulfide (H2S), nitrogen dioxide (NO2), potential of hydrogen (pH), and salinity.

Because the sensors are located along the route indicated by the trace, the odor treatment system may be able to operate as a closed loop system. The term "closed loop system," as used herein, is meant to describe a system that is able to dynamically adjust its activities based on feedback to achieve a desired goal. For instance, measurements generated by VOC sensors located along the route indicated by the trace may influence how a controller (e.g., the controller 110 of FIG. 1) controls different components of the OMPA 400. As an example, if measurements generated by a VOC sensor (e.g., V2 or V3 in FIG. 4B) located after the photolysis chamber 402 indicate that the air still has a relatively high concentration of an undesired gas, then the controller may adjust the speed of the second fan 410 so as to change the amount of time that the air remains in the photolysis and dry media chambers 402, 406. The measurements generated by VOC sensors could also be used to infer the condition of the photolysis and dry media chambers 402, 406. Assume, for example, that a VOC sensor is located between the photolysis chamber 402 and dry media chamber 406 as shown in FIG. 4B. In such a scenario, measurements generated by the VOC sensor may be used to predict the state of the dry media included in the dry media chamber 406. Said another way, measurements generated by the VOC sensor may be used to infer the amount of undesired gasses to which the dry media contained in the dry media chamber 406 has been exposed. Rather than simply instruct a user to replace the dry media on a periodic basis (e.g., every month, two months, or three months), an OMPA could instead intelligently indicate when replacement is necessary based on an analysis of measurements generated by the VOC sensor.

While sensors could be located at various positions along the route, sensors generally should not be installed in the photolysis chamber 402. As mentioned above, the light source 402 located in the photolysis chamber 402 may generate ozone as it emits light. This ozone can have a significant oxidative effect on various sensors. As such, sensors are generally not installed in the photolysis chamber 402.

One or more sensors could also be installed inside the processing chamber, for example, to measure characteristics of the air above the OMPA input (i.e., air in the "headspace" of the processing chamber), For example, sensors could be located along the interior surface of the lid, or sensors could be located along the interior surface of the processing chamber.

Additional sensors could also be located along the route indicated by the trace shown in FIG. 4A. For example, OMPA 400 may include a tachometer that measures the rotation speed of the shift of the second fan 410. Values output by the tachometer may be used (e.g., by the controller 110 of FIG. 1) to predict the speed at which the airflow is traveling through the OMPA 400, and therefore how to control other components (e.g., the drying and grinding mechanisms 122A-N, 124A-N of FIG. 1) of OMPA 400. Additionally or alternatively, OMPA 400 may include a dedicated sensor that is responsible for measuring the speed of the airflow, either directly or indirectly. For example, a hot wire anemometer may be situated along the route within the airflow. The hot wire anemometer may be electrically heated to some temperature above the ambient temperature. The airflow will cool the wire, and the speed of the airflow can be inferred based on the decrease in temperature. As another example, a pressure sensor may be situated along the route within the airflow. As the airflow contacts the pressure sensor, values indicative of the total force may be produced. The speed of the airflow can be inferred based on these values.

Practical Processing Chamber

Figure 5:
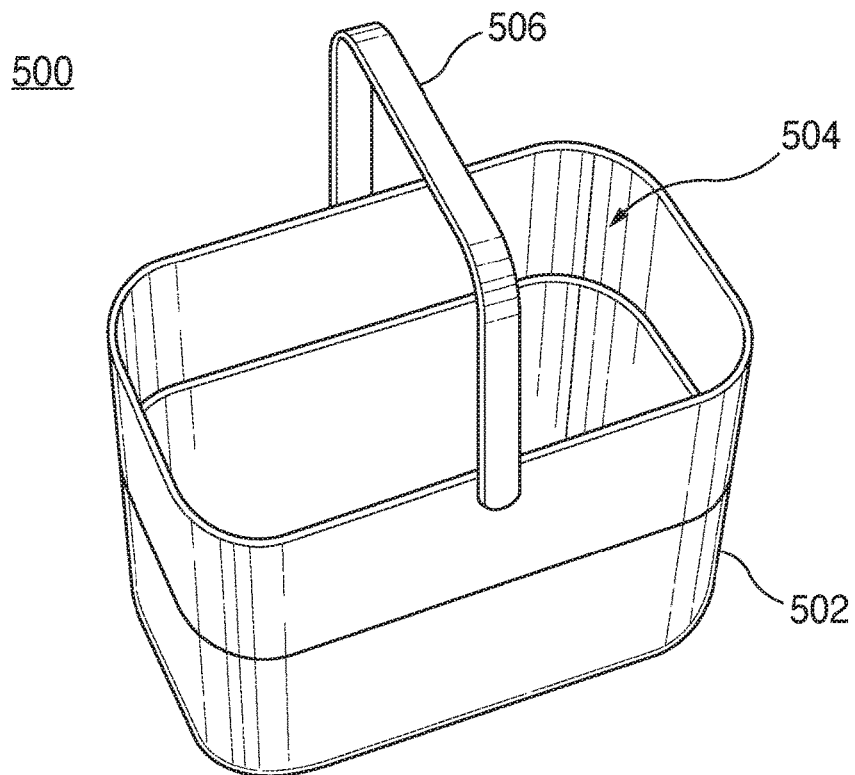
FIG. 5 includes a perspective view of a processing chamber that comprises a receptacle (also referred to as a "bucket") designed to fit securely within the durable housing of an organic matter processing apparatus.

Another core aspect of the OMPA is providing a processing chamber that not only allows OMPA input to be processed in a consistent, predictable manner, but is also easy to use by various individuals. FIG. 5 includes a perspective view of a processing chamber 500 that comprises a receptacle 502 (also referred to as a "bucket") designed to fit securely within the durable housing of an OMPA. The bucket 502 is preferably user-removable from the durable housing, so as to allow for easier integration into existing workflows. For example, the bucket 502 may be placed on the counter during food preparation and then reinstalled in the durable housing afterwards. As another example, the bucket 502 may be removed from the durable housing after production of the product is complete to allow for easier handling (e.g., disposal, storage, or use) of the product.

Generally, the bucket 502 is designed so that, when installed in the durable housing, OMPA input can be easily deposited by simply opening the lid of the OMPA. Normally, the bucket 502 includes an aperture 504 along its top end that is sized to allow for various forms of OMPA input. In some embodiments, the aperture 504 has a rectangular form that is 200-500 millimeters (mm) (7.87-19.68 inches) in length and 150-300 mm (5.90-11.81) in width. For example, the aperture 504 may have a length of roughly 350 mm (13.78 inches) and a width of roughly 200 mm (7.87 inches). Meanwhile, the bucket 502 may have a roughly prismatic form with a length of 250-500 mm (9.84-19.68 inches), a width of 100-300 mm (3.94-11.81 inches), and a height of 150-350 mm (5.90-13.78 inches). For example, the bucket 502 may have a length of roughly 320 mm (12.60 inches), a width of roughly 195 mm (7.68 inches), and a height of roughly 250 mm (9.84 inches).

Moreover, the bucket 502 may be designed to be easily washable (e.g., in a dishwasher). Thus, the bucket 502 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 5, a handle 506 may be pivotably connected to opposing sides of the bucket 502. Such a design allows the handle 506 to be pivoted downward when the bucket 502 is installed in the structural body of the OMPA. This can be seen in FIG. 2A, where the handle is folded downward to accommodate a bezel. Thus, the handle 506 may be designed so as to not impede the deposition of OMPA input into the bucket 502. The handle 506 may be designed to allow a user to easily carry the entire processing chamber 500, with either one or two hands. To ensure that the processing chamber 500 can be transported without issue, the bucket 502 may be designed so that, when loaded with product, the weight does not exceed a threshold. The threshold may depend on the size of the bucket 502 and/or the material(s) from which the bucket 502 is made, though it may be desirable to limit the weight to no more than 10-25 pounds (and preferably 15-20 pounds).

Figure 6:
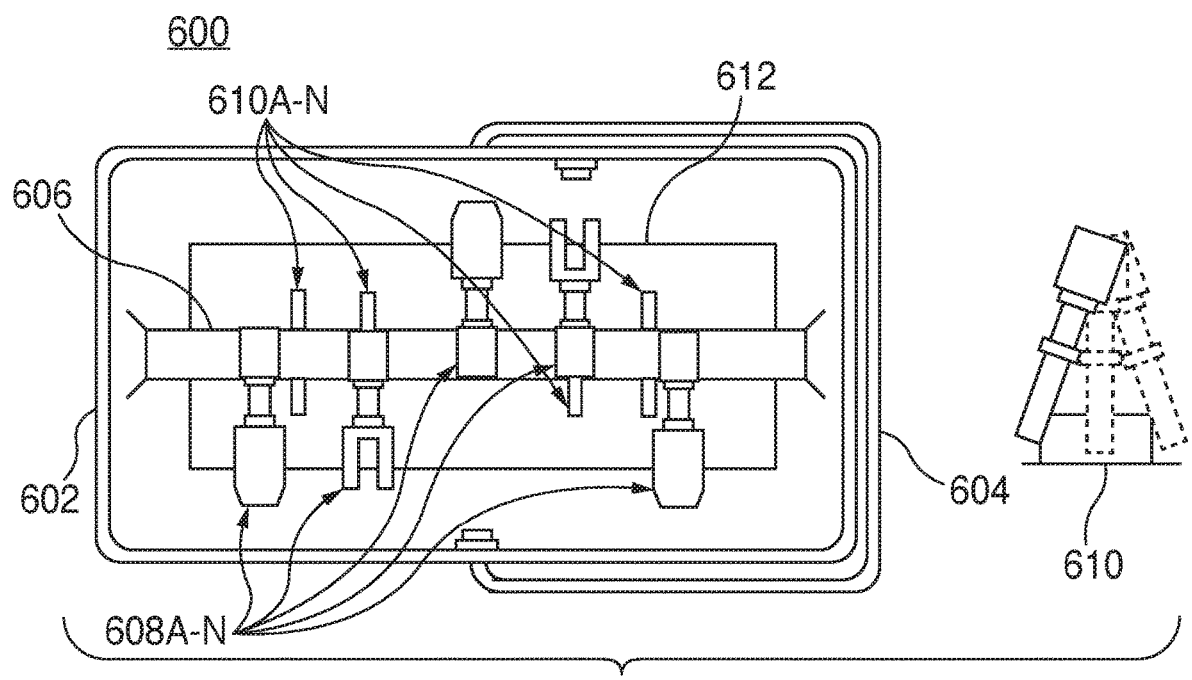
FIG. 6 includes a top view of a processing chamber that includes a bucket with a handle pivotably connected thereto.

FIG. 6 includes a top view of a processing chamber 600 that includes a bucket 602 with a handle 604 pivotably connected thereto. As mentioned above, an OMPA may include one or more grinding mechanisms 608A-N that are responsible for cutting, crushing, or otherwise separating OMPA input deposited into the bucket 602 into fragments. The grinding mechanisms 608A-N may be part of the processing chamber 600 as shown in FIG. 6. Here, for example, five grinding mechanisms are fixedly attached to a central rod 606 that is arranged horizontally across the width of the bucket 602 and is driven by gears (not shown), which are in turn driven by a motor (not shown). The motor may be located in the durable housing, while the gears may be located in the bucket 602 as further discussed with reference to FIG. 7.

The grinding mechanisms 608A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in the bucket 602. For example, the appropriate amount of grinding may be based on the amount of OMPA input (e.g., as determined based on measurements output by a mass sensor) contained in the bucket 602. As another example, the appropriate amount of grinding may be based on the amount of resistance that is experienced by the grinding mechanisms 608A-N. Generally, dried OMPA input that has been at least partially ground will offer less resistance than wet OMPA input or dried OMPA input that has not been ground.

As the central rod 606 rotates, the grinding mechanisms 608A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of the bucket 602 to be brought toward the top of the bucket 602, such that all OMPA input contained in the bucket 602 is occasionally exposed to the downward airflow emitted from the lid.

The grinding mechanisms 608A-N may not provide sufficient shear on their own to break apart more solid OMPA input. Examples of solid OMPA input include bones, raw produce, and the like. To address this issue, the bucket 602 may include one or more stationary blades 610A-N that can work in concert with some or all of the grinding mechanisms 608A-N. Assume, for example, that the processing chamber 600 includes at least one paddle and at least one two-prong rotating blade. In FIG. 6, the processing chamber 600 includes three paddles and two two-prong rotating blades that are alternately arranged along the length of the central rod 606. In such an embodiment, the stationary blades 610A-N may be positioned so that as each two-prong rotating blade rotates, a corresponding stationary blade will pass through its two prongs to create cutting action. A side view of this scenario is shown in FIG. 6. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 610, thereby providing less shear.

Generally, more than one type of grinding mechanism is included in the processing chamber 600. For example, paddles and rotating blades could be arranged in an alternating pattern across the width of the bucket 602 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 6, the paddles and rotating blades are shown to be coplanar-though extending from opposing sides of the central rod 606—for the purpose of illustration. The grinding mechanisms 608A-N could be radially arranged about the periphery of the central rod 606 in different ways. For example, the three paddles shown in FIG. 6 could be equally spaced about the circumference of the central rod 606 to ensure that OMPA input contained in the bucket 602 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 610 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 602 includes a thermally conductive base portion 612 that is responsible for conveying heat to the OMPA input. Normally, the thermally conductive base portion 612 may extend up the longitudinal sidewalls of the bucket 602 that are parallel to the central rod 606. In embodiments where the thermally conductive base portion 612 is responsible for heating the OMPA input, the thermally conductive base portion 612 may extend up the longitudinal sidewalls roughly 40-70 percent of their height. In embodiments where the thermally conductive base portion 612 is responsible for heating the OMPA input and air in the "headspace" of the processing chamber 600, the thermally conductive base portion 612 may extend up the longitudinal sidewalls roughly 70-90 percent of their height.

Figure 7:
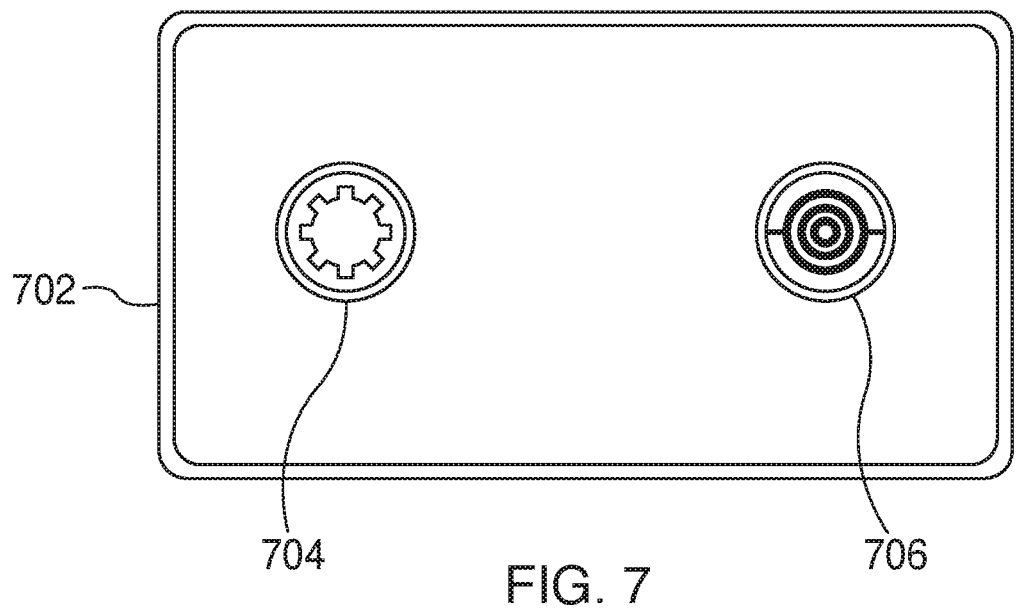
FIG. 7 includes a top view of a cavity in a durable housing that includes a mechanical coupling and an electrical coupling.

When the bucket 602 is installed within the durable housing, the thermally conductive base portion 612 may be electrically connected to a heating element (e.g., a resistive heating element in the form of a coil) that is located in the durable housing. FIG. 7 includes a top view of a cavity in a durable housing 702 that includes a mechanical coupling 704 and an electrical coupling 706. When installed within the cavity in the durable housing 702, the processing chamber 600 may be connected to the mechanical and electrical couplings 704, 706. Thus, the mechanical and electrical couplings 704 may be detachably connectable to respective interconnects on the processing chamber 600. The mechanical coupling 704 may be responsible for driving gears that are located in the bucket 602, while the electrical coupling 706 may be responsible for providing electricity to a heating element (not shown) that heats the thermally conductive base portion 612. The heating element may be part of the bucket 602. In some embodiments, the heating element is included in the cavity of the durable housing 702. In such embodiments, the thermally conductive base portion 612 of the bucket 602 may be heated through contact with the heating element. Accordingly, the thermally conductive base portion 612 may be heated through thermo-mechanical conductive heating or on-bucket electrical heating instead of convective heating.

A mass sensing system may be incorporated into the OMPA so that mass measurements can be made throughout a organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). However, because the bucket 602 can be removable installed within the durable housing, mass sensors could additionally or alternatively be located along the bottom of the bucket 602. As an example, a mass sensor may be located on each "foot" of the bucket 602. Regardless of location, the mass sensor(s) included in the OMPA may continually or periodically output measurements that can be used to calculate, infer, or otherwise establish the total weight of the bucket 602 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input. Additional details of how mass or weight measurements are used, collected, and communicated by the OMPA are discussed in more detail in connection with the specification corresponding to FIGS. 13-28.

Figure 8:
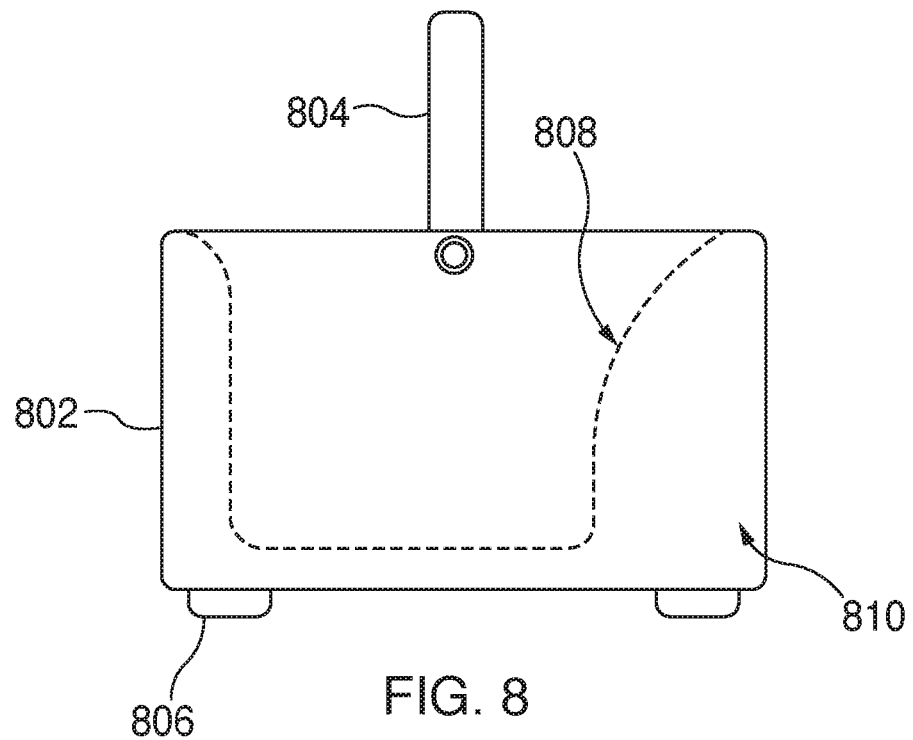
FIG. 8 includes a side profile view of a bucket in which food matter and mixed organics can be deposited.

FIG. 8 includes a side profile view of a bucket 802 in which OMPA input can be deposited. A handle 804 may be pivotably connected to opposing sides of the bucket 802. The handle 804 may allow the bucket 802 to be easily removed from the OMPA as discussed above, as well as easily conveyed to another location. The bucket 802 may also have structural features 806 that terminate along a substantially planar level. These structural features 806 (also referred to as "feet") may help stabilize the bucket 802. Moreover, these structural features 806 may include the corresponding interconnects for the mechanical and electrical couplings 704, 706 discussed above with reference to FIG. 7. Such a design not only allows the corresponding interconnects to be readily aligned with those couplings, but also ensures that the structural features 806 can protect the corresponding interconnects when the bucket 802 is removed from the OMPA. As mentioned above, while mass sensor(s) are normally installed along the bottom of the OMPA in which the bucket 802 is to be installed, mass sensor(s) could additionally or alternatively be installed within some or all of these structural features 806 to measure the weight of the bucket 802 and its contents.

As shown in FIG. 8, the cavity defined by the interior surface of the bucket 802 may not necessarily by symmetrical across the longitudinal and latitudinal planes defined therethrough. For reference, the term "latitudinal plane" may be used to refer to the plane that is substantially parallel to the handle 804 while extended upward as shown. Meanwhile, the term "longitudinal plane" may be used to refer to the plane that is substantially orthogonal to the latitudinal plane. For example, the cavity may be more gradually tapered along one end to form a lip 808 (also referred to as a "spout"). The spout may allow a user to empty contents from the bucket 802 by simply tipping it along one end.

This gradual tapering along one end may also create a space 810 along one end of the bucket 802 in which components can be installed. For example, the gears that are responsible for driving the central rod that extends through the cavity may be located in this space 810. In addition to conserving valuable space within the bucket 802 (and OMPA as a whole), locating the gears in the space 810 will also add weight to one end of the bucket 802. This added weight may make it easier for the user to rotate the bucket 802 along that end to empty contents via the lip 808.

Practical Lid

An important aspect of increasing adoption is that the OMPA should be easily deployable and operable. The component with which many users will interact most frequently is the lid (e.g., lid 204 of FIG. 2). Accordingly, it is important that the lid be easy to use but also offer some functionality.

Figure 9:
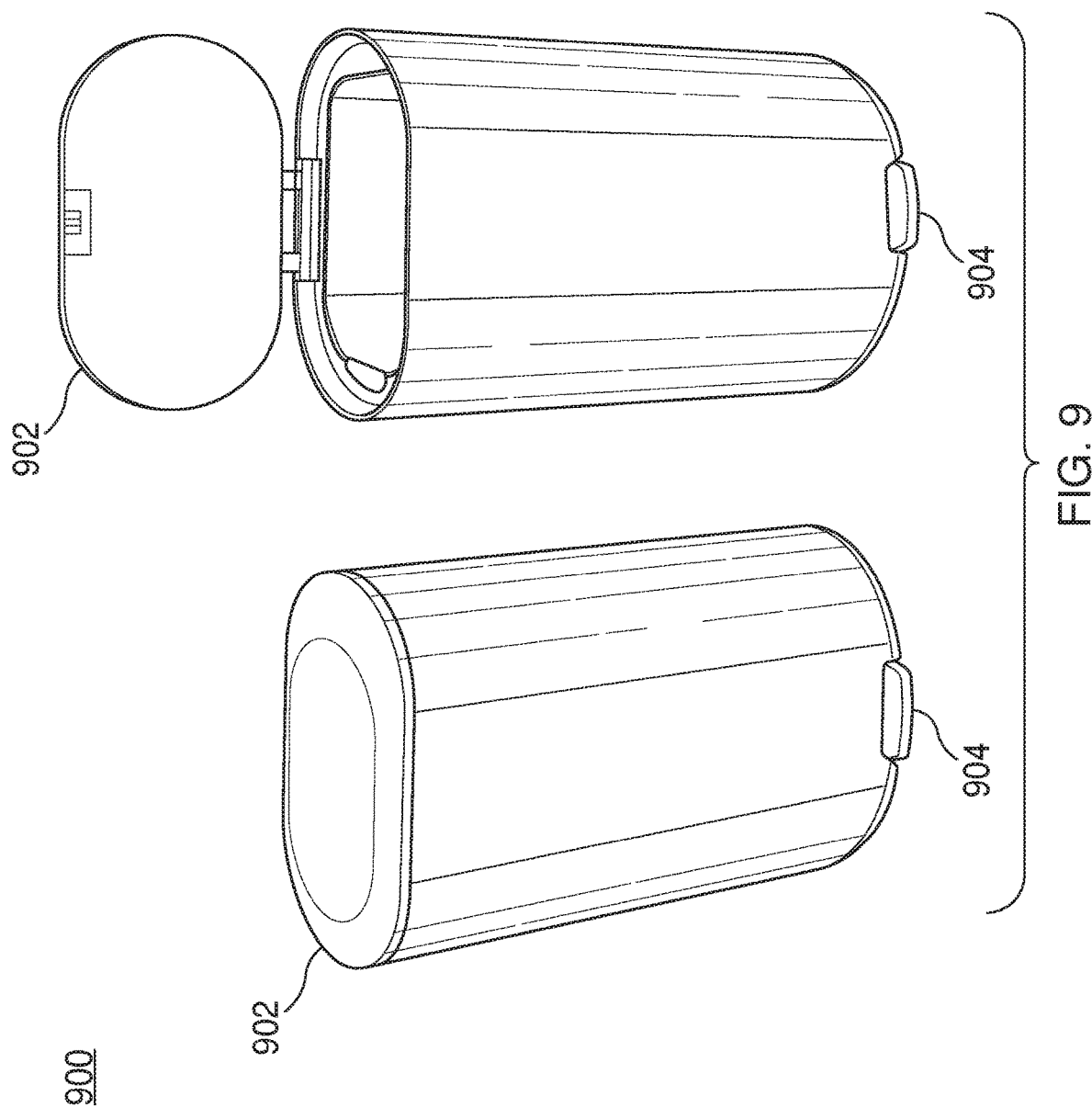
FIG. 9 includes front perspective views of an OMPA with the lid in a closed position and an open position.

As an example, a user may not only be able to open the lid with her hands, but also by interacting with an electromechanical pedal switch that is accessible along the front side of the OMPA. FIG. 9 includes front perspective views of OMPA 900 with the lid 902 in a closed position and an open position. As shown in FIG. 9, an electro-mechanical pedal switch 904 (or simply "pedal switch") may be located along the front side of OMPA 900. When a user applies pressure to the pedal switch 904 (e.g., with her foot), the lid 902 may be electro-mechanically actuated to the open position. As further discussed below, the open position may be one of multiple open positions to which the lid 902 can be actuated. When the user stops applying pressure to the pedal switch 904, the lid 902 may automatically close. The lid 902 may not close immediately, however. Instead, the lid 902 may be electro-mechanically actuated to the closed position a short interval of time (e.g., several seconds). Thus, the pedal switch 904 may allow the lid 902 of the OMPA 900 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

As another example, air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

As another example, the lid may be intelligently controlled based on the intent of a user as inferred by the OMPA. Assume, for example, that the user either partially opens the lid by pivoting the lid roughly 30-75 degrees with respect to its original location or softly presses on a pedal switch (e.g., pedal switch 904 of FIG. 9). In such a situation, the OMPA may infer that the user is interested in performing a short-duration activity and then actuate the lid to a first angle (e.g., 60 degrees or 75 degrees). Examples of short-duration activities include depositing more OMPA input in the processing chamber or observing the OMPA input in the processing chamber. Now, assume that the user either fully opens the lid by pivoting the lid roughly 90 degrees with respect to its original location or firmly presses on the pedal switch. In such a situation, the OMPA may infer that the user is interested in performing a long-duration activity and then actuate the lid to a second angle (e.g., 90 degrees). Examples of long-duration activities include removing the processing chamber and cleaning the interior of the OMPA. Similarly, if the lid is actuated to the first angle and the OMPA then infers that the user is likely interested in performing a long-duration activity (e.g., based on removal of the bezel), then the lid may be actuated to the second angle. Accordingly, the OMPA may automatically further open the lid responsive to a determination that the user intends to access the interior for a longer period of time.

Similarly, the OMPA may control how quickly the lid closes based on the intent of the user. If the OMPA infers that the user is interested in performing a short-duration activity, the OMPA may maintain the lid in a given position (e.g., at the first angle) for a first amount of time. If the OMPA infers that the user is interested in performing a long-duration activity, the OMPA may maintain the lid in another given position (e.g., at the second angle) for a second amount of time. The first amount of time may be 2-10 seconds, while the second amount of time may be 10-60 seconds.

Overview of Operating States

Figure 10:
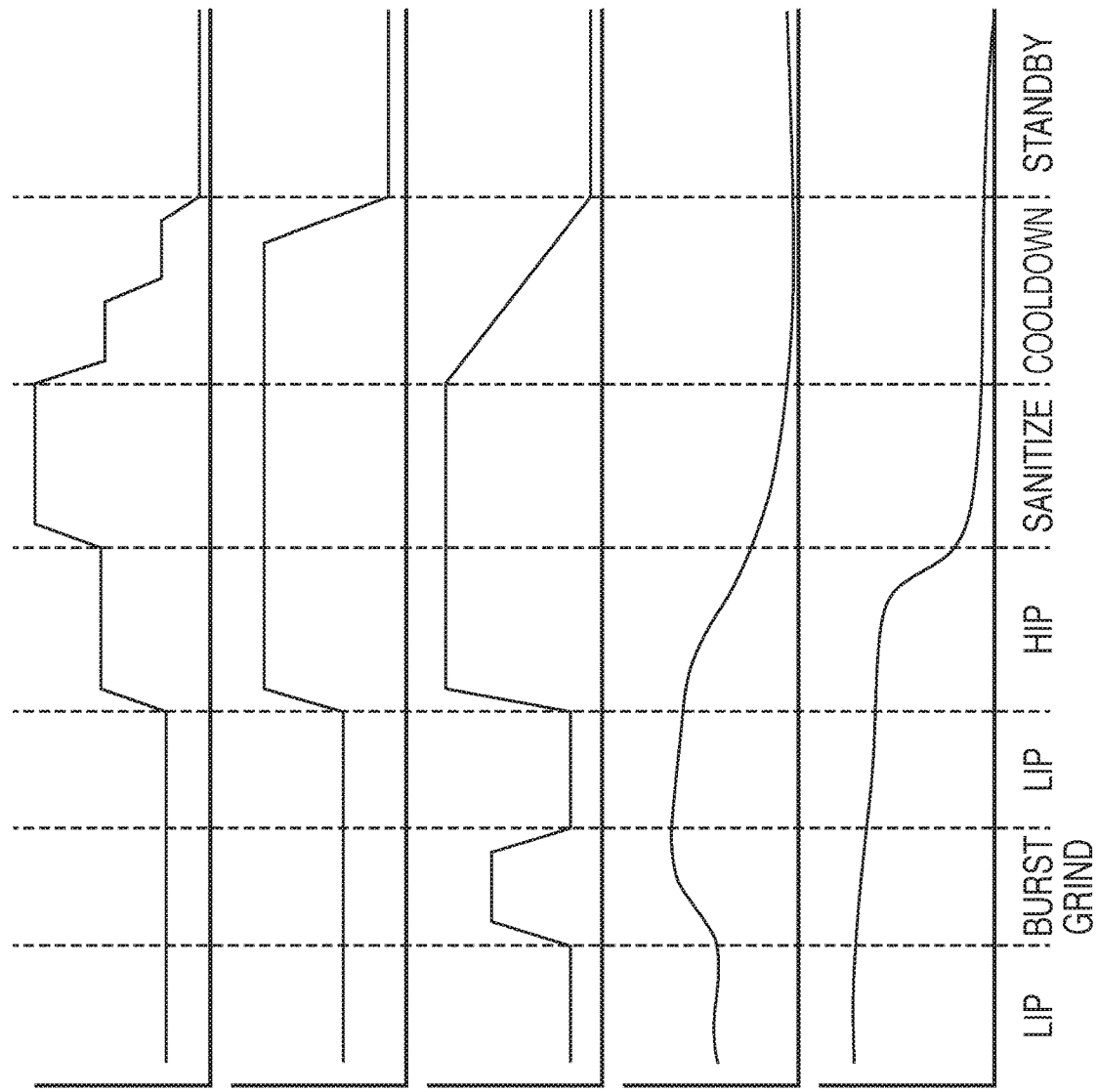
FIG. 10 includes an example of an operating diagram that illustrates how control parameters can be dynamically computed in accordance with an intelligent time recipe to process the contents of an OMPA.

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states. Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

TABLE 1

Descriptions of states for processing OMPA input.

| State Identifier (ID) | State Description |
| --- | --- |
| High Intensity Processing (HIP) | Goal: Achieve the target moisture level at a given temperature.<br>Details: Temperature, airflow, and/or grinding mechanisms can be set to high settings. HIP normally takes at least several hours to complete, so the OMPA may attempt to schedule overnight. HIP may be triggered manually (e.g., via an interaction with an input mechanism, or via an instruction provided through the control platform) or automatically (e.g., based on a determination that the weight of the OMPA input exceeds a threshold). |
| Sanitize | Goal: Kill at least a predetermined number (e.g., greater than 99 percent) of pathogens.<br>Details: Settings are similar to HIP, though the temperature is higher. By default, sanitization may be performed before, during, or after HIP. Thus, sanitization may be considered part of HIP in some instances. |
| Low Intensity Processing (LIP) | Goal: Advance drying in a non-intrusive manner while individuals are more likely to be nearby (e.g., during daylight hours).<br>Details: Temperature, airflow, and/or grinding mechanisms can be set to low settings. While LIP may be similar to HIP in operation, LIP may be more suitable if individuals may be nearby. For example, the noise generated by the grinding mechanisms will typically be more tolerable at low settings than at high settings. |
| Burst Grind | Goal: Incorporate wet (e.g., unprocessed) OMPA input into dry (e.g., processed or semi-processed) OMPA input to make drying easier.<br>Details: Temperature and airflow may be maintained at the same settings as the prior state (e.g., HIP or LIP), but the grinding mechanisms can be set to a higher state to grind the wet OMPA input that has been newly added. Burst grind may be performed when new OMPA input is added to the processing chamber while HIP or LIP is being performed. |
| Standby | Goal: Conserve power once the target criteria have been reached.<br>Details: Temperatures, airflow, and/or grinding mechanisms can be off, unless necessary to meet some other criterion. For example, airflow and/or grinding mechanisms may be occasionally triggered to maintain an odor criterion. |
| Cooldown | Goal: Allow the user to handle the processing chamber.<br>Details: Settings are similar to standby, though airflow may be higher if necessary to cool the processing chamber or the product stored therein. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

Overview of Control Platform

In some situations, it may be desirable to remotely interface with a OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 11:
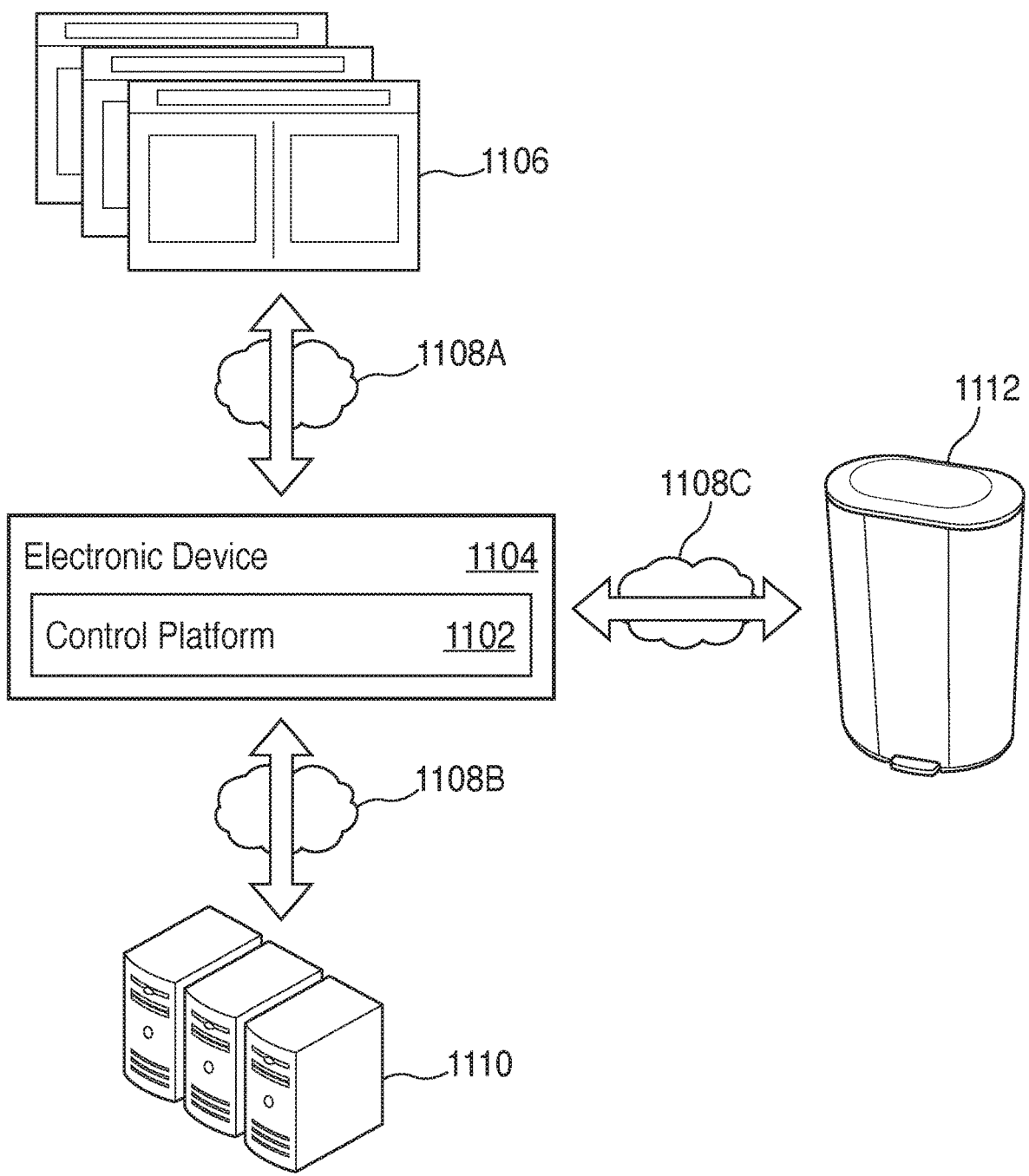
FIG. 11 illustrates a network environment that includes a control platform.

FIG. 11 illustrates a network environment 1100 that includes a control platform 1102. For the purpose of illustration, the control platform 1102 may be described as a computer program that is executing on an electronic device 1104 accessible to a user of OMPA 1112. As discussed above with reference to FIG. 1, OMPA 1112 may include a communication module that is responsible for receiving data from, or transmitting data to, the electronic device 1104 on which the control platform 1102 resides.

Users may be able to interface with the control platform 1102 via interfaces 1106. For example, a user may be able to access an interface through which information regarding OMPA 1112 can be viewed. This information may include historical information related to past performance (e.g., total pounds of OMPA input that has been processed), or this information may include state information related to current activity (e.g., the current state of OMPA 1112, an indication of whether OMPA 1112 is presently connected to the electronic device 1104, an indication of whether OMPA 1112 is presently locked). Thus, a user may be able to educate herself on the OMPA and its contents by reviewing content posted to interfaces generated by the control platform 1102.

Moreover, a user may be able to access an interface through which instructions can be provided to OMPA 1112. Said another way, the user may be able to specify, through the control platform 1102, when or how OMPA 1112 should process OMPA input stored therein. As an example, the OMPA 1112 may initially be configured to perform high intensity processing between 10 PM and 8 AM under the assumption that its ambient environment will generally be devoid of individuals during that timeframe. However, the user may be able to adjust aspects of setup or operation of OMPA 1112 through the control platform 1102. For instance, the user could specify that high intensity processing should not begin until 2 AM, or the user could specify that high intensity processing should not end after 6 AM.

A user could also program, through the control platform 1102, a preference regarding the weight at which to empty the processing chamber of OMPA 1112. On its own, the processing chamber may weigh 8-10 pounds. The total weight of the processing chamber (including its contents) can quickly become unwieldy for some users, such as elderly individuals and juvenile individuals. Accordingly, the control platform 1102 may permit users to define a weight at which to generate notifications (also referred to as "alarms"). Assume, for example, that a user indicates that the total weight of the processing chamber (including its contents) should not exceed 15 pounds through an interface generated by the control platform 1102. In such a scenario, the control platform 1102 may monitor mass measurements received from OMPA 1112 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 1102 is implemented as a computer program executing on an electronic device 1104 as shown in FIG. 11, the notification may be generated by the computer program (e.g., in the form of a push notification). Additionally or alternatively, the control platform 1102 may transmit an instruction to OMPA 1112 to generate the notification. Accordingly, the notification could be a visual, audible, or tactile notification that is generated by the electronic device 1104 or OMPA 1112.

As shown in FIG. 11, the control platform 1102 may reside in a network environment 1100. Thus, the electronic device 1104 on which the control platform 1102 is implemented may be connected to one or more networks 1108A-C. These networks 1108A-C may be personal area networks (PANs), local area networks (LANs), wide area networks (WANs), metropolitan area networks (MANs), cellular networks, or the Internet. Additionally or alternatively, the electronic device 1104 could be communicatively connected to other electronic devices-including OMPA 1112—over a short-range wireless connectivity technology, such as Bluetooth, NFC, Wi-Fi Direct (also referred to as "Wi-Fi P2P"), and the like.

In some embodiments, at least some components of the control platform 1102 are hosted locally. That is, part of the control platform 1102 may reside on the electronic device 1104 that is used to access the interfaces 1106 as shown in FIG. 11. For example, the control platform 1102 may be embodied as a mobile application that is executable by a mobile phone. Note, however, that the mobile application may be communicatively connected to (i) OMPA 1112 and/or (ii) a server system 1110 on which other components of the control platform 1102 are hosted.

In other embodiments, the control platform 1102 is executed entirely by a cloud computing service operated by, for example, Amazon Web Services®, Google Cloud Platform™, or Microsoft Azure®. In such embodiments, the control platform 1102 may reside on a server system 1110 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 1110 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 1110 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 1106 generated by the control platform 1102, or users may be able to communicate directly through their respective OMPAs.

Computing System

Figure 12:
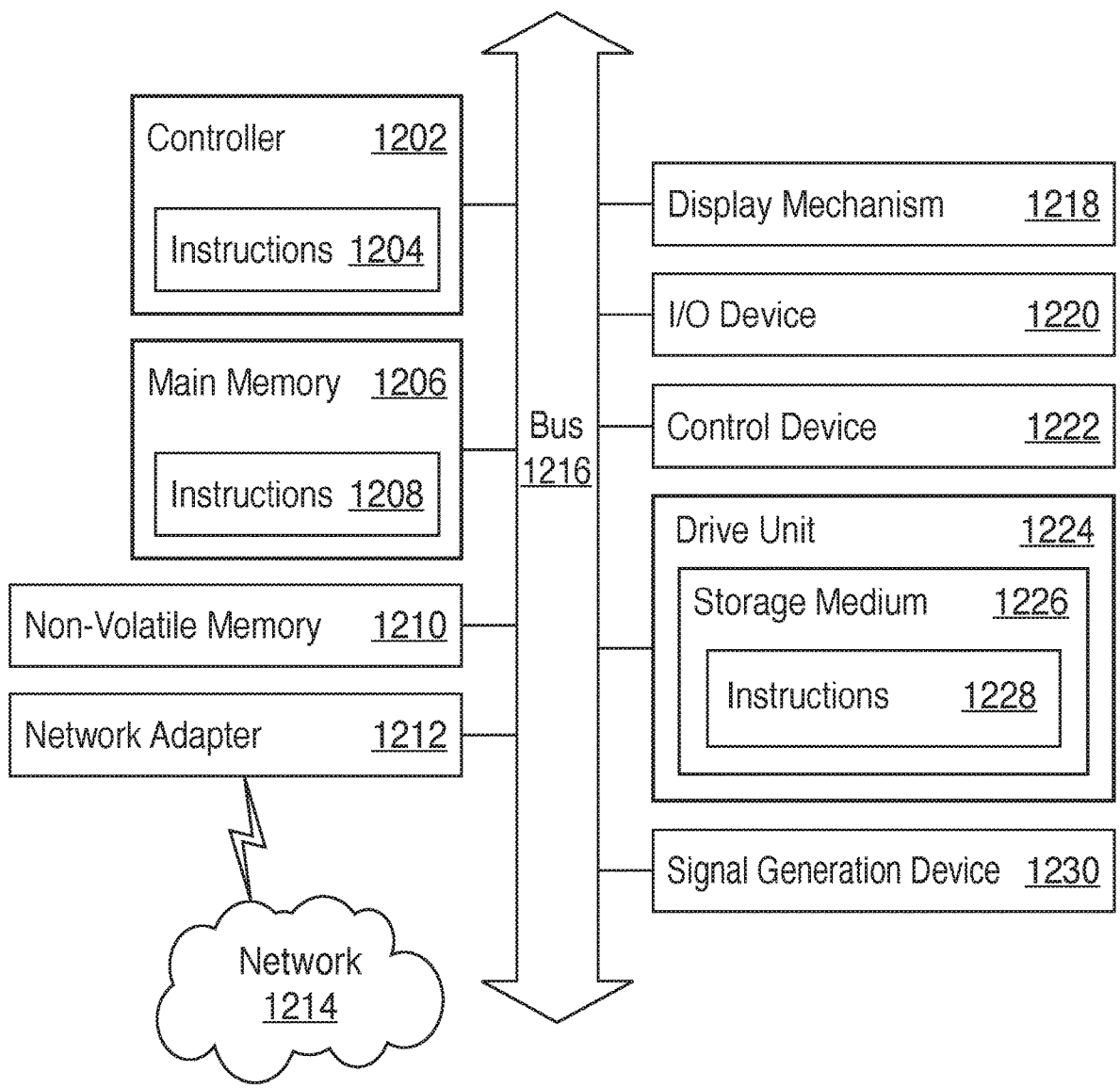
FIG. 12 is a block diagram illustrating an example of a computing system in which at least some operations described herein can be implemented.

FIG. 12 is a block diagram illustrating an example of a computing system 1200 in which at least some operations described herein can be implemented. For example, components of the computing system 1200 may be hosted on an OMPA that is tasked with converting OMPA input into a more stable product. As another example, components of the computing system 1200 may be hosted on an electronic device that is communicatively connected to an OMPA.

The computing system 1200 may include a controller 1202, main memory 1206, non-volatile memory 111210, network adapter 1212, display mechanism 1218, input/output (I/O) device 1220, control device 1222, drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 111210, and storage medium 1226 are shown to be a single medium, the terms "machine-readable medium" and "storage medium" should be taken to include a single medium or multiple media (e.g., a database distributed across more than one computer server) that store instructions 1228. The terms "machine-readable medium" and "storage medium" shall also be taken to include any medium that is capable of storing, encoding, or carrying instructions for execution by the computing system 1200.

In general, the routines executed to implement the embodiments of the present disclosure may be implemented as part of an operating system or a specific computer program. Computer programs typically comprise instructions (e.g., instructions 1204, 1208, 1228) that are set at various times in various memory and storage devices in an electronic device. When read and executed by the controller 1202, the instructions cause the computing system 1200 to perform operations to execute various aspects of the present disclosure.

The network adapter 1212 enables the computing system 1200 to mediate data in a network 1214 with an entity that is external to the computing system 1200 through any communication protocol that is supported by the computing system 1200 and the external entity. The network adapter 1212 can include a network adaptor card, wireless network interface card, router, access point, wireless router, switch, protocol converter, gateway, bridge, hub, digital media receiver, repeater, or any combination thereof.

Overview of Data Collection, Communication, and Use Thereof

Figure 13:
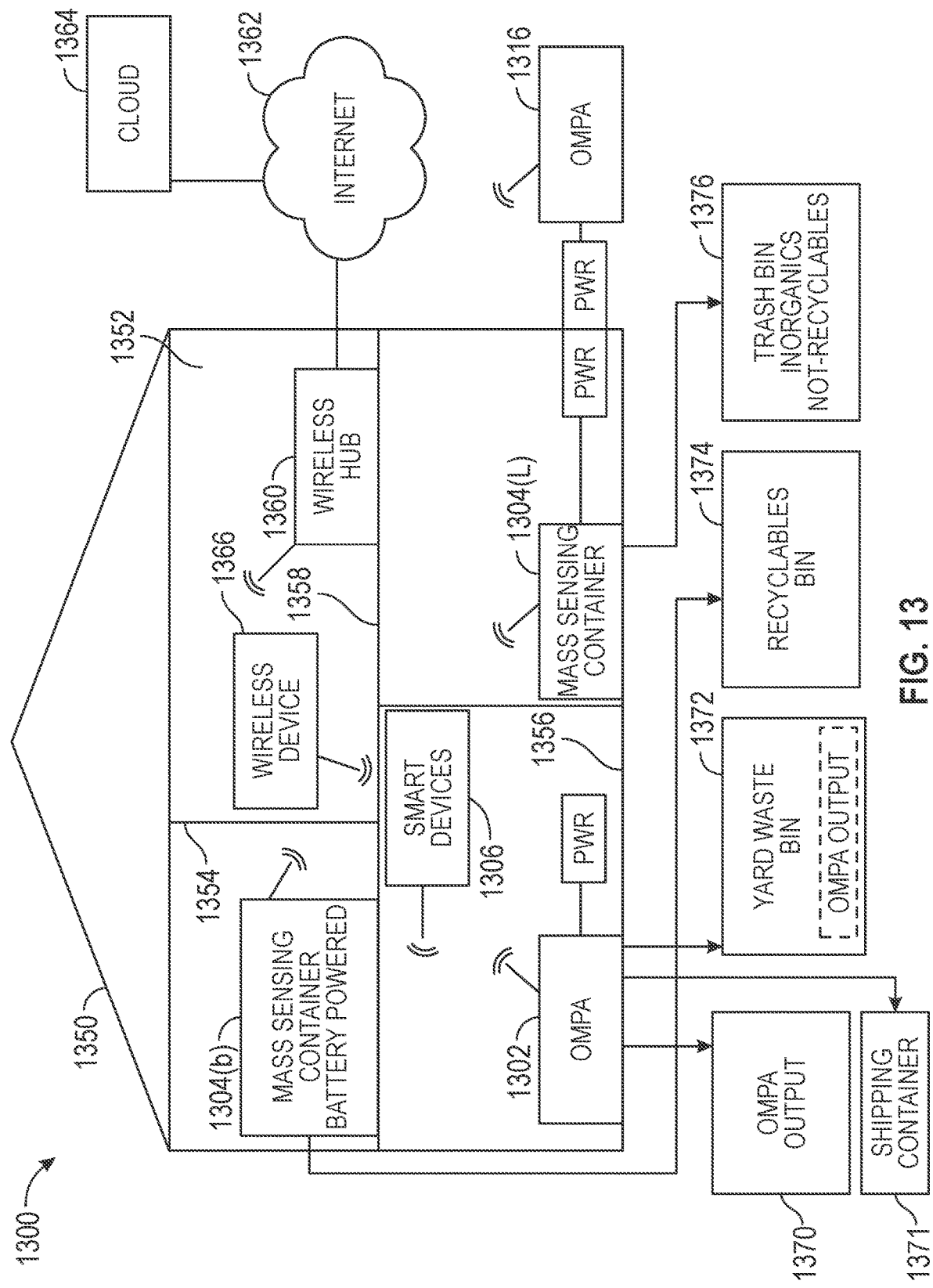
FIG. 13 an example of a matter generator environment according to an embodiment.

FIG. 13 illustrates a matter generator environment 1300 within which one or more of the devices, methods, systems, services, and/or computer program products described further herein may be applicable, according to one or more embodiments. The depicted matter generator environment 1300 includes a structure 1350, which can include, for example, a residence such as a single family residence, a duplex, an apartment building, a commercial building such as an office building, strip mall, or sports arena, or an industrial building such as a warehouse or a factory. It will be appreciated that devices can also be integrated into a matter generator environment 1300 that does not include an entire structure 1350, such as an apartment, condominium, or office space. Further, the matter generator environment can control and/or be coupled to devices outside of the actual structure 1350. Indeed, several devices in the matter generator environment need not physically be within the structure 1350 at all. For example, a device controlling an OMPA can be located outside of the structure 1350.

The depicted structure 1350 includes a plurality of rooms 1352, separated at least partly from each other via walls 1354. The walls 1354 can include interior walls or exterior walls. Each room can further include a floor 1356 and a ceiling 1358. Devices can be mounted on, integrated with and/or supported by a wall 1354, floor 1356 or ceiling 1358.

In some embodiments, the matter generator environment 1300 of FIG. 13 includes a plurality of devices, including intelligent, multi-sensing, network-connected devices, that can integrate seamlessly with each other and/or with a central server or a cloud-computing system to provide any of a variety of useful objectives. The matter generator environment may include one or more one or more intelligent, multi-sensing, network-connected OMPAs 1302 (similar to the OMPA discussed above in connection with FIGS. 1-12), one or more intelligent, network-connected mass sensing containers 1304, and one or more intelligent, multi-sensing, network-connected devices 1306 (herein after referred to as "smart devices 1306"). Mass sensing containers (MSCs) 1304 can be simplified versions of an OMPA that can measure mass, among other features, and be line powered (such as MSC 1304(L)) or battery powered (such as MSC (b)). MSC 1304(b) and MSC 1304(L) do not have OMPA input processing capability and designed primarily to measure weight of matter contained therein.

OMPA 1302 may be placed in a kitchen, chef's pantry, or other location near where food is processed. OMPA 1316 may be placed outside next to ordinary garbage bins. MSC 1304(b) or MSC 1304(L) may be placed in a bathroom, bedroom, office, or other location where food matter is not typically intended for placement therein. Multiple instances of MSC 1304(b) and/or MSC 1304(L) may be included in environment 1300. Each instance may be named by a user or designated to receive a category of matter (e.g., trash or recyclables). For example, MSC 1304(L) may be designated as a trash container for inorganics and non-recyclables. As a further example, MSC 1304(b) may be designated as a recyclables container.

Smart devices 1306 can include any combination of devices such as, for example, a smart thermostat that detects ambient climate characteristics and controls a HVAC system, a hazard detector that may detect the presence of a hazardous substance or a substance indicative of a hazardous substance (e.g., smoke, fire, or carbon monoxide), a smart doorbell may detect a person's approach to or departure from a location (e.g., an outer door), control doorbell functionality, announce a person's approach or departure via audio or visual means, or control settings on a security system (e.g., to activate or deactivate the security system when occupants go and come). Smart devices 1306 can include, for example, intelligent, multi-sensing, network-connected appliances such as refrigerators, stoves and/or ovens, televisions, washers, dryers, garbage disposals, dishwashers, and so forth. According to embodiments, the smart devices 1306 can share information with OMPA 1302, wireless device 1308, or wireless hub 1360, any of which can communicate with a central server or cloud server 1364 via the Internet 1362. According to various embodiments, algorithms may be provided that take into account information supplied from OMPA 1302, MSC 1304(b), MSC 1304 (L), and smart devices 1306 to determine when matter generation may be greater or less than normal. For example, during holidays, large meals may be prepared that yield more food matter than normal. As another example, smart devices 1306 may detect a relatively large presence of people within a fixed period of time, indicating the occurrence of a gathering or party, which may result in an increase in food matter.

The generator environment 1300 may include a dedicated OMPA output bin 1370 for receiving processed organics produced by OMPA 1302. OMPA output bin 1370 may be supplied, for example, by a matter collector (not shown). In some embodiments, OMPA output obtained from OMPA 1302 may be placed in shipping container 1371 (e.g., a cardboard box), which is collected by the appropriate third-party or mailed to the appropriate processing facility. The generator environment 1300 may include a dedicated yard waste/compost bin 1372. Some matter collectors may ask their customers to place food matter and mixed organics or other matter that could qualify as OMPA input into bin 1372. In embodiments discussed herein, OMPA output may be placed in bin 1372 if bin 1370 or shipping container 1371 is not available. Recyclables bin 1374 may be used to receive recyclable material designated as such by the collector. For example, one collector may collect glass, aluminum, plastics, paper, and cardboard as recyclables, where as another collector may collect aluminum, limited plastics, paper, and cardboard, but no glass. Trash bin 1376 may be used to receive inorganics and non-recyclables and anything else that cannot be placed into bins 1370, 1372, or 1374.

The generator environment 1300 may also include communication with devices outside of the physical home but within a proximate geographical range of the home. For example, the generator environment 1300 may include OMPA 1316 that is located outside of the structure. According to embodiments, an algorithm is provided for considering the geographic location of the environment 1300, such as based on the zip code or geographic coordinates of the home. The geographic information is then used to obtain data helpful for determining times when matter generation may be greater than normal. Such data may include seasonal time frames when yard waste (e.g., leaves) is more plentiful than other times.

By virtue of network connectivity, one or more of the devices of FIG. 13 can further allow a user to interact with the device even if the user is not proximate to the device. For example, a user can communicate with a device using a computer (e.g., a desktop computer, laptop computer, or tablet) or other portable electronic device (e.g., a smartphone) 1366. A webpage or app can be configured to receive communications from the user and control the device based on the communications and/or to present information about the device's operation to the user. For example, the user can view how much OMPA input is being processed by the OMPA 1302 and converted into OMPA output or other stable product. The user can communicate with his or her matter collector or an OMPA output processor using the webpage or app. In some embodiments, a notification may be presented to the user on electronic device 1366 to inform the user that the OMPA is full and that the OMPA outputs is ready for transfer to an OMPA output bin or shipping container 1370. The user can be inside the structure during this remote communication or outside the structure.

As discussed, users can control the OMPA and other smart devices in the generation environment 1300 using a network-connected computer or portable electronic device 1366. In some examples, some or all of the occupants (e.g., individuals who live in the home) can register their device 1366 with the environment 1300. Such registration can be made at a central server to authenticate the occupant and/or the device as being associated with the home and to give permission to the occupant to use the device to control the OMPA, mass sensing containers, or any other smart devices in the home. An occupant can use their registered device 1366 to remotely control the devices of the home, such as when the occupant is at work or on vacation. The occupant may also use their registered device to control the devices when the occupant is actually located inside the home, such as when the occupant sitting on a couch inside the home. It should be appreciated that instead of or in addition to registering devices 1366, the matter generation environment 1300 makes inferences about which individuals live in the home and are therefore occupants and which devices 1366 are associated with those individuals. As such, the smart-home environment "learns" who is an occupant and permits the devices 1366 associated with those individuals to control the smart devices of the home.

According to embodiments, a restricted class of occupants such as children or guests may be detected and access to the OMPA, mass sensing container, or the smart devices may be limited or completely restricted. For example, a child may not be permitted to open the lid of the OMPA.

In some embodiments, in addition to containing processing and sensing capabilities, each of the devices 1302, 1304, 1306, and 1316 is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, Thread, etc.) and/or any of a variety of custom or standard wired protocols (CAT6 Ethernet, HomePlug, etc.).

According to embodiments, all or some of the devices, including the OMPA and mass sensing container, can serve as wireless or wired repeaters. For example, a first one of the smart devices can communicate with a second one of the smart devices via a wireless router 1360. The smart devices can further communicate with each other via a connection to a network, such as the Internet 1362. Through the Internet 1362, the smart devices can communicate with a central server or a cloud-computing system 1364. The central server or cloud-computing system 1364 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 1364 to devices (e.g., when available, when purchased, or at routine intervals).

According to embodiments, the smart devices combine to create a network of IoT devices, mesh network devices, edge routers, and low power nodes in the matter generator environment 1300. Some of the devices in the environment 1300 are battery powered, while others have a regular and reliable power source, such as by connecting to wiring (e.g., to 120V line voltage wires) behind the walls 154 of the smart-home environment. The smart devices that have a regular and reliable power source may be equipped with the capability of using any wireless protocol or manner to facilitate bidirectional communication with any of a variety of other devices in the environment 1300 as well as with the central server or cloud-computing system 1364. On the other hand, the devices that are sleepy, low power usage devices may only communicate using a wireless protocol that requires very little power, such as Zigbee, 6LoWPAN, Thread, etc. Further, some, but not all, low-power devices are incapable of bidirectional communication. These low-power devices can send messages, but they are unable to "listen". Thus, other devices in the environment 1300, such as the line powered devices, cannot send information to these low-power devices.

An example of a low-power device is a battery powered mass sensing container 1304(*b*). Container 1304(*b*) may transmit mass measurements to OMPA 1302, wireless device 1366, smart device 1306, or wireless hub 1360 using a low-power wireless communication chip (e.g., ZigBee chip or Thread chip). As mentioned above, these messages may be sent wirelessly, using the mesh network, from node to node (i.e., smart device to smart device) within the environment 1300 as well as over the Internet 1362 to the central server or cloud-computing system 1364.

Figure 14:
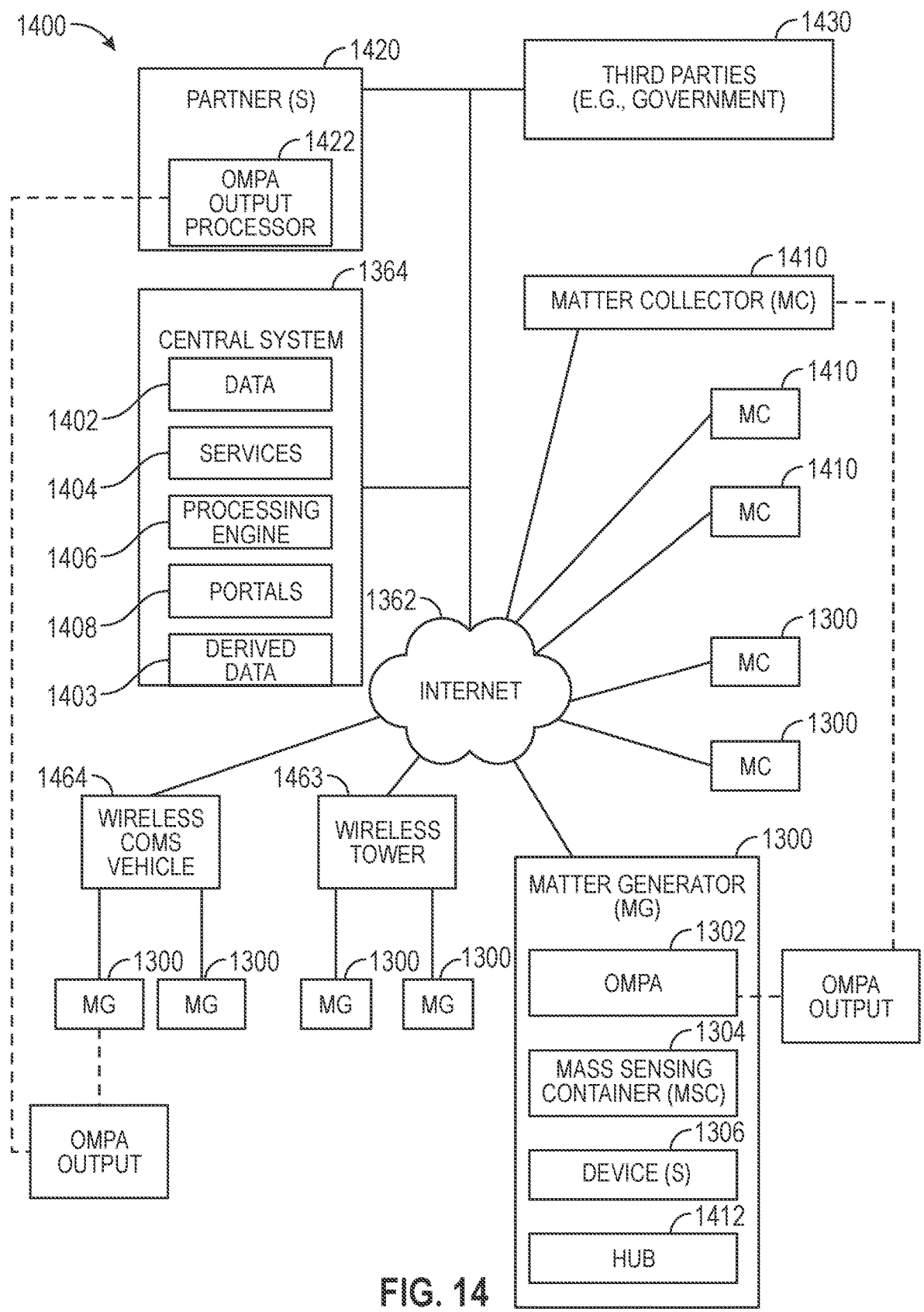
FIG. 14 illustrates a network-level view of an extensible devices and services platform with which the smart-home environment of FIG. 13 can be integrated, according to an embodiment.

FIG. 14 illustrates a network-level view of an extensible devices and services platform 1400 within which a plurality of matter generation environments, such as the matter generation environment 1300 of FIG. 13, can be integrated. The extensible devices and services platform 1400 includes remote servers or cloud computing architectures 1364 or central system 1364. Central system 1364 may be a matter information administrator (MIA). The MIA can be a stand-alone company such as the provider of the OMPA 1302 and or MSC 1304(*b*) or 1304(L), or can be incorporated into the cloud system of a smart home ecosystem provider or smart home device provider, or can be part of a government, etc. Each of the intelligent, network-connected devices 1302, 1304, 1306, 1316, and 1360 from FIG. 13 can communicate with the remote servers or cloud computing architectures 1364. For example, a connection to the Internet 1362 can be established either directly (for example, using 4G/5G connectivity to a wireless carrier), though a hubbed network 1412 (which can be scheme ranging from a simple wireless router, for example, up to and including an intelligent, dedicated whole-home control node), or through any combination thereof. Matter collectors 1410, partners 1420, and third parties 1430 can communicate with the remote servers or cloud computing architectures 1364.

Although in some examples provided herein, the devices and services platform 1400 communicates with and collects data from devices of matter generation environment 1300 of FIG. 13, it should be appreciated that the devices and services platform 1400 can communicate with and collects data from a plurality of matter generators. For example, the central server or cloud-computing system 1364 can collect matter generation data 1402 from the devices of one or more matter generation environments, where the devices can routinely transmit matter generation data or can transmit matter data in specific instances (e.g., when a device queries the matter data 1402). Thus, the devices and services platform 1400 may routinely collect data from matter generators across the world. As described, the collected data 1402 may include, for example, non-processed matter data (including mass and volume thereof), OMPA input data (including mass, volume, and water content thereof), OMPA output data (including mass, volume, and water content thereof), OMPA data (including motor torque data, heating data, power consumption data, and volatile organic compound levels data), carbon offset data, occupancy data, HVAC settings and usage data, carbon monoxide levels data, carbon dioxide levels data, sleeping schedule data, cooking schedule data, inside and outside temperature and humidity data, occupancy data, etc.

The central server or cloud-computing architecture 1364 can further provide one or more services 1404. The services 1404 can include, e.g., software updates, customer support, sensor data collection/logging, remote access, remote or distributed control, or use suggestions (e.g., based on collected data 1402 to improve performance, reduce utility cost, etc.). Data associated with the services 1404 can be stored at the central server or cloud-computing system 1364 and the central server or the cloud-computing system 1364 can retrieve and transmit the data at an appropriate time (e.g., at regular intervals, upon receiving request from a user, etc.).

As illustrated in FIG. 14, an embodiment of the extensible devices and services platform 1400 includes a processing engine 1406, which can be concentrated at a single server or distributed among several different computing entities without limitation. The processing engine 1406 can include engines configured to receive data from devices of matter generator environments (e.g., via the Internet or a hubbed network), to index the data, to analyze the data and/or to generate statistics based on the analysis or as part of the analysis. The analyzed data can be stored as derived data 1403.

Results of the analysis or statistics can thereafter be transmitted back to the device that provided data used to derive the results, to matter collectors 1410, to partners 1420, to other devices, to a server providing a webpage to a user of the device, to portal 1408, or to other non-device entities. For example, use statistics, use statistics relative to use of other devices, use patterns, and/or statistics summarizing data can be generated by the processing engine 1406 and transmitted. The results or statistics can be provided via the Internet 1362. In this manner, the processing engine 1406 can be configured and programmed to derive a variety of useful information from the derived data 1403. A single server can include one or more engines.

Portal 1408 may provide an access point for matter generator 1300, matter collector 1410, and partner 1420 to interact with central server or the cloud-computing system 1364. Portal 1408 may enable uses of any one of matter generator 1300, matter collector 1410, and partner 1420 to provide data and requests to system 1364 and for system 1364 to provide data to matter generator 1300, matter collector 1410, and partner 1420. For example, one of the embodiments discussed herein provides matter collectors 1410 with information regarding how much organic matter is being collected from matter generators 1300. Thus, for a given matter collector 1410, a given number of matter generators 1300 will have an account with that matter collector, and some of those matter generators will also have an account with system 1364. Those matter generators can provide data to system 1364, which will analyze the data and report that data to the appropriate matter collector. That matter collector can then use the data to operate its collection operation more efficiently.

The derived data can be highly beneficial at a variety of different granularities for a variety of useful purposes, ranging from data on a per matter generator basis, a per-aggregated matter generator basis, per-geographic region (e.g., neighborhood) of matter generators basis, per-matter collector basis, per any specifications required by a matter collector basis, or per-partner basis, to the generation of inferential abstractions that can assist matter collectors with organic matter collection data, to the generation of statistics and associated inferential abstractions that can be used for government, finance, or charitable purposes. For example, processing engine 1406 can generate statistics about total organic matter collection from a group of matter generators. As another example, processing engine 1406 can generate statistics about carbon offsets derived from matter generators who are processing their organic matter and send the statistics to device users, matter collectors, or other entities (e.g., that have requested or may have provided monetary compensation for the statistics).

In some embodiments, to encourage innovation and research and to increase products and services available to users, the devices and services platform 1400 exposes a range of application programming interfaces (APIs) to third parties (e.g., third parties 1430), such as charities, governmental entities (e.g., the Food and Drug Administration or the Environmental Protection Agency), academic institutions (e.g., university researchers), federal, state, county, and city law sources (e.g., for receiving information controlling removal of matter, including organic matter), compliance organizations (e.g., organization that confirms food matter is being handled properly), businesses, carbon markets (e.g., for selling or trading carbon credits obtained through proper disposal of OMPA output), and other third parties. The APIs are coupled to and permit third-party systems to communicate with the central server or the cloud-computing system 1364, including the services 1404, the processing engine 1406, the data 1402, and the derived data 1403. For example, the APIs allow applications executed by the third parties to initiate specific data processing tasks that are executed by the central server or the cloud-computing system 1264, as well as to receive dynamic updates to the data 1402 and the derived data 1403.

For example, third parties can develop programs and/or applications, such as web or mobile apps, that integrate with the central server or the cloud-computing system 1364 to provide services and information to users. In some embodiments, cloud-computing system 1364 may provide such programs and/or applications as native programs and/or applications. Such programs and application may be, for example, designed to help matter collectors reduce fuel consumption by scheduling optimized routes to pick up OMPA output or other organic matter. Another program and application may enable a partner to send a pre-paid postage stamped box to a particular matter generator so that the matter generator can mail the OMPA output to a OMPA output processor r (e.g., a facility that can make use of the OMPA output processor to turn them into a higher value item such as charcoal briquettes or feed for animals).

FIG. 14 illustrates that certain matter generators 1300 may communicate with system 1364 via a wireless tower 1463 or a wireless communications vehicle. A matter generator 1300 outfitted with 3G/4G/5G communications unit may communicate with wireless tower 1463 so that data can be transmitted to and from system 1364. A matter generator 1300 outfitted with a relatively low power communications unit (e.g., Zigbee, Z-wave, Thread, or Bluetooth) may be able to communicate with a mobile wireless communications vehicle (e.g., a truck) when said vehicle comes within range of the matter generator. Such a setup may be useful in rural or remote areas where no cell service nor Internet service is available, but routine matter pickup is available. The truck, for example, may be able to communicate with the relatively low power communications unit and obtain data from the matter generator when it picks up matter and then provide that data to system 1364 when it is able.

Figure 15:
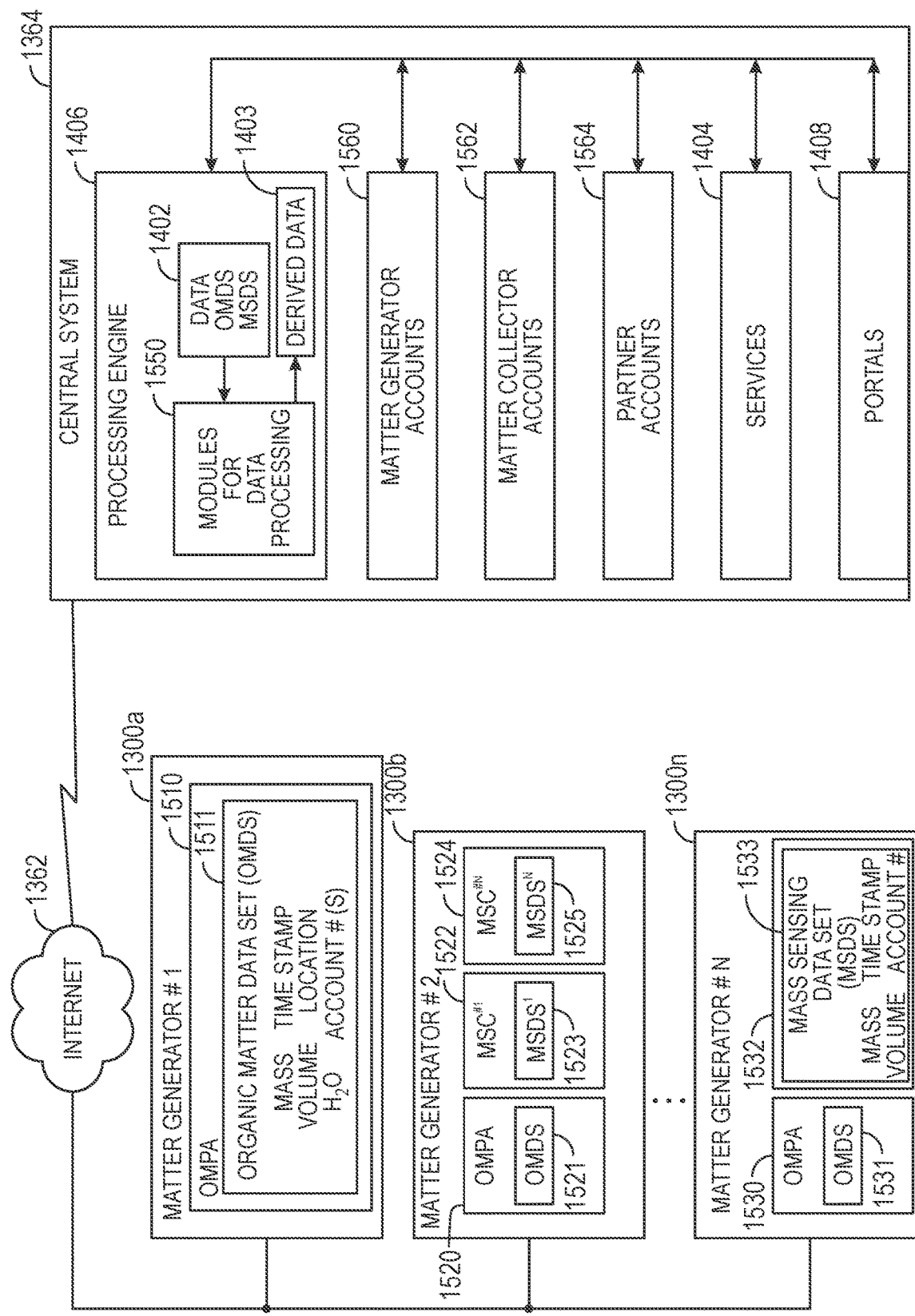
FIG. 15 shows several illustrative matter generators communicating data with a central processing system according to an embodiment.

FIG. 15 shows several illustrative matter generators communicating data with central processing system 1364 via the Internet 1362 according to an embodiment. In particular, FIG. 15 shows N number of matter generators 1300*a*, 1300*b* through 1300*n*. Each matter generator may include one or more OMPAs, one or more mass sensing containers, or any combination thereof. For example, matter generator 1300*a* includes OMPA 1510, matter generator 1300*b* includes OMPA 1520, mass sensing container (MSC) 1522, and MSC 1524, and matter generator 1300*n* includes OMPA 1530 and MSC 1532. OMPAs 1510, 1520, and 1530 can be akin to the OMPA discussed above in connection with FIGS. 1-12. MSCs 1522, 1524, and 1532 may be a simplified version of the OMPA in that it may not have the ability to process OMPA input but it is able to obtain various measurements such as mass measurements. For example, an MSC may be used a "smart" trashcan that can measure weight. Multiple MSCs may exist in a matter generator environment. If desired, one or more MSCs may be designated as receptacles for inorganic and non-recyclable trash, whereas another MSC may be designated as a receptable for recyclable material. The data acquired by the MSCs may be provided to a central matter processor or to the central system so that data analytics can be performed. For example, matter generators that supply data from OMPAs and MSCs may be able to specify mass and volume quantities of organic matter, recyclables, and inorganics being generated.

Each OMPA can provide a organic matter data set (OMDS) to system 1364. For example, OMPAs 1510, 1520, and 1530 can provide respective OMPAs 1511, 1521, and 1531 to system 1364. The OMDS can include data such as measured mass, measured volume, and measured water content. The mass, volume, and water content measurements may be obtained according to a data collection algorithm. For example, the measurements may be collected in real-time while the OMPA is operating (i.e., converting OMPA input to OMPA output). It should be understood that the measurements will change over time while the OMPA is processing OMPA input. The OMPA and system 1364 may require periodic measurements to make OMPA input processing decisions or to perform data analytics according to various embodiments. The measurements may be collected when an organic matter processing cycle is completed, but the bin is not full, or the measurements may be collected when the organic matter processing cycle is complete and the bin is full. As another example, the measurements may be collected in response to a request from system 1364. The OMDS can also include a timestamp (e.g., when the measurements were recorded), location information (e.g., GPS coordinates or address), identifying information (e.g., a name or unique number assigned to the FWP), and account number(s) (e.g., account number user has with system 1364 and/or account number user has with a matter collector).

Each mass sensing collector can provide a mass sensing data set (MSDS) to system 1364. For example, MSCs 1522, 1524, and 1532 can provide respective MSDSs to system 1364. The MSDS can include data such as measured mass and measured volume. The MSDS can also include a timestamp, identification number, and account numbers. The MSCs may collect measurements according to a measurement collection algorithm. For example, measurements may be taken on periodic basis, in response to collection request issued by system 1364 or an OMPA, or in response to lid open/close event.

Each OMPA and MSC may aggregate measurements and package them into respective OMDSs and MSDSs. The OMDSs and MSDSs may be transmitted on a periodic schedule (e.g., once a day) or in response to a request event (e.g., system 1364 requests the OMDS and MSDS, or a user associated with a particular matter generator may desire to view data pertaining to his or her OMPA and/or MSC). Each OMPA and MSC has a controller and software for obtaining measurements to populate their respective OMPAs and MSCs. For example, an OMPA may use controller 110 to obtain data from sensors 128 to populate a OMDS and use communications module 116 to transmit the OMDS to system 1364.

FIG. 15 also shows that central system 1364 includes data 1402, derived data 1403, services 1404, processing engine 1406, portals 1408 (as previously discussed) and further includes matter generator accounts 1560, matter collector accounts 1562, partner accounts 1564. Processing engine 1406 may execute modules 1550 to process data 1402, which may include, for example, OMDS and MSDS received from various matter generators 1300*a*-*n* and render derived data 1403. Modules 1550 may be responsible for processing data received from matter generators, matter collectors, partners, and other third party data sources (e.g., weather, government regulations, etc.). Modules 1550 may be able to process data in a way that preserves privacy of matter generators while providing matter collectors and partners with information they need to perform their respective services. For example, a mass module (not shown) may be able to calculate how much organic matter has been collected by a matter collector based on OMDSs received from the matter generators associated with that matter collector.

Matter generator accounts 1560 may include accounts of residential, business, or industrial users that have an OMPA, a MSC, or a combination of one or more OMPAs and MSCs associated with system 1364. For example, matter generator 1300*a* may have an account registered at matter generator account 1560 and that account can include OMPA 1510. Matter generators 1300*a*-*n* may setup an account with system 1364 via portal 1408.

Matter collector accounts 1562 may include accounts of entities (e.g., government-based matter collectors 21, privately held matter collectors 22, etc.) that are responsible for collecting matter from matter generators. Each matter collector may interface with and establish an account with system 1364 via portal 1408. Central system 1364 may supply derived data 1403 to the appropriate matter collector accounts 1562 to enable the matter collectors to use that data and make informed decisions on how best to handle their operations.

In some embodiments, system 1364 is able to associate matter generator accounts 1560 with an appropriate one of the matter collector accounts 1562. For example, such associations can be made in response to inquiries (e.g., where a generator specifies who its collector is, provides account information, etc.), by correlating generator addresses with addresses serviced by collectors, or by any other associating method. By associating generator accounts with the appropriate collector, the derived data can be customized for that matter collector. In addition, the derived data can be used to generate reports (e.g., compared to your neighbor reports) for the matter generators associated with that particular matter collector.

In some embodiments, system 1364 may provide various services 1404 to matter generators and/or matter collectors. For example, one service may provide a carbon credit brokering service that enables the generator or collector to trade carbon offset credits for processing OMPA output. The OMPA can determine or provide data to system 1364 that enables system 1364 to determine how much methane was avoided by properly processing the OMPA input. This methane elimination calculation can be determined on a matter generator specific basis, a matter collector basis, or some other basis and be used to derive a carbon offset credit that can be exchanged in a carbon market.

Central system 1364 may also manage partner accounts 1564. Partner accounts 1564 may be associated with OMPA output processors. That is, these entities receive OMPA output produced by OMPAs and use the OMPA output to produce a product therefrom where such products may have a higher market value than the market value of the OMPA output. For example, the partner entities may convert OMPA output into a fuel that can be burned to create energy, provided to a composting facility, compressed into briquettes, bio-charred, converted into animal feed, or fed to flies or other insects for larva production, in which the larva can be collected and used for relatively high protein content feed.

The OMPA output processors may establish a partner account 1564 so that the OMPA out processors can make arrangements to receive OMPA outputs directly from matter generators via mail or a third-party retrieval service or from matter collectors who have already collected the OMPA output from the generators. In one embodiment, for example, an OMPA may indicate to system 1364 that it has a full bin of OMPA output that is ready for collection. In response, system 1364 may coordinate with one of its partners in partner account 1564 to send a pre-paid self-addressed shipping container to the generator associated with the OMPA. The generator can then place the OMPA output in the shipping container and mail it. That shipping container is then received by the partner who then processes the OMPA output.

Figure 16:
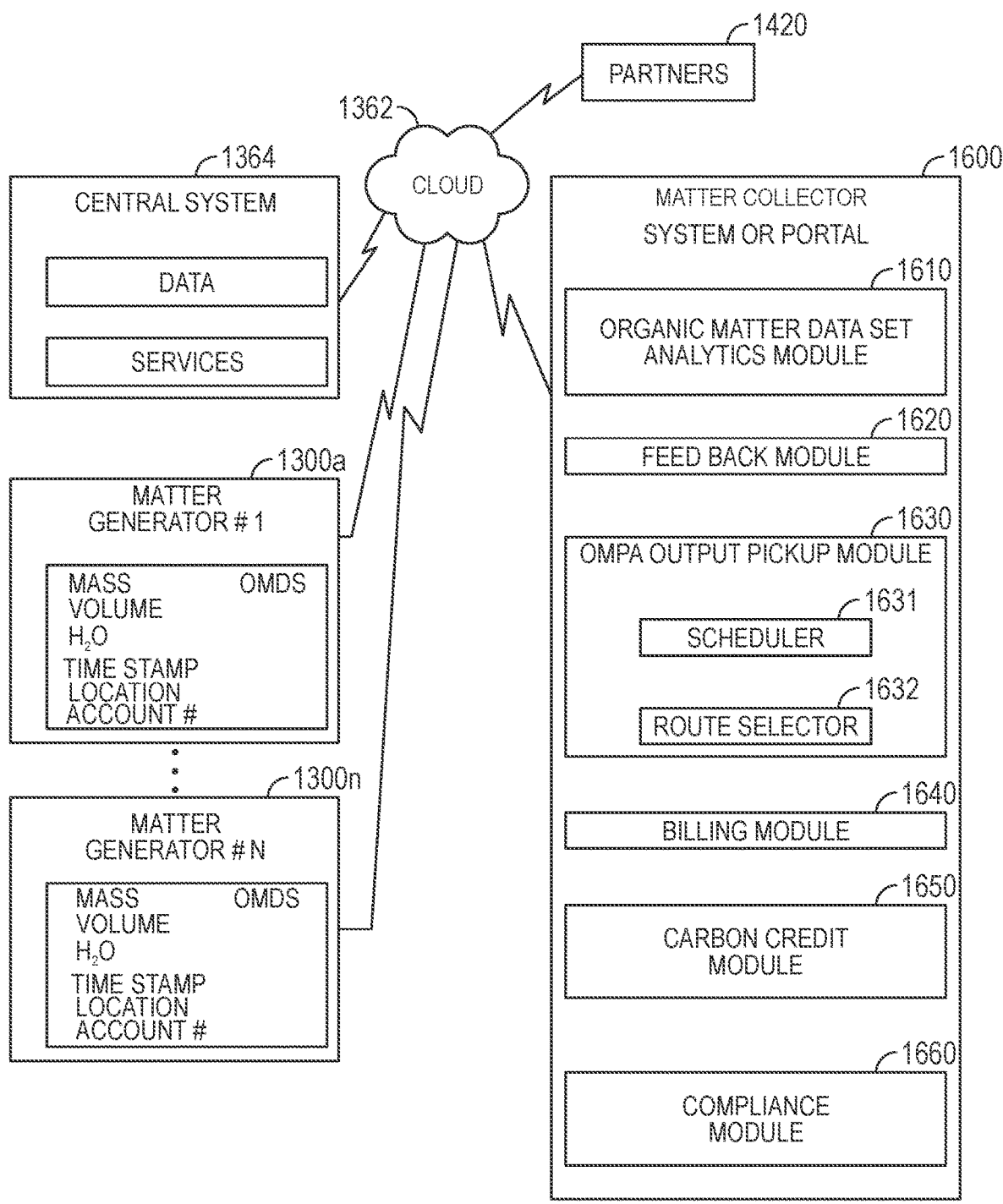
FIG. 16 shows a block diagram of a matter collector system or portal that shows various modules that may be implemented by a matte collector according to an embodiment.

FIG. 16 shows a block diagram of a matter collector system or portal 1600 that shows various modules that may be implemented by a matter collector according to an embodiment. The modules may be hosted by central server 1364 via portal 1408 or the modules may be hosted by one or more servers operating independent of central server 1364 (e.g., on the matter collector's servers). System or portal 1600 can include OMDS analytics module 1610, feedback module 1620, OMPA output pickup module 1630, billing module 1640, carbon credit module 1650, and compliance module 1660. All modules within system or portal 1600 can communicate with each other. OMDS analytics module 1610 may provide data analytics to the matter collector based on raw OMDSs or MSDSs or derived data received from system 1346. The data analytics may include "standard" data analytics that includes data that all matter collectors may require and may also include "custom" data analytics that includes data specific to a particular matter collector.

Feedback module 1620 may enable a matter collector to provide any feedback back to system 1364. For example, the matter collector may be able to reconcile OMPA output collection data with data supplied by system 1364. As a specific example, the matter collector may register a 1.1 kg OMPA output pickup, but the data supplied by system 1364 indicated 1 kg of OMPA output were ready. This data discrepancy may trigger an investigation or a fee assessment to the matter generator.

OMPA output pick up module 1630 may execute a scheduler 1631 for scheduling pickup of OMPA output and/or other matter (e.g., inorganic matter) and a route selector 1632 for selecting a route for a truck to pick up OMPA output and/or other matter. Scheduler 1631 and 1632 may be coordinated to optimize efficiency of pickups based on fuel consumption, man hours, worker availability, wear and tear on roads, wear and tear on collection trucks, or any other metric.

Billing module 1640 may enable the matter collector to bill the matter generator based on actual metrics (e.g., the quantity of food matter or OMPA output picked up by the matter collector). In some embodiments, government regulation may prohibit the disposal of food matter, organic matter, or OMPA output in landfills, thereby requiring this matter to be disposed elsewhere. As such, billing module 1640 may provide a way for matter collectors to separately bill matter generators for OMPA output pick up. For example, matter generators can inform their respective matter collector of the quantity of OMPA output to be picked up via system 1364, and billing module 1640 can receive this information and bill the matter generator accordingly.

Carbon credit module 1650 may determine carbon credits based on data received from system 1364. Carbon credits can be attributed to the matter collector or to individual matter generators.

Compliance module 1660 may ensure that the matter collector is complying with all applicable laws and regulation regarding matter collection. The matter collector can submit reports to the appropriate authority via the compliance module 1660 to show compliance.

In some embodiments, some or all of modules 1610, 1630, 1640, 1650, and 1660 may be hosted and run by central system 1364 on behalf of matter collector 1600.

Figure 17:
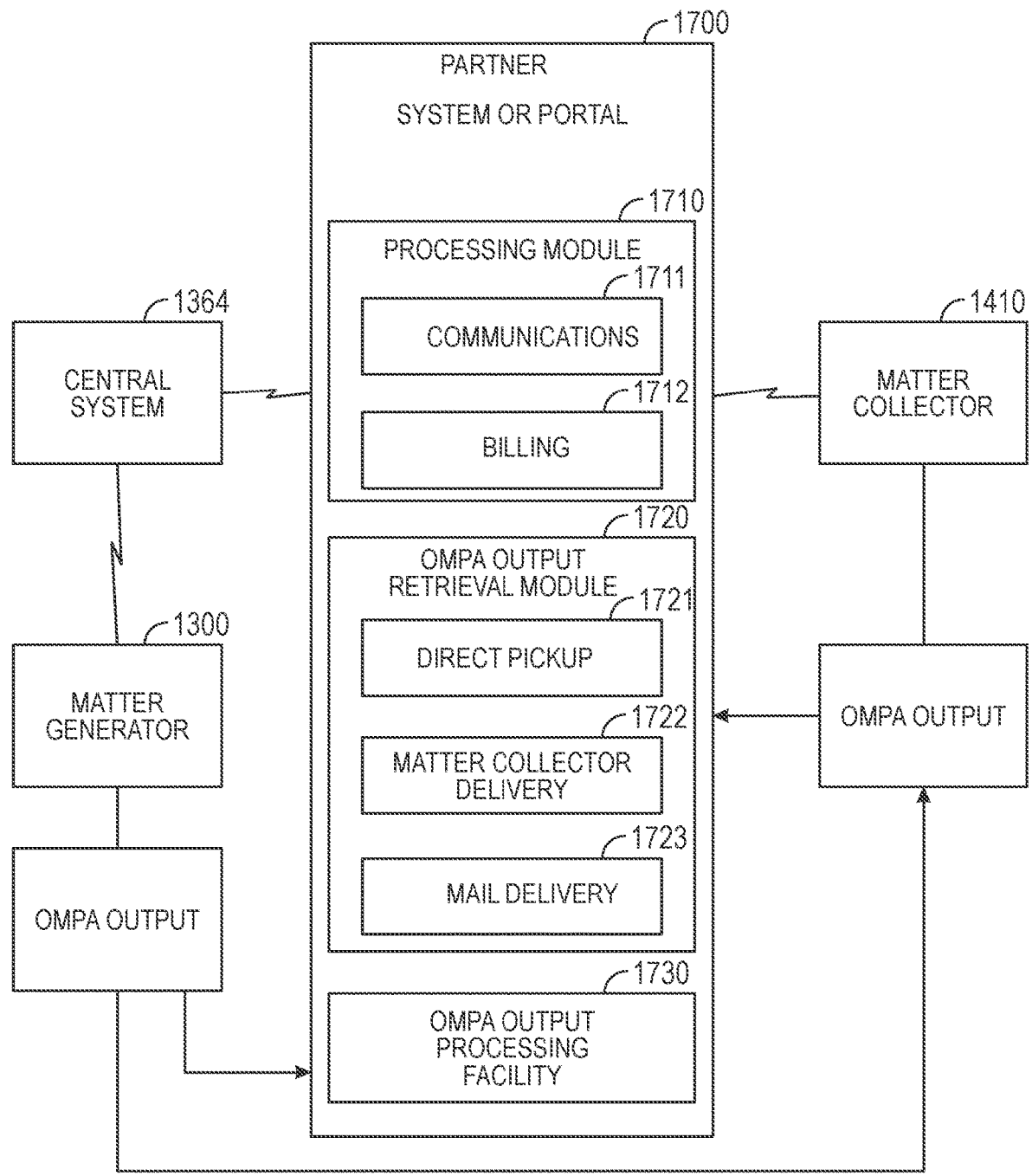
FIG. 17 shows a block diagram of a partner system or a portal that shows various modules that may be implemented by a partner according to an embodiment.

FIG. 17 shows a block diagram of a partner system or portal 1700 that shows various modules that may be implemented by a partner according to an embodiment. The modules may be hosted by central server 1364 via portal 1408 or the modules may be hosted by one or more servers operating independently of central server 1364 (e.g., on the partner's servers). System or portal 1700 can include processing module 1710, OMPA output retrieval module 1720, and OMPA output processing facility 1730. All modules within system or portal 1700 can communicate with each other. Processing module 1710 may be responsible for handling all items related to the identification and retrieval of OMPA output. Processing module 1710 may include communications 1711 for transmitting and receiving data (e.g., data indicating that OMPA output is ready for pickup) from central system 1364 or matter collector 1410. Processing module 1710 may include billing 1712 for handling invoices and payments.

OMPA output retrieval module 1720 may be responsible for handling retrieval of OMPA output from a matter generator or a matter collector. In some embodiments, module 1720 may use direct pickup 1721 in which a collection vehicle or hired driver retrieves food grounds directly from a matter generator. In another embodiment, module 1720 may work with a matter collector that delivers the OMPA output to the partner, as indicated by matter collector delivery 1722. In yet another embodiment, module 1720 may make arrangements to send a prepaid, self-addressed package to a matter generator for shipping the OMPA output to the partner, as indicated by mail delivery 1723.

OMPA output processing facility 1730 may represent the facility used by the partner to process the OMPA output. When OMPA output is received, for example, via mail, pickup, or delivery, they are provided to processing facility 1730 to be converted into a new product that is used or sold by the partner. An example OMPA output processing facility can include an upcycling or feedstock facility that converts the OMPA ouput to animal feed. Another example OMPA output processing facility can include a carbon sequestration facility that uses the OMPA output for pyrolysis.

In some embodiments, some or all of modules 1710 and 1720 may be hosted and run by central system 1364 or partner system 1700.

Figure 18:
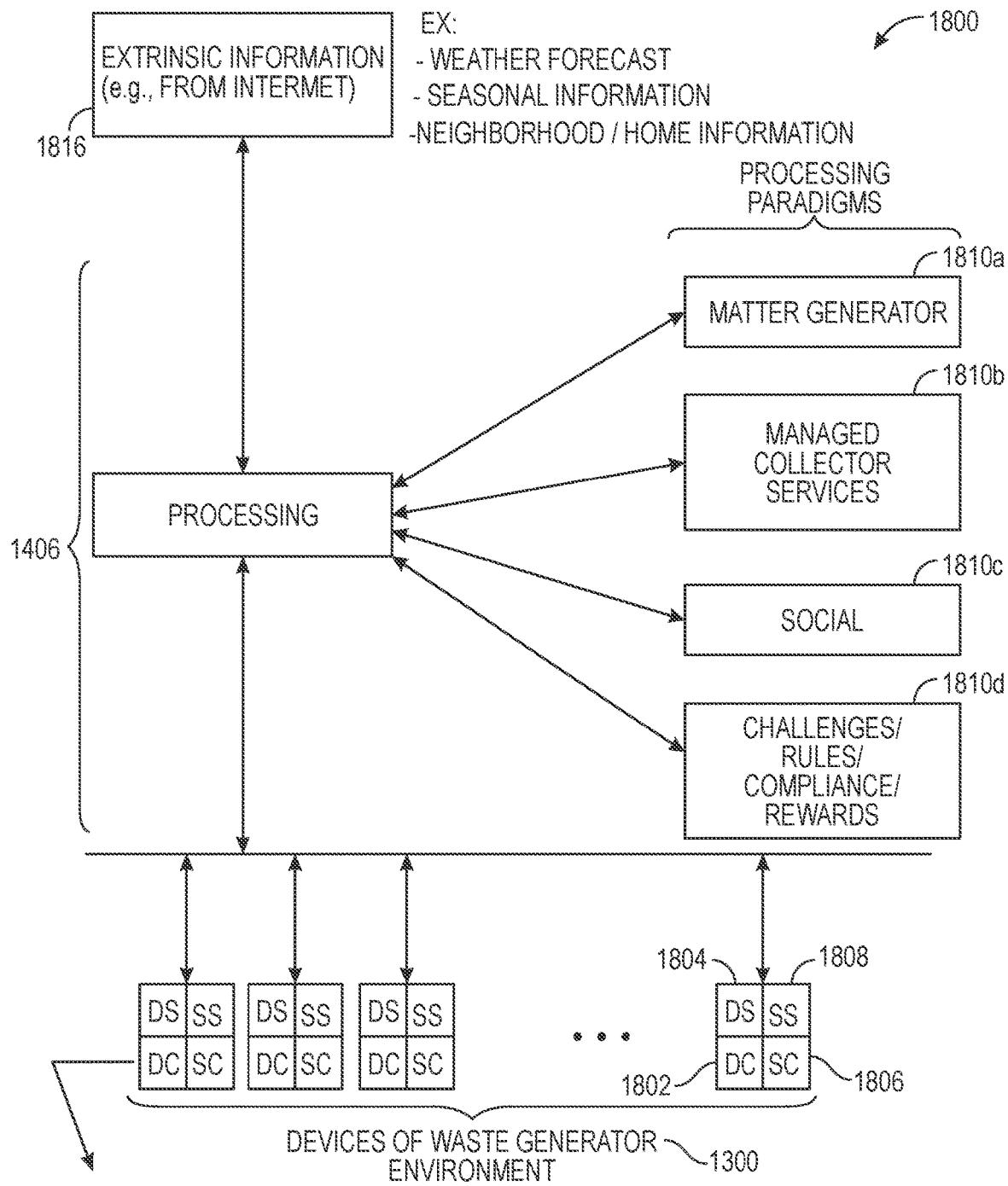
FIG. 18 illustrates an abstracted functional view of the extensible devices and services platform of FIG. 14 according to an embodiment.

FIG. 18 illustrates an abstracted functional view of the extensible devices and services platform 1400 of FIG. 14, with particular reference to the processing engine 1406, OMPA (e.g., OMPA 1302), mass sensing containers (e.g., MSC 1304), and other smart devices (e.g., smart devices 1306), such as those of the matter generator environment 1300 of FIG. 13. Even though devices situated in matter generation environments will have an endless variety of different individual capabilities and limitations, they can all be thought of as sharing common characteristics in that each of them is a data consumer 1802(DC), a data source 1804 (DS), a services consumer 1806(SC), and a services source 1808(SS). Advantageously, in addition to providing the essential control information needed for the devices to achieve their local and immediate objectives, the extensible devices and services platform 1800 can also be configured to harness the large amount of data that is flowing out of these devices. In addition to enhancing or optimizing the actual operation of the devices themselves with respect to their immediate functions, the extensible devices and services platform 1800 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 18 shows processing engine 1406 as including a number of paradigms 1810. Processing engine 1406 can include a managed matter generator services paradigm 1810a that monitors and manages primary or secondary device functions. The device functions can include ensuring proper operation of a device, implementing different operating parameters for a device (e.g., instruct the OMPA to execute a different OMPA input processing process), detecting a failure or compromised operation of the device (e.g., detect that the odor control system may need servicing because VOC have been detected at another device within the matter generator environment, operating the device at optimal times (e.g., when the occupants of the matter generator environment are not present or are sleeping or during times when energy costs are lowest), alerting the user of a condition of the OMPA (e.g., that the OMPA has completed a processing cycle and is ready to be emptied). Processing engine 1406 can further include a managed collector services paradigm 1810b that generates data for matter collectors (e.g., data that is transmitted to matter collectors who have accounts with system 1364). Paradigm 1810b may also generate promotional information for distribution to matter collectors who do not have accounts with system 1364. Processing engine 1406 can further include a social paradigm 1810c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users.

The processing engine 1406 can include a challenges/rules/compliance/rewards paradigm 1810d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to minimize disposal of food matter and other organics in conventional landfills, to live safely (e.g., reducing exposure to toxins or carcinogens), to conserve money and/or equipment life, to improve health, etc. For example, one challenge may involve participants reducing the number of times a matter collector collects matter from a matter generator during a period of time (e.g., a quarter or year) Those that successfully complete the challenge are rewarded, such as by coupons, virtual currency, status, etc. Regarding compliance, an example involves corroborating matter generator data with matter collector data to ensure that the matter generator is properly disposing of his matter.

The processing engine 1406 can integrate or otherwise utilize extrinsic information 1816 from extrinsic sources to improve the functioning of one or more processing paradigms. Extrinsic information 1816 can be used to interpret data received from a device, to determine a characteristic of the environment near the device (e.g., outside a structure that the device is enclosed in), to determine services or products available to the user, to identify a social network or social-network information, to identify statistical or environmental conditions, trends or other information associated with a home or neighborhood, and so forth.

An extraordinary range and variety of benefits can be brought about by, and fit within the scope of, the described extensible devices and services platform 1400, ranging from the ordinary to the profound. Thus, in one "ordinary" example, a matter generator can have OMPA 1302. During a processing event in which OMPA input is converted to OMPA output or after the processing event is complete, data pertaining to the OMPA input and/or OMPA output can be monitored, stored, and used by various entities (e.g., a collector) to make informed decisions on how best to handle the OMPA output. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same OMPA data can also be "repurposed" by the processing engine 1406 in the context of a matter collector paradigm of neighborhood matter generation. Thus, for example, the same OMPA data discussed in the "ordinary" example can be collected and made available for processing (properly anonymized) in which the matter generation for houses in a particular ZIP code can be identified and tracked. Other "profound" examples derived from organic matter data can include studies on when people are preparing or eating foods, studies of work cycles for a household, neighborhood, or city, studies of unusual patterns of food preparation or consumption, studies that estimate how many people are living in a particular household, neighborhood, city, or other geographic location. Using this information, matter collectors can optimize collection routes and schedules.

Figure 19A:
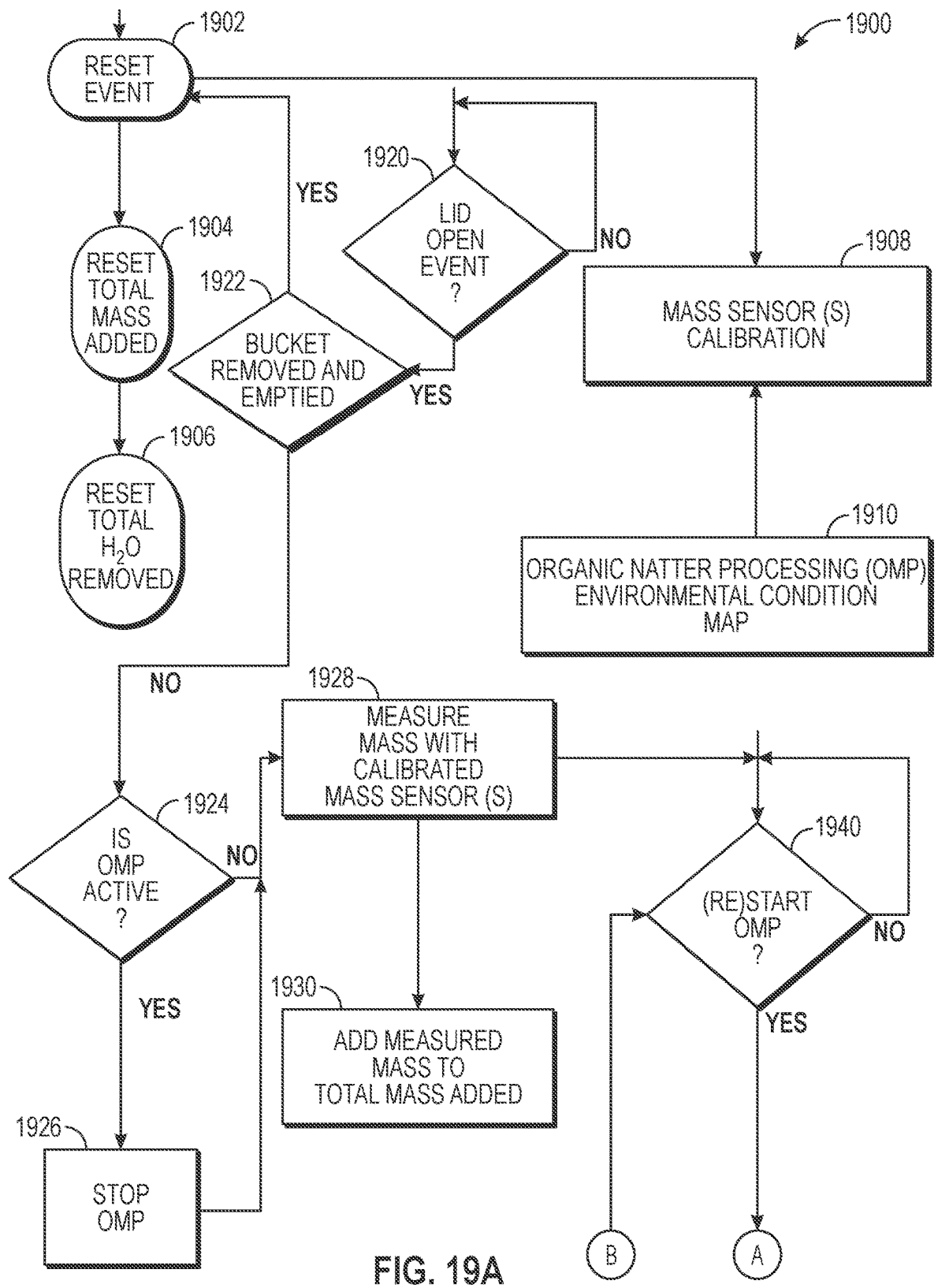
FIGS. 19A and 19B show an illustrative process for obtaining organic matter data according to an embodiment.
Figure 19B:
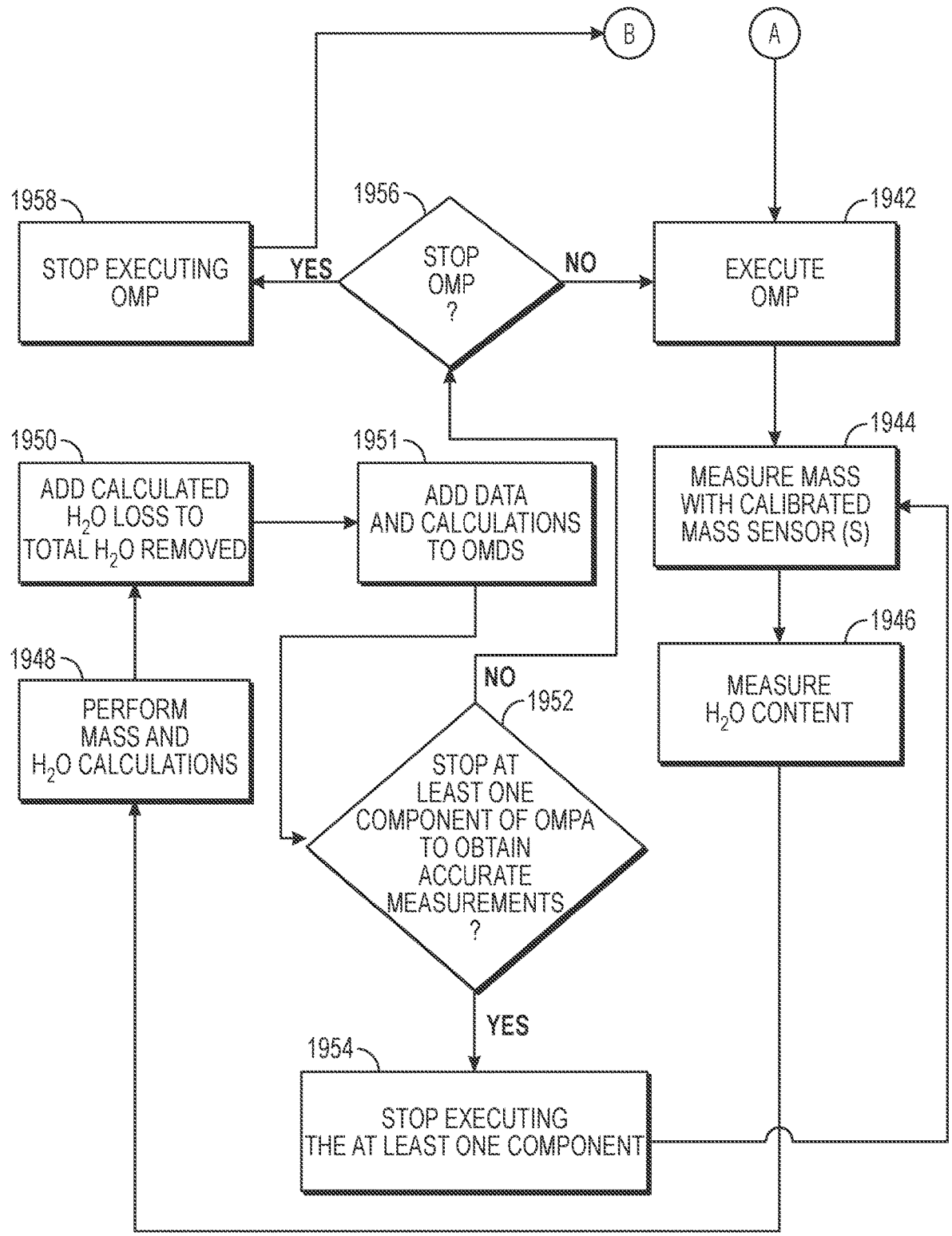
Figure 20:
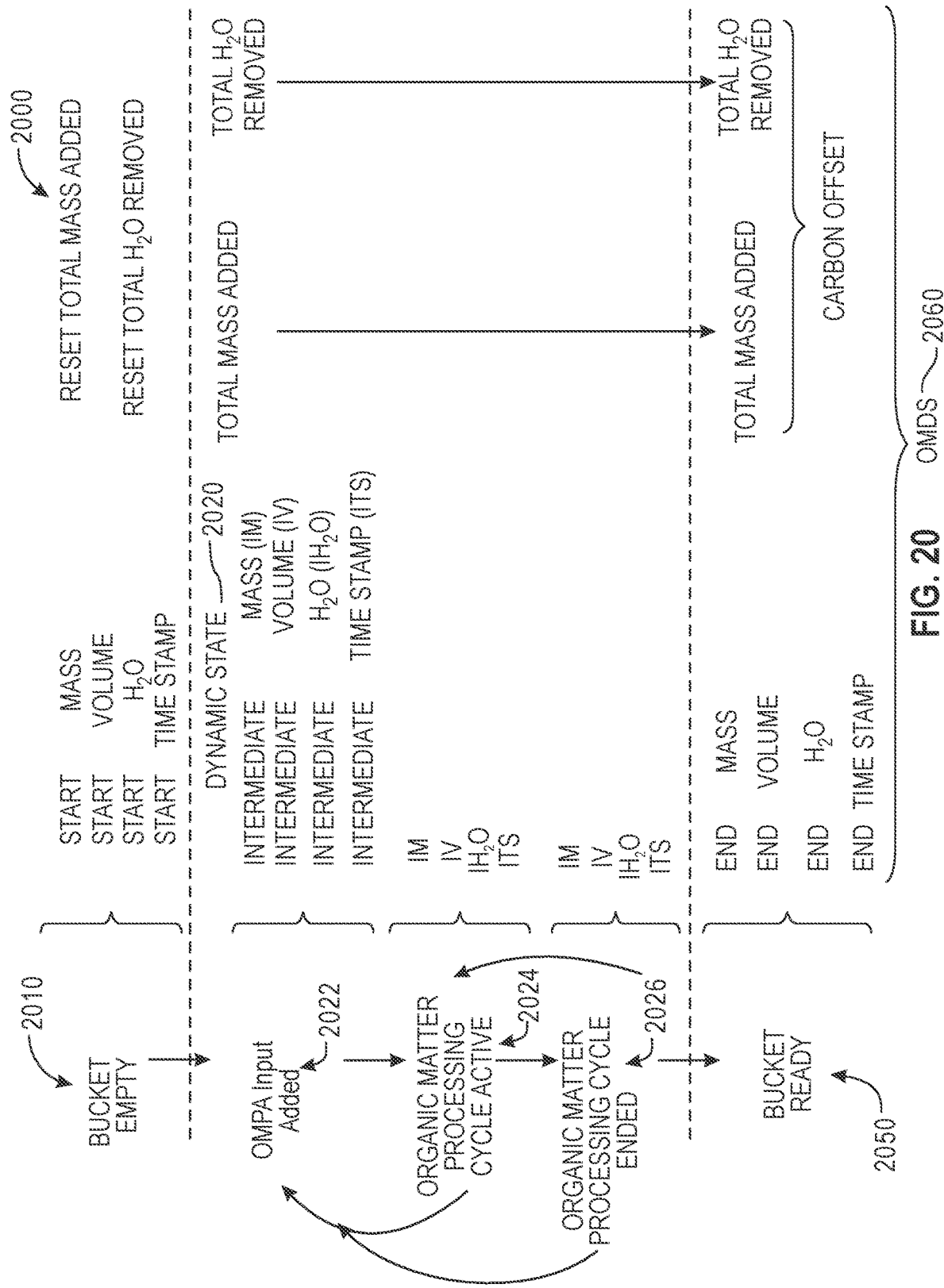
FIG. 20 shows an illustrative organic matter data set according to an embodiment.

Referring now to FIGS. 19A, 19b, and 20, an illustrative process 1900 for obtaining organic matter data and an illustrative organic matter data set 2000 are shown. In some embodiments, it is desirable to obtain accurate data from an organic matter processing apparatus (e.g., such as OMPA 100). Obtaining accurate organic matter data from the OMPA can be difficult because the environment in which the OMPA input is processed is highly dynamic in that there are many variables that can affect the ability to obtain accurate sensor readings. For example, the OMPA can use a combination of air flow, heat, paddling, and cutting to process the OMPA input. In addition, the user can randomly add OMPA input to the OMPA, which additions will affect organic matter measurements and calculations. For the purposes of organic matter data acquisition, there can be two steady state events in which data can be acquired, and any number of dynamic state events in which data can be acquired. For example, a first steady state event can be a bucket empty event—that is any contents of the bucket (e.g., bucket 500) are emptied and the bucket is reinserted into the OMPA. Thus, in the bucket empty steady state, an empty bucket is inserted into the OMPA and no OMPA input has been added. This is shown in FIG. 20, as bucket empty event 2010. The start of organic matter data acquisition may be obtained at the bucket empty steady state. For example, mass, volume, water, time stamp, and any other data values can be reset, zeroed (i.e., tare weight determined), or obtained during bucket empty event 2010.

A second state event may occur during a bucket ready event. For example, the OMPA has processed all OMPA input and converted the OMPA input to OMPA output and the bucket is too full to permit further processing of OMPA input. The end of organic matter data acquisition may be obtained at the bucket ready steady state. For example, FIG. 20 shows bucket ready event 2050 and end data values for mass, volume, water, time stamp, and any other data values can be obtained. For example, values for CO2, volatile organic compounds (VOCs), and other gasses may be obtained. In addition, cumulative data values such as total mass added and total water removed may be calculated at bucket ready event 2050. The total mass added and total water removed data values may be used as inputs for calculating a carbon offset data value. In an alternative embodiment, the second steady state may occur when contents within the OMPA have reached a steady state by being fully converted into OMPA output even though the bucket is not full.

Dynamic state events refer to times in between the bucket empty and bucket ready steady state events in which organic matter data acquisition can be performed. Dynamic state event 2020 may begin after bucket empty event 2010 has been completed and continue until the OMPA has reached bucket ready event 2050 or contents within the OMPA have reached a steady state by being fully converted into OMPA output even though the bucket is not full. Many different intermediate organic matter data acquisitions can be obtained during the dynamic state event. For example, FIG. 20 shows dynamic state event 2020 in which several intermediate data values can be obtained at multiple different times before, after, or during one or more organic matter processing (OMP) cycles within dynamic state event 2020. As illustrated in FIG. 20, intermediate data values can be obtained after OMPA input is added to the OMPA (at 2022), while the organic matter processing cycle is active (at 2024), or after an organic matter processing cycle has ended (at 2026). In addition, total mass added values and total water removed values may be updated during dynamic state event 2020.

Organic matter data set (OMDS) 2060 represents a collection of data acquired during any one or more of bucket empty event 2010, dynamic state event 2020, or bucket ready event 2050. The OMPA can continuously update OMDS 2060 by incorporating acquired data, regardless of when the data was acquired. The OMPA may periodically transmit OMDS 2060 to a central system (e.g., system 1364) or in response to data request from a user via his or her personal device or by a central system.

Referring now to FIGS. 19A and 19B, process 1900 for obtaining organic matter processing data is now discussed. Many steps in process 1900 may be executed asynchronously, for example, in response to user action such as removal of the bucket, by opening of the lid to insert OMPA input, automatically restarting a processing cycle, or calibrating mass sensor(s). A reset event 1902 may occur in response to a user removing and emptying a bucket and placing the empty bucket back into the OMPA. In one embodiment, reset event 1902 may occur when the bucket is removed from the OMPA. If desired, reset event 1902 can also occur when the bucket is inserted into the OMPA. Executing reset event 1902 in response to both bucket removal and bucket insertion provides two points of data. During use of the OMPA, it may not be known whether the bucket is fully emptied when it has been re-inserted. This unknown can make it difficult to know a "golden" mass value to use for calibration. However, mass sensor values obtained when the bucket is removed may be used a "golden" value for calibration. A total mass added value may be reset at step 1904 and a total water removed value may be reset at step 1906. If the user removes the bucket to add more OMPA input and then replaces the bucket, then process 1900 may proceed step 1924. As previously discussed in connection with FIG. 20, the total mass added and total water removed are values that are measured and tabulated for inclusion into FWDS 2060.

One or more mass sensors may be calibrated after reset event 1902. That is, after the bucket is returned to the OMPA, the mass sensor(s) are calibrated. Calibration can assign a measure value obtained from the mass sensor(s) to an absolute known weight. Tare can refer to resetting an interpreted value of a mass reading to be a new zero point. Calibration may be performed initially at the factory and anytime the OMPA reasonably believes it knows the golden mass (e.g., when the bucket is removed). Tare events can occur anytime. In some embodiments, the OMPA can track deltas in mass measurements. The tare events can take place on a fixed schedule (e.g., daily basis) or in response to an event (e.g., before start of OMP cycle or after a OMP cycle has finished). It should be appreciated that in an ideal operating environment, the bucket would maintain a constant weight when it is emptied of its OMPA output. However, over time and use of the bucket, the weight of the bucket may change (e.g., perhaps not all OMPA input is removed due to inadequate cleaning or certain OMPA input remnants become permanently fixed to the bucket). Such changes in bucket weight can be accounted for through calibration of the sensor(s). In addition, mass sensor(s) calibration can account for environmental conditions that may be present within and outside of the OMPA. For example, temperature and humidity may factor into calibration of the mass sensors. The mass sensing system or mass sensor(s) is operative to obtain mass values. These mass values may be represented in a unit of weight (e.g., ounces, pounds, grams, or kilograms).

There may be instances when a user removes the bucket to place OMPA input therein. For example, the user may place the bucket onto a counter next to a cutting board. When the bucket is in re-inserted into the OMPA with OMPA input contained therein, this type of re-insertion should not trigger a reset of mass values or water content values nor calibration. The OMPA can detect that a "non-empty" bucket has been inserted and can conduct processing as needed and continue to obtain organic matter data without affecting accuracy of the data.

In one embodiment, the OMPA may use multiple mass sensors. For example, if the bucket has four feet, a mass sensor may be positioned within OMPA to measure the mass at each foot. In this example, four mass sensors are present. As another example, a single mass sensor may be used to measure the mass of the bucket. The type of mass sensor can include, for example, a weight scale, a piezoelectric mass sensing device, a load cell, a floor scale, or a strain gauge type of sensing device. For ease of reference throughout this specification mass sensors will be referred to herein the plural sense, though it is possible that only one mass sensor could be used.

Mass sensors may experience sensor drift in response to changes in environmental conditions. For example, environmental conditions caused by operation of the OMPA such as increased temperature may cause the mass sensors to drift. To compensate for such drift, an OMP environmental conditions map 1910 may be used. Map 1910 may re-calibrate the mass sensors based on observed environment conditions or inputs known to affect environmental conditions (e.g., run-time of one or more heating elements). Thus, use of map 1910 in conjunction with sensor calibration can ensure that accurate mass measurements are acquired throughout all stages of organic matter processing.

At step 1920, a determination is made as to whether a lid opening event has occurred. For example, a lid opening event may occur when a user desires to place OMPA input into the OMPA, when the bucket is removed, or to view the contents of the bucket. If the determination at step 1920 is NO, process 1900 may revert back to step 1920. If the determination at step 1920 is YES, a determination is made whether the bucket is removed and emptied at step 1922. If YES at step 1922, process 1900 may proceed to reset event 1902. If NO at step 1922, a determination of whether organic matter processing is active (e.g., OMPA input is being paddled, ground, and/or heated) is made at step 1924. If YES, then the organic matter processing or portion thereof may be stopped at step 1926. For example, the OMPA may stop operation of the paddle(s) and cutter(s) when the lid is open but may maintain operation of other components such as the fan(s) and heating element(s). After step 1926 or if the determination at step 1924 is NO, the mass can be measured with calibrated sensors at step 1928.

The mass measurement taken at step 1928 can correspond to a starting mass measurement or an intermediate mass measurement (as discussed in connection with FIG. 20). If desired, a delta mass measurement can be obtained. This mass measurement or the delta can be added to the total mass added value at step 930.

Process 1900 may decide to start or restart OMPA at step 1940. This determination may made asynchronously or in response to completion of the mass measurement at step 1928. For example, when OMPA input is inserted into the bucket, the OMPA may commence or recommence if the OMPA was already processing OMPA input. As another example, there may be times when the processor has intentionally stopped operation of organic matter processing, but the OMPA input has not yet been fully converted to OMPA output. In such a scenario, the organic matter processing will need be restarted, and such a restart determination can occur at step 1940. If the determination at step 1940 is NO, process 1900 may loop back to step 1940. If the determination at step 1940 is YES, organic matter processing may be executed at step 1942.

Mass can be measured with calibrated mass sensors at step 1944 and water content can be measured at step 1946. Water content or moisture content can be measured using primary (direct) approaches (e.g., Karl Fish chemical analysis or loss on drying method), secondary (indirect) approaches (e.g., electrical methods, microwave, nuclear, near infrared), and through use of psychrometrics (e.g., quantity of water lost in exhaust in loss of drying method). In a psychometric approach, the OMPA measures ambient air temperature and relative humidity, the exhaust air temperature and relative humidity, and mass air flow to calculate a mass balance equation regarding the water content leaving the OMPA input. With knowledge of the air temperature and relative humidity, psychometric charts/equations can be used to determine the absolute humidity (in grams H20 per cubic meter). Knowledge of the air flow rate of the air moving through the OMPA enables calculation of the rate by which this water is flowing out.

Consider the following illustrative example. Imagine the OMPA is operating in a typical indoor ambient condition of 70 F at a 50% relative humidity. Wet OMPA input is added to the OMPA. As the OMPA input is processed, heaters are warming up the OMPA input, an exhaust fan is sucking air out of the processing chamber and through the odor management system before it exits the OMPA, and air from the ambient environment is being drawn into the OMPA. As the OMPA input heats up, the water content therein is turned into water vapor, thus increasing the amount of water in the air, and thus affecting the air temperature and relative humidity. The exhausted air coming out of the processing chamber could have an air temp of 85 F with a 80% Relative humidity. By measuring the air temperature and relative humidity (and thus calculating its absolute humidity through psychrometric equations), the water content of the air exiting the chamber can be calculated. If the OMPA input is completely dry and not contributing water vapor/moisture to the exhausted air, then the exhausted air will have the same water content as the ambient air. Thus, by computing the water content of the exhaust air and subtracting the water content of the ambient air, the moisture content of the OMPA input inside the bucket can be calculated.

Mass sensor data which provides another measurement of seeing the transformation of the OMPA input. As OMPA input dries out, the mass of the moisture/water inside of it reduces down. Mass also leaves the OMPA input through carbon dioxide, trace gases, and other volatile organic compounds (VOCs). However, once all this transitional mass escapes the OMPA, then the change in its measured mass over time will approach zero, because there is nothing left to escape and change the mass. Therefore, the derivative of mass readings can be used as a gauge of how dry the OMPA input is, and thus its moisture content.

The OMPA may sensors that measure ambient air temperature and relative humidity, exhaust air temperature and relative humidity, and mass of the OMPA input. A sensor fusion algorithm can be used to estimate moisture content of the OMPA input based on these three data points. Air flow rate through the OMPA can be a known value or a separate sensor can be included to monitor air flow rate.

Other measurements such as, for example, a volume measurement or volume estimation may be taken. Each measurement may have an associated time stamp. Mass and water calculations can be performed at step 1948. These calculations may be performed independently by the OMPA, remotely by system 1364, or by a user personal device. These calculations can include, among other values, water loss. At step 1950, the calculated water loss can be added to the total water removed value. At step 1951, the measured data and any calculations made thereon can be added to a organic matter data set (OMDS). This OMDS can then be transmitted to a central system for further processing.

At step 1952, a determination is made as to whether at least one component of the OMPA should be stopped. For example, it may be desirable to stop the paddle/cutting action so that more accurate sensor readings can be obtained. If the determination at step 1952 is YES, the at least one component is temporarily stopped from being executed at step 1954 and the process proceeds back to steps 1944, 1946, 1948, 1950, and 1952. If the determination at step 1952 is NO, process 1900 may determine whether to stop the organic matter processing at step 1956. If the determination at step 1956 is YES, the organic matter processing ceases to execute at step 1958. If the determination at step 1956 is NO, process 1900 returns to step 1942, at which point all components of the organic matter processing may be activated and no longer selectively turned off to acquire data.

It should be appreciated that the steps shown in FIG. 19 are illustrative and that additional steps may be added, steps may be omitted, or the order of the steps may be changed. For example, a step may be added to transmit the OMDS to a central system.

Figure 21A:
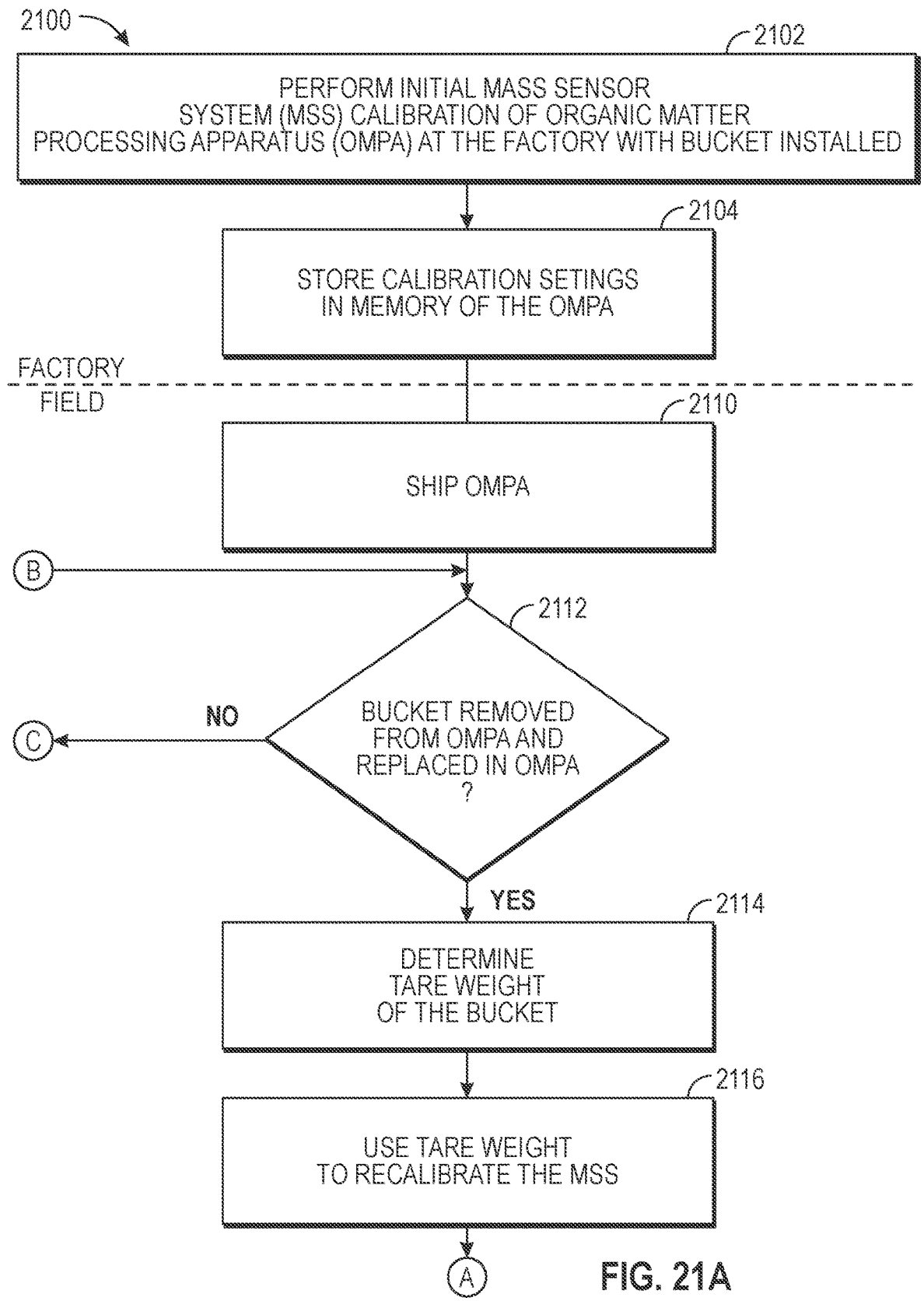
FIGS. 21A-21C shows an illustrative process for measuring mass according to an embodiment.
Figure 21B:
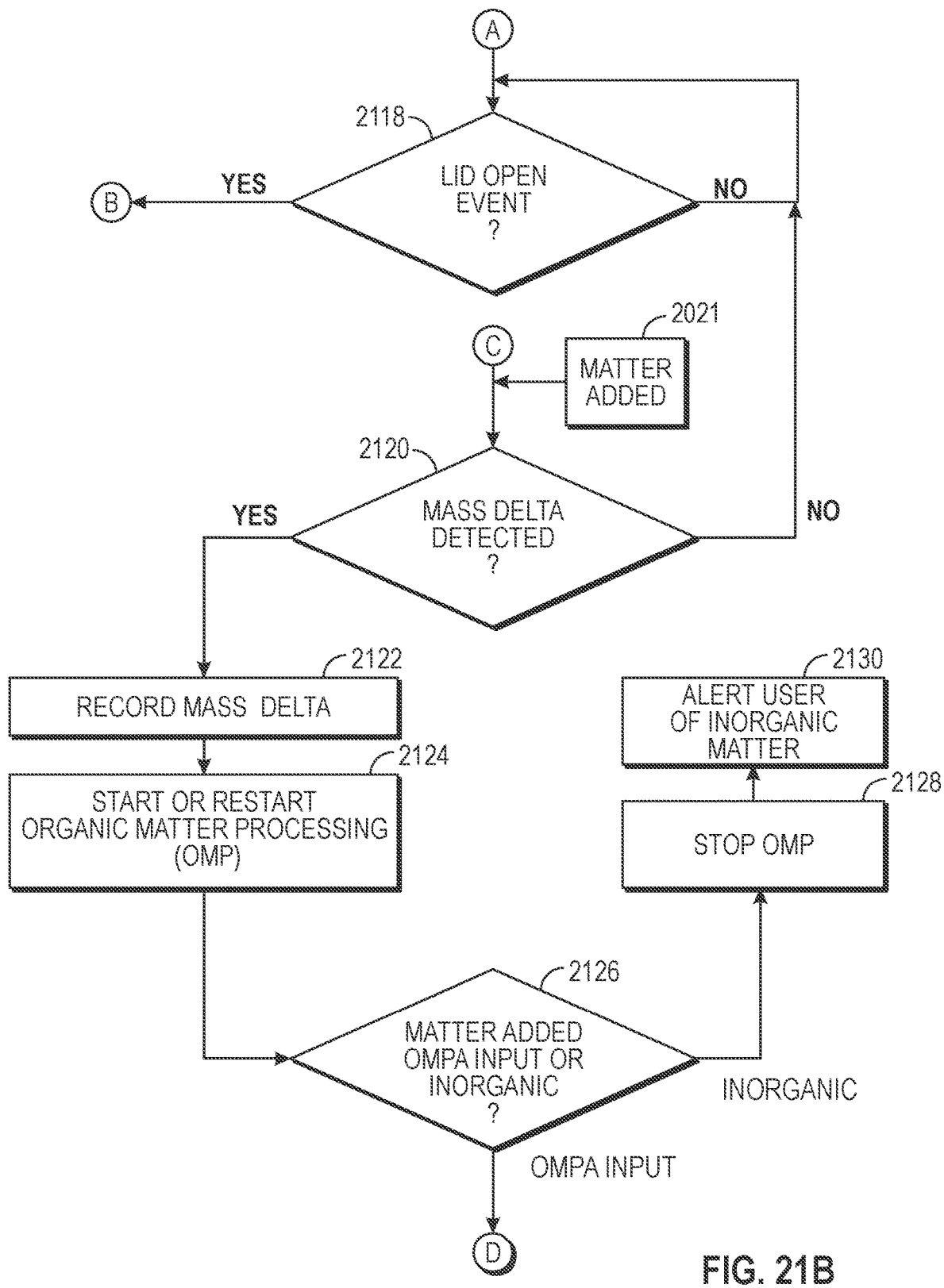
Figure 21C:
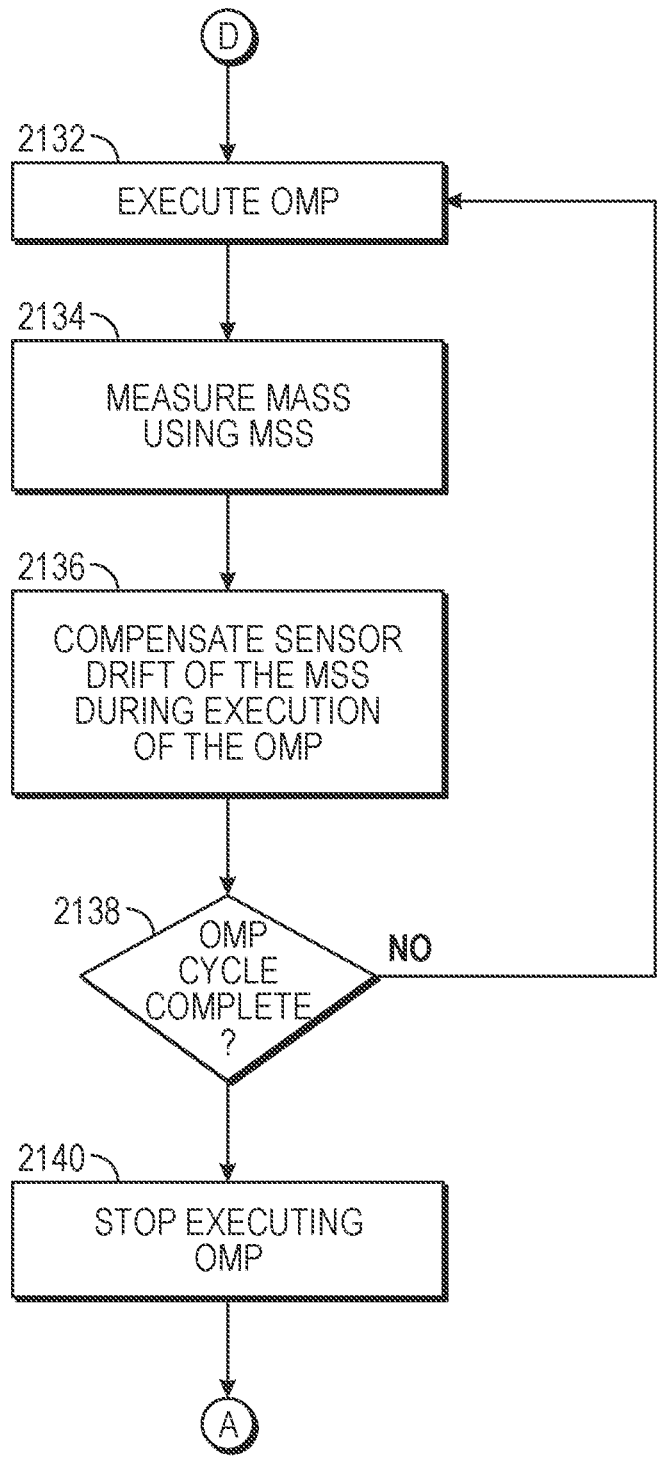

FIGS. 21A-21C shows an illustrative process 2100 for measuring mass according to an embodiment. Starting at step 2102, initial calibration of a mass sensor system (MSS) of the OMPA can be performed at a factory with the bucket installed. The calibration settings can be stored in a memory of the OMPA at step 2104. Steps 2102 and 2104 may represent steps that are performed at a factory or place of assembly of the OMPA. At step 2110, the OMPA can be shipped to a user, at which point the OMPA is in the field. If desired, additional calibration and/or tare execution can be performed after a user sets up the OMPA and turns it on.

At step 2112, a determination is made as to whether a bucket is removed from the OMPA and placed into the OMPA. If the determination at step 2112 is YES, process 2100 may determine tare weight of the bucket at step 2114 and use the tare weight to recalibrate the MSS at step 2116. In some scenarios, a user may place OMPA input into the bucket as it is being returned to the OMPA. In this situation, the tare weight determination at step 2114 will be inaccurate because the early introduction of OMPA input will affect the recalibration of the MSS at step 2116. For example, the OMPA may determine that the tare weight exceeds a delta threshold from an expected tare weight range. In this situation, the OMPA may revert to using the initial MSS calibration settings stored in the memory.

Following step 2116, process 2100 may determine whether there was a lid open event at step 2118. If NO, process 2100 reverts to step 2118. If the determination at step 2118 is YES, process 2100 can return to step 2112. If the determination at step 2112 is NO, process 2100 can determine whether a mass delta is detected at step 2120. A mass delta can be detected if matter is added at step 2021. If the determination at step 2120 is NO, process 2100 can revert to step 2118. If the determination at step 2120 is YES, the mass delta is recorded at step 2122 and organic matter processing (OWP) may be started or restarted at step 2124. At step 2126, a determination is made whether the matter added is OMPA input (e.g., matter that is grindable) or inorganic matter (e.g., matter that is not grindable). If the added matter is inorganic, the organic matter processing may be stopped at step 2128 and a user may be alerted of the addition of the inorganic matter at step 2130. The OMPA may be able to determine that inorganic matter has been added based on weight characteristics, how the matter is interacting with the paddle and cutter system (e.g., paddle and cutter system is unable to rotate), or any other measurable characteristics. In another embodiment, step 2126 can make a determination whether the OMPA input is grindable or not grindable by monitoring motor current or other motor characteristic. If the OMPA input is not grindable, process proceeds to step 2128.

If OMPA input or grindable input is determined to be added at step 2126, the organic matter processing may continue to be executed at step 2132. Mass be measured by the mass measuring system at step 2134. Sensor drift of the mass measuring system may be compensated during operation of the organic matter processing at step 2136. For example, the mass measuring system may be affected by temperature variations. Temperature variations can be caused heat sources located within the OMPA and heat sources located external to the OMPA (e.g., radiant heated floors, HVAC vents that supply hot or cold air). The temperature can be monitored and the mass measuring system can be calibrated based on the monitored temperature. When the organic matter processing cycle is determined to be complete at step 2138, process 2100 may stop executing the organic matter processing at step 2140 and then revert back to step 2118. If the organic matter processing cycle is not complete, process 2100 may return to step 2132.

It should be appreciated that the steps shown in FIG. 21 are illustrative and that additional steps may be added, steps may be omitted, or the order of the steps may be changed. For example, if a mass increase event is detected even though the lid has not been opened, it can be inferred that the mass increase is caused by some external event (e.g., somebody put an object on the OMPA, the OMPA was moved, or it is noise that can be intelligently ignored). The presence of multiple sensors in the OMPA, data such as mass data can be intelligently scrubbed for accuracy.

Figure 22:
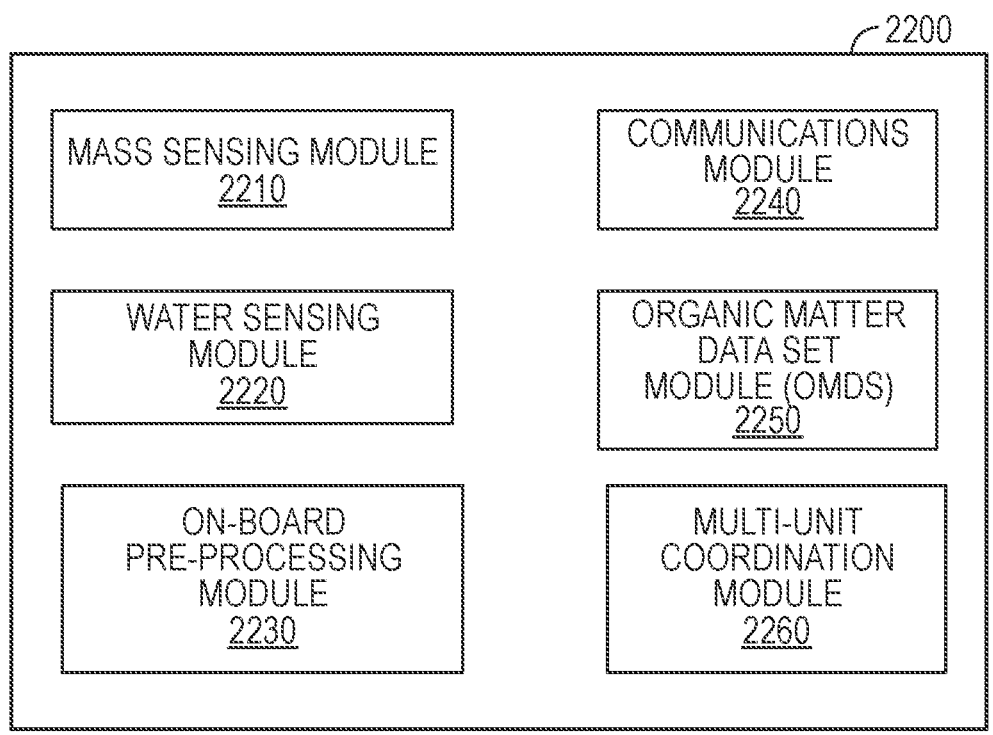
FIG. 22 shows an illustrative block diagram of various modules that are included with an OMPA according to an embodiment.

FIG. 22 shows an illustrative block diagram of various modules that are included with OMPA 2200 according to an embodiment. These modules may be responsible for acquiring data for the organic matter data set, calculating values to be included in the organic matter data set, communicating with other devices within a matter generation environment, and communicating with devices outside of the matter generation environment. OMPA 2200 can include mass measuring module 2210, water measuring module 2220, sensor module 2225, on-board pre-processing module 2230, organic matter data set module 2240, communications module 2250, and multi-unit coordination module 2260. Mass measuring module 2210 is responsible for acquiring mass data (e.g., weight) from a mass measuring system. For example, mass measuring module may obtain mass data at a bucket empty event, dynamic events, and bucket ready event. Water measuring module 2220 may be responsible for determining water content of the contents contained in the bucket. Module 2220 may further be able to determine how much water has been removed from OMPA 2200. Sensor module 2225 may be responsible for receiving and processing data acquired from various sensors located within OMPA 2200. For example, the sensors can include one or more temperature sensors, a VOC sensor, a humidity sensor, mass sensors, a $CO_2$ sensor, lidar, camera, proximity sensor, etc. On-board pre-processing module 2230 may be responsible for performing calculations using the data acquired by mass measuring module 2210, water measuring module 2220, and any other source of data. The calculations can include, for example, total mass added, total water removed, and a carbon offset. Organic matter data set module 2240 may be responsible for packaging acquired data and calculated data into an organic matter data set. Module 2240 may include mass data, volume data, water data, time stamps, location data, account number data, carbon offset data, and other data in the organic matter data set. Module 2240 may specify the frequency in which the organic matter data set is prepared. Communications module 2250 can be responsible for communicating with a personal device such as user's smart phone or tablet, a central system, and other organic matter processing units or mass sensing units located within the same matter generating environment. Multi-unit coordination module 2260 may be responsible for coordinating acquisition of data from other OMPAs or mass sensing units located within the same matter generating environment. For example, if matter generating environment has an OMPA and a mass measuring container, the mass measuring container can transmit a mass sensing data set to module 2260. The mass sensing data set can be transmitted to a central server or a personal device via communications module 2250.

It should be appreciated that the steps shown in FIG. 22 are illustrative and that additional steps may be added, steps may be omitted, or the order of the steps may be changed.

Figure 23:
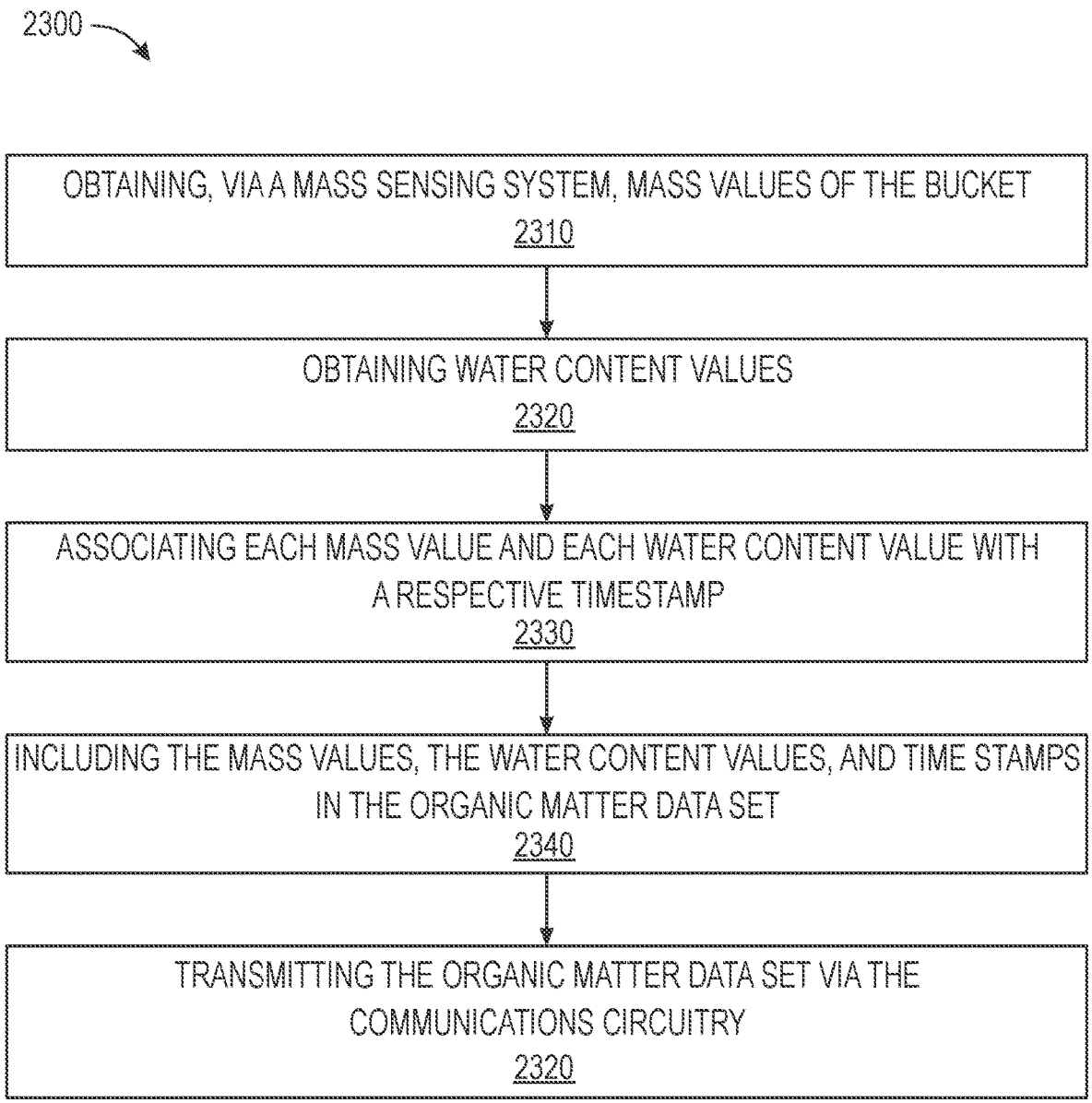

FIG. 23 shows illustrative process 2300 according to an embodiment. Process 2300 may be implemented in an OMPA having a bucket, mass sensing system, communications circuitry, and a processor. Mass values of the bucket can be obtained via the mass sensing system at step 2310. Mass values can be obtained anytime the bucket is inserted into the OMPA. Water content values can also be obtained at step 2320. The water content values can be estimated based on measurements such as rate of mass loss, change in input versus output humidity, and energy used to maintain temperature. Each mass value and each water content value can be associated with a respective timestamp at step 2330. The mass values, water content values, and associated timestamps can be included in an organic matter data set at step 2340. If desired, various calculations can be made based on the mass values and water content values. For total mass added and total water content removed values can be calculated and included into the organic matter data set. The organic matter data set can be transmitted via the communications circuitry at step 2350. For example, the organic matter data set can be transmitted to a central system.

It should be understood that the step shown in FIG. 23 are illustrative and the order of the steps may be changed, additional steps may be added, or steps may be omitted. For example, the mass sensing system can be calibrated during operation of an organic matter processing cycle, wherein the organic matter processing cycle adds heat to the OMPA during the organic matter processing cycle, and wherein calibrating the mass sensing system compensates for the added heat.

FIG. 24 shows illustrative process 2400 according to an embodiment. At step 2410, process 2400 can receive a plurality of organic matter data sets (OMDSs) from a plurality of matter generators affiliated with a matter collector, wherein each of the plurality of matter generators comprises an OMPA operative to convert OMPA input into OMPA output and collect data for populating a OMDS. At step 2420, the plurality of OMDSs can be processed to produce derived data. The derived data can be provided to the matter collector at step 2430.

At step 2440, process 2500 can receive a chart of accounts from the matter collector, the chart of accounts comprising a list of all matter generators having an account with the matter collector, including non-participating matter generators that do not have an OMPA that transmits a OMDS and the plurality of matter generators that do transmit an OMDS. Based on the plurality of OMDSs received from the plurality of matter generators and the chart of accounts, a missed opportunity value representing a quantity of organic matter being generated by the non-participating matter generators can be generated at step 2450. The missed opportunity value can be included in the derived data at step 2450.

It should be understood that the steps shown in FIG. 24 are illustrative and the order of the steps may be changed, additional steps may be added, or steps may be omitted.

FIG. 25 shows illustrative process 2500 according to an embodiment. At step 2510, process 2500 may receive a plurality of organic matter data sets (OMDSs) from a plurality of matter generators, wherein each of the plurality of matters generators comprises an OMPA operative to OMPA input into OMPA output and collect data for populating an OMDS, wherein the OMDS specifies an OMPA output ready status. At step 2520, the plurality of OMDSs can be processed to produce derived data. At step 2530, the derived data can be provided to a partner entity operative to make arrangements to retrieve OMPA output from a particular matter generator when the OMPA output ready status is set to a retrieval ready state. For example, the partner entity can send a pre-paid, self-addressed, package to a matter generator having the OMPA output ready status set to the retrieval ready state, wherein the matter generator places the food grounds into the package and ships the package to an OMPA output processing facility. As another example, the partner entity can arrange for a third-party vendor to retrieve the OMPA output from a matter generator having the OMPA output ready status set to the retrieval ready state and have that third party vendor deliver the OMPA output at an OMPA output processing facility. In yet another example, the partner entity manage an arrangement with a matter collector that collects matter from the matter generators, including matter generators that provide OMPA output, receive the OMPA output from the matter collector at an OMPA output processing facility, and manage accounting with the matter collector or a matter generator that has had OMPA output retrieved from the matter collector.

It should be understood that the steps shown in FIG. 25 are illustrative and the order of the steps may be changed, additional steps may be added, or steps may be omitted.

Figure 26:

FIG. 26 shows illustrative process 2600 according to an embodiment. Process 2600 may be implemented in an OMPA having a bucket, mass sensing system, communications circuitry, and a processor. Process 2600 can determine a tare weight of the bucket when the bucket is re-inserted into the OMPA at step 2610. At step 2620, the tare weight can be used to calibrate the mass sensing system. At step 2630, a mass value of the bucket can be recorded using the mass sensing system in response to an open lid event. An active cycle of organic matter processing can be started at step 2640. During the active cycle of organic matter processing, mass values can be recorded using the mass sensing system, and the mass sensing system can recalibrated to compensate for sensor drift at step 2650. The active cycle of organic matter processing can be stopped at step 2660.

It should be understood that the steps shown in FIG. 26 are illustrative and the order of the steps may be changed, additional steps may be added, or steps may be omitted.

Figure 27:
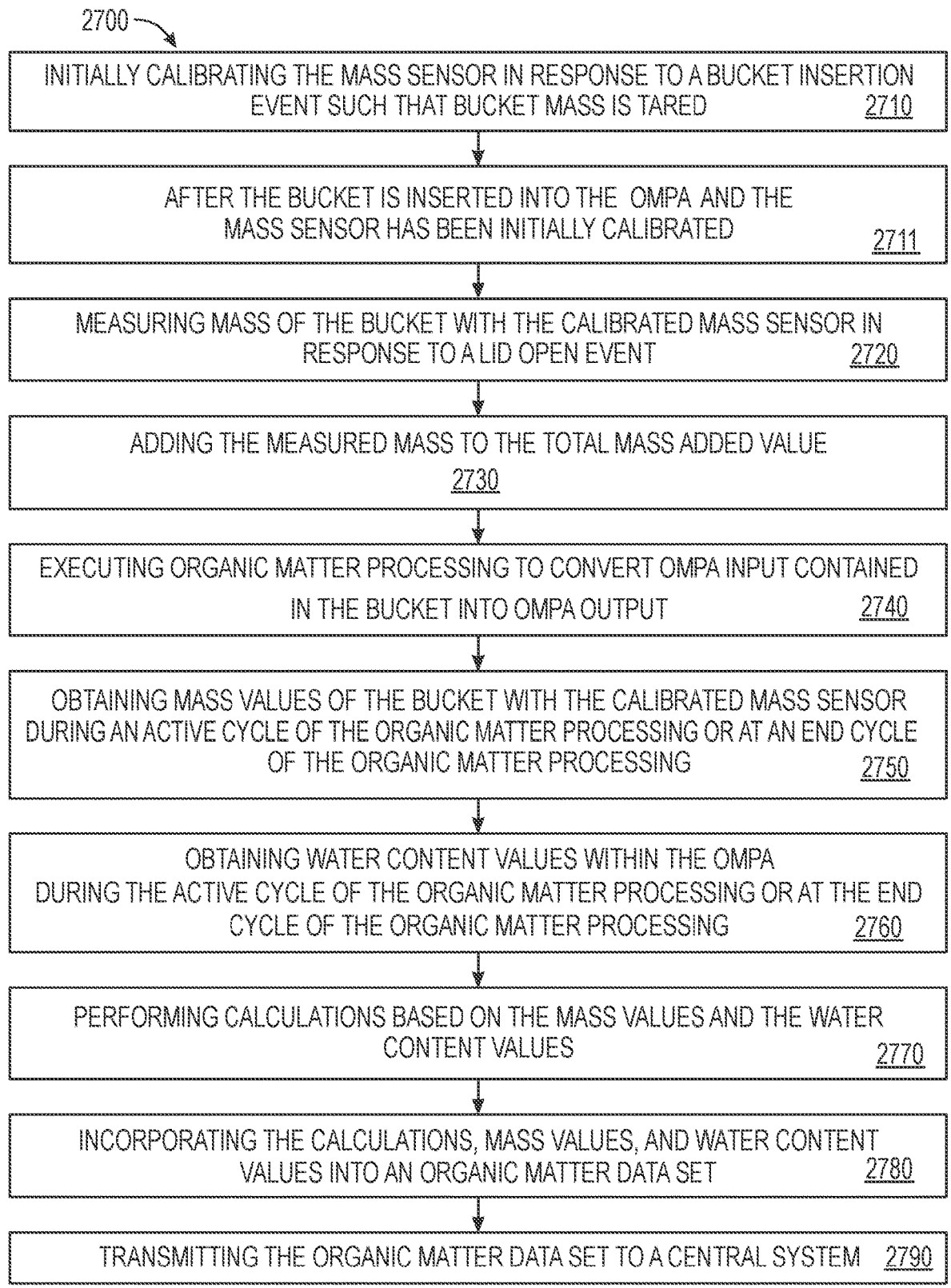

FIG. 27 shows illustrative process 2700 according to an embodiment. Process 2700 may be implemented in an OMPA having a bucket, mass sensing system, communications circuitry, and a processor. Process 2700 can initially calibrate the mass sensor in response to a bucket insertion event such that bucket mass is tared at step 2710. After the bucket is inserted into the OMPA and the mass sensor has been initially calibrated at step 2711, process 2700 may execute steps 2720, 2730, 2740, 2750, 2760, 2770, 2780, and 2790. At step 2720, mass of the bucket is measured with the calibrated mass sensor in response to a lid open event (e.g., because the user placed OMPA input into the OMPA). At step 2730, the measured mass can be added to the total mass added value. Process 2700 can execute organic matter processing at step 2740 to convert OMPA input contained in the bucket into OMPA output. Mass values of the bucket can obtained with the calibrated mass sensor during an active cycle of the organic matter processing or at an end cycle of the organic matter processing at step 2750. Water content values within the OMPA can be obtained during the active cycle of the organic matter processing or at the end cycle of the organic matter processing at step 2760. Calculations based on the mass values and the water content values can be performed at step 2770 and the calculations, mass values, and water content values can be included into an organic matter data set at step 2780. At step 2790, the organic matter data set can be transmitted to a central system.

It should be understood that the steps shown in FIG. 27 are illustrative and the order of the steps may be changed, additional steps may be added, or steps may be omitted.

Figure 28:
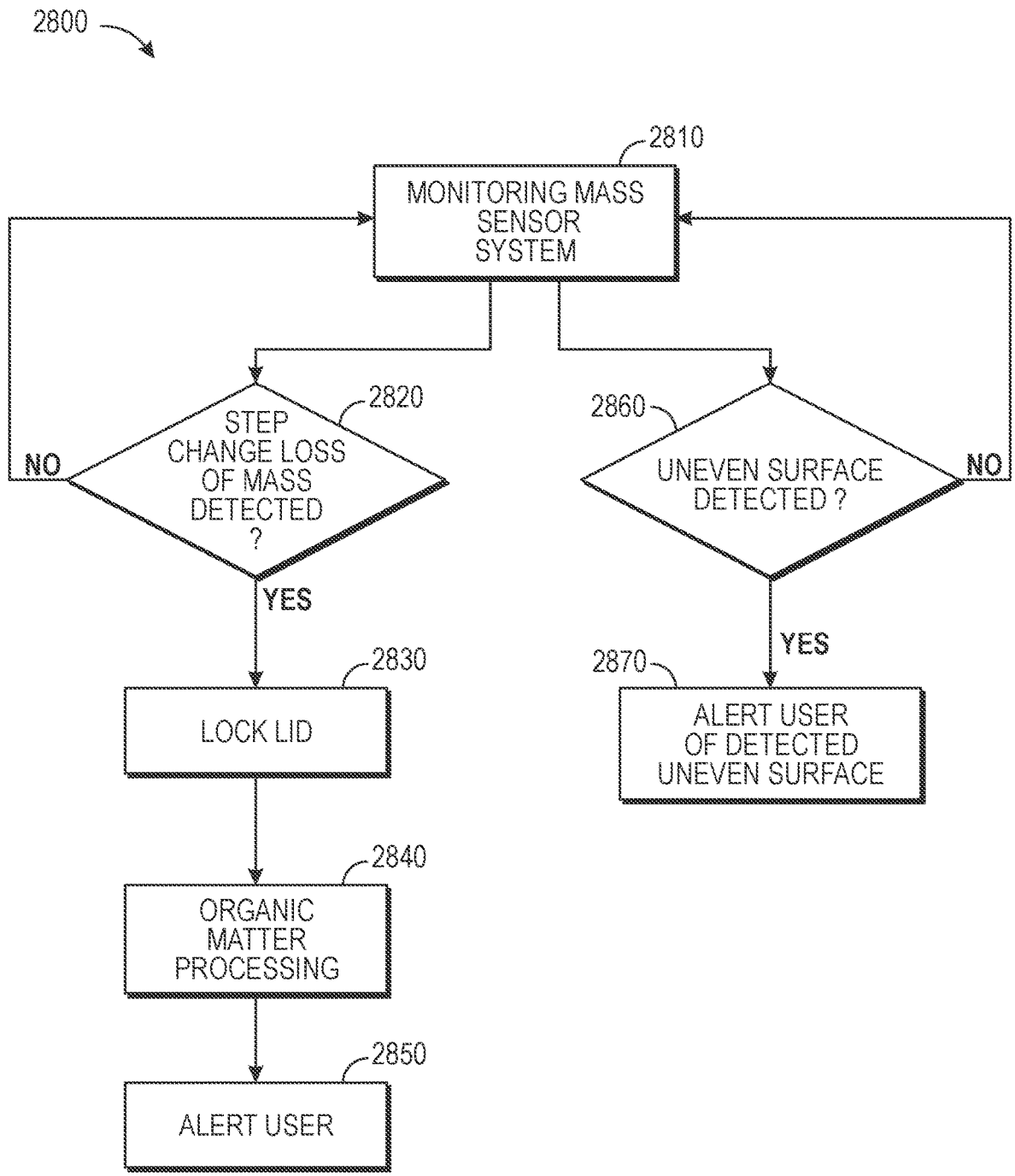

FIG. 28 shows illustrative process 2800 according to an embodiment. Process 2800 may be implemented in OMPA having a lid, a bucket, mass sensing system, communications circuitry, and a processor. At step 2800, the mass sensing system is monitored (at step 2810) to determine whether there is a step change loss in detected mass (at step 2820). If determination at step 2820 is YES, the lid is locked at step, 2830 and any organic matter processing, if operating, is stopped at step 2840, and the user is alerted at step 2850. A step change loss in detected mass can be caused by an OMPA that is tipping over or has tipped over. If the determination at step 2820 is NO, process 2800 reverts back to step 2810. If an uneven surface is detected at step 2860, the user may be alerted of the uneven surface at step 2870, otherwise process 2800 reverts back to step 2810.

It should be understood that the steps shown in FIG. 28 are illustrative and the order of the steps may be changed, additional steps may be added, or steps may be omitted.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement" expressly extend beyond just the particular subset of statements but refers to any of the statements below.

Statement 1. An organic matter processing apparatus (OMPA) comprising:
  a bucket configured to receive OMPA input that is treated by the OMPA to convert received OMPA input into OMPA output;
  a mass sensing system coupled to the bucket and configured to measure mass of the bucket;

communications circuitry; and a processor operative to:
- obtain mass values of the bucket throughout a bucket insert/bucket removal cycle;
- include the mass values in an organic matter data set; and
- transmit the organic matter data set via the communications circuitry.

Statement 2. The OMPA of any previous statement, further comprising:
- a water sensing system configured to measure water content within the OMPA; and
- wherein the processor is further operative to:
  - obtain water content values throughout the bucket insert/bucket removal cycle; and
  - include the water content values in the organic matter data set.

Statement 3. The OMPA of any previous statement, wherein the processor is further operative to:
- associate each mass value with a timestamp that is included in the organic matter data set; and
- associate each water content value with a timestamp that is included in the organic matter data set.

Statement 4. The OMPA of any previous statement, wherein the organic matter data set indicates how much OMPA input has been processed by the OMPA.

Statement 5. The OMPA of any previous statement, wherein the processor is further operative to calibrate the mass sensing system when the bucket is inserted into the OMPA.

Statement 6. The OMPA of any previous statement, wherein the processor is further operative to calibrate the mass sensing system during operation of an organic matter processing cycle, wherein the organic matter processing cycle adds heat to the OMPA during the organic matter processing cycle, and wherein calibration of the mass sensing system compensates for the added heat.

Statement 7. The OMPA of any previous statement, wherein the processor is further operative to:
- obtain a measured mass value with a calibrated mass sensor system in response to an open lid event;
- add the measured mass value to a total mass added value; and
- include the total mass added value in the organic matter data set.

Statement 8. The OMPA of any previous statement 8, wherein the processor is further operative to:
- execute organic matter processing of OMPA input contained in the bucket, the organic matter processing comprising paddling, cutting, and heating to convert OMPA input into OMPA output;
- obtain mass values and water content values during execution of the organic matter processing or after completion of the organic matter processing;
- perform mass calculations based on the obtained mass values;
- perform water content calculations based on the obtained water content values; and
- add mass calculations and water content calculations to the organic matter data set.

Statement 9. The OMPA of any previous statement, wherein the processor is further operative to:
- temporarily stop operation of the paddling and cutting; and
- obtain mass values and water content values while the paddling and cutting are temporarily stopped.

Statement 10. The OMPA of any previous statement, wherein the organic matter data set comprises:
- mass values;
- water content values;
- timestamps;
- total mass added; and
- total water removed.

Statement 11. The OMPA of any previous statement, wherein the organic matter data set is communicated to a central system that transmits a modified version of the organic matter data set to a matter collector or a third party partner.

Statement 12. A method for operating an organic matter processing apparatus comprising a bucket, a mass sensing system, communications circuitry, and a processor, the method comprising:
- obtaining, via the mass sensing system, mass values of the bucket throughout a bucket insertion/bucket removal cycle;
- including the mass values in an organic matter data set; and
- transmitting the organic matter data set via the communications circuitry.

Statement 13. The method of any previous statement 13, wherein the OMPA further comprises a water sensing system configured to measure water content within the OMPA, the method further comprising:
- obtaining water content values throughout the bucket insert/bucket removal cycle; and
- including the water content values in the organic matter data set.

Statement 14. The method of any previous statement, further comprising:
- associating each mass value with a timestamp that is included in the organic matter data set; and
- associating each water content value with a timestamp that is included in the organic matter data set.

Statement 15. The method of any previous statement, further comprising calibrating the mass sensing system when the bucket is inserted into the OMPA.

Statement 16. The method of any previous statement, further comprising calibrating the mass sensing system during operation of an organic matter processing cycle, wherein the organic matter processing cycle adds heat to the OMPA, and wherein calibrating the mass sensing system compensates for the added heat.

Statement 17. The method of any previous statement, further comprising:
- obtaining a measured mass value with a calibrated mass sensor system in response to an open lid event;
- adding the measured mass value to a total mass added value; and
- including the total mass added value in the organic matter data set.

Statement 18. The method of any previous statement, further comprising:
- executing organic matter processing of OMPA input contained in the bucket, the organic matter processing comprising paddling, cutting, and heating to convert OMPA input into OMPA output;
- obtaining mass values and water content values during execution of the organic matter processing or after completion of the organic matter processing;
- performing mass calculations based on the obtained mass values;
- performing water content calculations based on the obtained water content values; and adding mass calculations and water content calculations to the organic matter data set.

Statement 19. The method of any previous statement, further comprising:
  temporarily stopping operation of the paddling and cutting; and
  obtaining mass values and water content values while the paddling and cutting are temporarily stopped.

Statement 20. A method, comprising:
  receiving a plurality of organic matter data sets (OMDSs) from a plurality of matter generators affiliated with a matter collector, wherein each of the plurality of matter generators comprises an organic matter processing apparatus operative to:
    convert OMPA input into OMPA output; and
    collect data for populating a OMDS;
  processing the plurality of OMDSs to produce derived data; and
  providing the derived data to the matter collector.

Statement 21. The method of any previous statement, wherein the derived data enables the matter collector to optimize schedules and routes for collecting matter from the plurality of matter generators.

Statement 22. The method of any previous statement, wherein the derived data enables the matter collector to invoice account holders accordingly.

Statement 23. The method of any previous statement, wherein the each OMDS comprises:
  mass data;
  water data;
  timestamps; and
  at least one account number.

Statement 24. The method of any previous statement 24, wherein each OMDS further comprises location data.

Statement 25. The method of any previous statement, wherein each OMDS further comprises total mass added data and total water removed data.

Statement 26. The method of any previous statement 26, wherein the derived data comprises a carbon offset calculated from the total mass added data and the total water removed data.

Statement 27. The method of any previous statement, further comprising:
  receiving a chart of accounts from the matter collector, the chart of accounts comprising a list of all matter generators having an account with the matter collector, including non-participating matter generators that do not have a OMPA that transmits a OMDS and the plurality of matter generators that do transmit a OMDS;
  based on the plurality of OMDSs received from the plurality of matter generators and the chart of accounts, calculating a missed opportunity value representing a quantity of organic matter being generated by the non-participating matter generators; and
  including the missed opportunity value into the derived data.

Statement 28. The method of any previous statement, further comprising:
  generating matter generator derived data based on the plurality of OMDSs; and providing the matter generator derived data to the plurality of matter generators.

Statement 29. The method of any previous statement, further comprising:
  generating partner derived data based on the plurality of OMDSs; and
  providing the partner derived data to a partner such that the partner makes arrangements to retrieve OMPA output from one or more of the plurality of matter generators.

Statement 30. The method of any previous statement, further comprising:
  receiving a mass sensing data set (MSDS) from one of the plurality of matter generators, wherein a matter generator transmitting the MSDS comprises a mass sensing container operative to collect data for populating a MSDS, the data including mass added to the mass sensing container;
  processing the MSDS to produce additional derived data; and
  providing the additional derived data to the matter collector.

Statement 31. The method of any previous statement, wherein the MSDS comprises:
  mass values;
  timestamps; and
  at least one account number.

Statement 32. A method, comprising:
  receiving a plurality of organic matter data sets (OMDSs) from a plurality of matter generators, wherein each of the plurality of matter generators comprises an organic matter processing apparatus (OMPA) operative to convert OMPA input into OMPA output and collect data for populating a OMDS, wherein the OMDS specifies a OMPA output ready status;
  processing the plurality of OMDSs to produce derived data; and
  providing the derived data to a partner entity operative to make arrangements to retrieve OMPA output from a particular matter generator when the OMPA output ready status is set to a retrieval ready state Statement 33. The method of any previous statement, wherein the partner entity is operative to:
  send a pre-paid, self-addressed, package to a matter generator having the OMPA output ready status set to the retrieval ready state, wherein the matter generator places the food grounds into the package and ships the package; and
  receive the package at an OMPA output processing facility.

Statement 34. The method of any previous statement, wherein the partner entity is operative to:
  arrange for a third-party vendor to retrieve the OMPA output from a matter generator having the OMPA output ready status set to the retrieval ready state; and
  receive the OMPA output at an OMPA output processing facility.

Statement 35. The method of any previous statement, wherein the partner entity is operative to:
  manage an arrangement with a matter collector that collects matter from the matter generators, including matter generators that provide OMPA output;
  receive the OMPA output from the matter collector at an OMPA output processing facility; and
  manage accounting with the matter collector or a matter generator that has had OMPA output retrieved from the matter collector.

Statement 36. The method of any previous statement, wherein the OMPA output is provided to an OMPA output processing facility that converts the OMPA output into an OMPA output derived product.

Statement 37. The method of any previous statement, wherein the OMPA output derived product is selected from the group consisting of compressed food grounds, food ground briquettes, animal feed, fish feed, and compressed larvae.

Statement 38. A method for operating an organic matter processing apparatus (OMPA) comprising a bucket, a mass sensing system, communications circuitry, and a processor, the method comprising:
    initially calibrating the mass sensing system in response to a bucket insertion event such that bucket mass is tared; and
    after the bucket is inserted into the OMPA and the mass sensing system has been initially calibrated:
        measuring mass of the bucket with the calibrated mass sensing system in response to a lid open event;
        adding the measured mass to the total mass added value;
        executing organic matter processing to convert OMPA input contained in the bucket into OMPA output;
        obtaining mass values of the bucket with the calibrated mass sensing system during an active cycle of the organic matter processing or at an end cycle of the organic matter processing;
        obtaining water content values within the OMPA during the active cycle of the organic matter processing or at the end cycle of the organic matter processing;
        performing calculations based on the mass values and the water content values;
        incorporating the calculations, mass values, and water content values into an organic matter data set; and
        transmitting the organic matter data set to a central system.

Statement 39. The method of any previous statement, further comprising:
    temporarily stopping at least one component of the active cycle of the organic matter processing;
    obtaining mass values of the bucket with the calibrated mass sensing system during temporary stoppage of the least one component;
    obtaining water content values within the OMPA during temporary stoppage of the least one component;
    wherein the performing calculations is based on mass values and water content values obtained during temporary stoppage of the least one component;
    wherein the organic matter data set comprises the mass values, water content values, and calculations obtained during temporary stoppage of the least one component; and
    restarting the stopped at least one component.

Statement 40. The method of any previous statement 40, wherein the at least one component comprises a grinding mechanism.

Statement 41. The method of any previous statement, wherein after the bucket is inserted into the OMPA and the mass sensing system has been initially calibrated, the method further comprising:
    in response to a lid open event, temporarily stopping the active cycle of the organic matter processing prior to measuring the mass value of the bucket.

Statement 42. The method of any previous statement, further comprising:
    monitoring conditions within the OMPA; and
    adjusting calibration of the mass sensing system based on the monitored conditions.

Statement 43. The method of any previous statement, further comprising:
    transmitting the organic matter data set at period intervals to the central system.

Statement 44. The method of any previous statement, further comprising:
    transmitting the organic matter data set in response to a request from the central system or a remote device communicating with the OMPA via the communications circuitry.

Statement 45. The method of any previous statement, further comprising:
    selectively resetting a total mass added value and a total water removed value when the bucket is removed from and re-inserted into the OMPA;
    adding the mass values to the total mass added value;
    using water values to determine the total water removed value; and
    including the total mass added value and the total water removed value in the organic matter data set.

Statement 46. The method of any previous statement, further comprising:
    obtaining an end mass value from the mass sensing system when all OMPA output has been converted to OMPA output and the bucket is ready for removal from the OMPA;
    obtaining an end water content value when the bucket contains OMPA output and is ready for removal from the OMPA;
    including the end mass value and the end water content value into the organic matter data set.

Statement 47. A method for operating an organic matter processing apparatus comprising a bucket, a mass sensing system, communications circuitry, and a processor, the method comprising:
    determining a tare weight of the bucket when the bucket is re-inserted into the organic matter processing apparatus;
    using the tare weight to calibrate the mass sensing system;
    recording a mass value of the bucket using the mass sensing system in response to an open lid event;
    starting an active cycle of organic matter processing;
    during the active cycle of organic matter processing:
        recording mass values using the mass sensing system; and
        recalibrating the mass sensing system to compensate for sensor drift of the mass sensing system; and
    stopping the active cycle of organic matter processing.

Statement 48. The method of any previous statement 48, further comprising:
    performing an initial calibration of the mass sensing system at a factory with the bucket installed; and
    storing calibration settings in the memory of the OMPA.

Statement 49. The method of any previous statemen, further comprising:
    detecting whether inorganic matter has been added to the OMPA;
    stopping the active cycle of the organic matter processing when inorganic matter is detected;
    alerting a user of the presence of the inorganic matter in the OMPA.

Statement 50. The method of any previous statement, wherein the sensor drift is caused by heat generated by the OMPA during the active cycle.

Statement 51. The method of any previous statement, further comprising:
    including the recorded mass values in an organic matter data set; and
    transmitting the organic matter data set to a central system via the communications circuitry.

Statement 52. A method for operating an organic matter processing apparatus (OMPA) comprising a lid, a bucket, a mass sensing system, communications circuitry, and a processor, the method comprising:
 monitoring weight of the bucket using the mass sensing system; and
 in response to detecting a step change loss of weight of the bucket:
  locking the lid; and
  alerting a user of the OMPA that the step change loss of weight was detected.

Statement 53. The method of any previous statement 53, wherein in response to detecting the step change loss of weight of the bucket, the method further comprises stopping operation of an active cycle of organic matter processing.

Statement 54. The method of any previous statement, wherein the step change loss in weight is caused by a tip over event that causes the OMPA to begin tipping over or has tipped over.

Statement 55. The method of any previous statement, further comprising:
 detecting whether the OMPA is standing on an uneven surface; and
 alerting the user when the OMPA is detected to be standing on the uneven surface.

Statement 56. A system comprising:
 communications circuitry operative to receive a plurality of organic matter data sets (OMDSs) from a plurality of matter generators, wherein each of the plurality of matter generators comprises an organic matter processing apparatus (OMPA) operative to:
  convert OMPA input into OMPA output using the OMPA; and
  collect data for populating an OMDS, wherein the OMDS specifies an OMPA output ready status; and
 a processor operative to:
  process the plurality of FWDSs to produce derived data; and
  use the derived to data to execute an OMPA output retrieval protocol that retrieves OMPA output from a particular matter generator when the OMPA output ready status is set to a retrieval ready state.

Statement 57. The system of any previous statement, wherein during execution of the OMPA output retrieval protocol, the processor is further operative to:
 assess a plurality of factors to determine optimal routing of the OMPA output to one of a plurality of OMPA output processing facilities;
 select a first OMPA output processing facility from the plurality of OMPA output processing facilities based on assessment of the plurality of factors; and
 arrange for the OMPA output to be transported to the first OMPA output processing facility.

Statement 58. The system of any previous statement, wherein the plurality of factors comprises:
 locations of the plurality of matter generators;
 locations of the plurality of OMPA output processing facilities;
 feedstock types of the plurality of OMPA output processing facilities; and
 volume of OMPA output.

Statement 59. The system of any previous statement, wherein arrangement for the OMPA output to be transported is performed by the processor operative to provide an intelligent shipping label that includes an address of the first OMPA output processing facility to a first matter generator, wherein the first matter generator mails the OMPA output to the first OMPA output processing facility.

Statement 60. The system of any previous statement, wherein arrangement for the OMPA output to be transported is performed by the processor operative to provide a notice to a third party that manually collects OMPA output from a second matter generator when the OMPA output ready status is set to the retrieval ready state.

Statement 61. The system of any previous statement, wherein arrangement for the OMPA output to be transported is performed by the processor operative to:
 manage an arrangement with a matter collector that collects matter from the matter generators, including matter generators that provide OMPA output;
 instruct the matter collector to deliver the OMPA output to the first OMPA output processing facility; and
 manage accounting with the matter collector or a matter generator that has had OMPA output retrieved from the matter collector.

Statement 62. The system of any previous statement, wherein each of the plurality of OMPA output processing facilities converts the OMPA output into an OMPA output derived product.

Statement 63. The system of any previous statement, wherein the OMPA output derived product is selected from the group consisting of compressed OMPA output, OMPA output briquettes, animal feed, fish feed, and compressed larvae.

What is claimed is:

1. An organic matter processing apparatus (OMPA) comprising:
 a bucket configured to receive OMPA input that is treated by the OMPA to convert received OMPA input into OMPA output, wherein the OMPA output is a dry and shelf-stable product;
 a mass sensing system coupled to the bucket and configured to measure mass of the bucket;
 communications circuitry; and
 a processor configured to:
  obtain mass values of the bucket throughout a bucket insert/bucket removal cycle;
  include the mass values in an organic matter data set; and
  transmit the organic matter data set via the communications circuitry, wherein the processor is further configured to:
  execute organic matter processing of OMPA input contained in the bucket, the organic matter processing comprising paddling, cutting, and heating to convert OMPA input into OMPA output;
  obtain mass values and moisture content values during execution of the organic matter processing or after completion of the organic matter processing;
  perform mass calculations based on the obtained mass values;
  perform moisture calculations based on the obtained moisture content values;
  add mass calculations and moisture content calculations to the organic matter data set;
  temporarily stop operation of the paddling and cutting; and
  obtain mass values and moisture content values while the paddling and cutting are temporarily stopped.

2. The OMPA of claim 1, further comprising:
a moisture sensing system configured to measure moisture content within the OMPA; and
wherein the processor is further configured to:
obtain the moisture content values throughout the bucket insert/bucket removal cycle; and
include the moisture content values in the organic matter data set.

3. The OMPA of claim 2, wherein the processor is further configured to:
associate each mass value with a timestamp that is included in the organic matter data set; and
associate each moisture content value with a timestamp that is included in the organic matter data set.

4. The OMPA of claim 3, wherein the organic matter data set indicates how much OMPA input has been processed by the OMPA.

5. The OMPA of claim 1, wherein the processor is further configured to calibrate the mass sensing system when the bucket is inserted into the OMPA.

6. The OMPA of claim 1, wherein the processor is further configured to calibrate the mass sensing system during operation of an organic matter processing cycle, wherein the organic matter processing cycle adds heat to the OMPA during the organic matter processing cycle, and wherein calibration of the mass sensing system compensates for the added heat.

7. The OMPA of claim 1, wherein the processor is further configured to:
obtain a measured mass value with a calibrated mass sensor system in response to an open lid event;
add the measured mass value to a total mass added value; and
include the total mass added value in the organic matter data set.

8. The OMPA of claim 1, wherein the organic matter data set comprises:
mass values;
moisture content values;
timestamps;
total mass added; and
total water removed.

9. The OMPA of claim 1, wherein the organic matter data set is communicated to a central system that transmits a modified version of the organic matter data set to a matter collector or a third party partner.

10. A method for operating an organic matter processing apparatus (OMPA) comprising a bucket, a mass sensing system, communications circuitry, and a processor, the method comprising:
obtaining, via the mass sensing system, mass values of the bucket throughout a bucket insertion/bucket removal cycle;
converting OMPA input received in the bucket to OMPA output, wherein the OMPA output is a dry and shelf-stable product;
including the mass values in an organic matter data set;
transmitting the organic matter data set via the communications circuitry;
executing organic matter processing of OMPA input contained in the bucket, the organic matter processing comprising paddling, cutting, and heating to convert OMPA input into OMPA output;
obtaining mass values and moisture content values during execution of the organic matter processing or after completion of the organic matter processing;
performing mass calculations based on the obtained mass values;
performing moisture content calculations based on the obtained moisture content values;
adding mass calculations and moisture content calculations to the organic matter data set;
temporarily stopping operation of the paddling and cutting; and
obtaining mass values and moisture content values while the paddling and cutting are temporarily stopped.

11. The method of claim 10, wherein the OMPA further comprises a moisture sensing system configured to measure moisture content within the OMPA, the method further comprising:
obtaining the moisture content values throughout the bucket insert/bucket removal cycle; and
including the moisture content values in the organic matter data set.

12. The method of claim 11, further comprising:
associating each mass value with a timestamp that is included in the organic matter data set; and
associating each moisture content value with a timestamp that is included in the organic matter data set.

13. The method of claim 10, further comprising calibrating the mass sensing system when the bucket is inserted into the OMPA.

14. The method of claim 10, further comprising calibrating the mass sensing system during operation of an organic matter processing cycle, wherein the organic matter processing cycle adds heat to the OMPA, and wherein calibrating the mass sensing system compensates for the added heat.

15. The method of claim 10, further comprising:
obtaining a measured mass value with a calibrated mass sensor system in response to an open lid event;
adding the measured mass value to a total mass added value; and
including the total mass added value in the organic matter data set.

* * * * *